United States Patent
Miura et al.

(10) Patent No.: US 9,508,173 B2
(45) Date of Patent: Nov. 29, 2016

(54) IMAGE PROCESSING DEVICE HAVING DEPTH MAP GENERATING UNIT, IMAGE PROCESSING METHOD AND NON-TRANSITORY COMPUTER REDABLE RECORDING MEDIUM

(71) Applicant: MORPHO, INC., Tokyo (JP)

(72) Inventors: Takeshi Miura, Tokyo (JP); Shogo Sawai, Tokyo (JP); Yasuhiro Kuroda, Tokyo (JP); Hiroshi Koyama, Tokyo (JP); Kazuhiro Hiramoto, Tokyo (JP); Kosuke Ishiguro, Tokyo (JP); Ryo Ono, Tokyo (JP)

(73) Assignee: MORPHO, INC., Tokyo (JP)

( * ) Notice: Subject to any disclaimer, the term of this patent is extended or adjusted under 35 U.S.C. 154(b) by 58 days.

(21) Appl. No.: 14/526,524

(22) Filed: Oct. 29, 2014

(65) Prior Publication Data

US 2015/0116353 A1    Apr. 30, 2015

(30) Foreign Application Priority Data

Oct. 30, 2013   (JP) .................................. 2013-226045

(51) Int. Cl.
   G06T 11/60    (2006.01)
   G06F 3/041    (2006.01)
   G06T 7/20     (2006.01)
   (Continued)

(52) U.S. Cl.
   CPC ........... *G06T 11/60* (2013.01); *G06F 3/04845* (2013.01); *G06F 3/04883* (2013.01); *G06T 5/002* (2013.01); *G06T 5/50* (2013.01);
   (Continued)

(58) Field of Classification Search
   CPC ...... G06T 11/60; G06T 19/00; G06T 19/006; G06T 17/00; H04N 5/272; A63F 13/10
   See application file for complete search history.

(56) References Cited

U.S. PATENT DOCUMENTS 8,760,500 B1 *   6/2014   Gallup .............. H04N 13/0271
                                                        348/42
9,137,512 B2 *   9/2015   Baik .................... G06T 7/0077
                   (Continued)

FOREIGN PATENT DOCUMENTS

CN    103168462    6/2013
JP    2003-008996  1/2003
                   (Continued)

OTHER PUBLICATIONS

"Office Action of Taiwan Counterpart Application," issued on Mar. 10, 2016, p. 1-p. 13.
                   (Continued)

*Primary Examiner* — Todd Buttram
(74) *Attorney, Agent, or Firm* — Jianq Chyun IP Office

(57) ABSTRACT

An object of the present invention is to provide an image processing device and the like that can generate a composite image in a desired focusing condition. In a smartphone 1, an edge detecting section 107 detects an edge as a feature from a plurality of input images taken with different focusing distances, and detects the intensity of the edge as a feature value. A depth estimating section 111 then estimates the depth of a target pixel, which is information representing which of the plurality of input images is in focus at the target pixel, by using the edge intensity detected by the edge detecting section 107. A depth map generating section 113 then generates a depth map based on the estimation results by the depth estimating section 111.

30 Claims, 29 Drawing Sheets

(51) Int. Cl.
    *G06F 3/0488*     (2013.01)
    *G06T 7/00*     (2006.01)
    *G06T 5/00*     (2006.01)
    *G06T 5/50*     (2006.01)
    *G06F 3/0484*     (2013.01)

(52) U.S. Cl.
    CPC ... *G06T7/0069* (2013.01); *G06T 2207/20101* (2013.01); *G06T 2207/20221* (2013.01)

(56) References Cited

U.S. PATENT DOCUMENTS

| | | | |
|---|---|---|---|
| 9,268,408 B2 * | 2/2016 | Chou | G06F 3/017 |
| 2007/0003134 A1 | 1/2007 | Song et al. | |
| 2009/0309990 A1 | 12/2009 | Levoy et al. | |
| 2013/0044212 A1 | 2/2013 | Uehara | |
| 2013/0176458 A1 | 7/2013 | Van Dalen et al. | |
| 2013/0215248 A1 * | 8/2013 | Ishii | A61B 5/1113 |
| | | | 348/77 |

FOREIGN PATENT DOCUMENTS

| | | |
|---|---|---|
| JP | 2007-013914 | 1/2007 |
| KR | 20070119961 | 12/2007 |
| KR | 20110100653 | 9/2011 |
| WO | 2013/054446 | 4/2013 |

OTHER PUBLICATIONS

"Office Action of Korea Counterpart Application," issued on Nov. 10, 2015, p. 1-p. 5.

"Office Action of Korea Counterpart Application", issued on Jun. 27, 2016, p1-p4, in which the listed references were cited.

\* cited by examiner

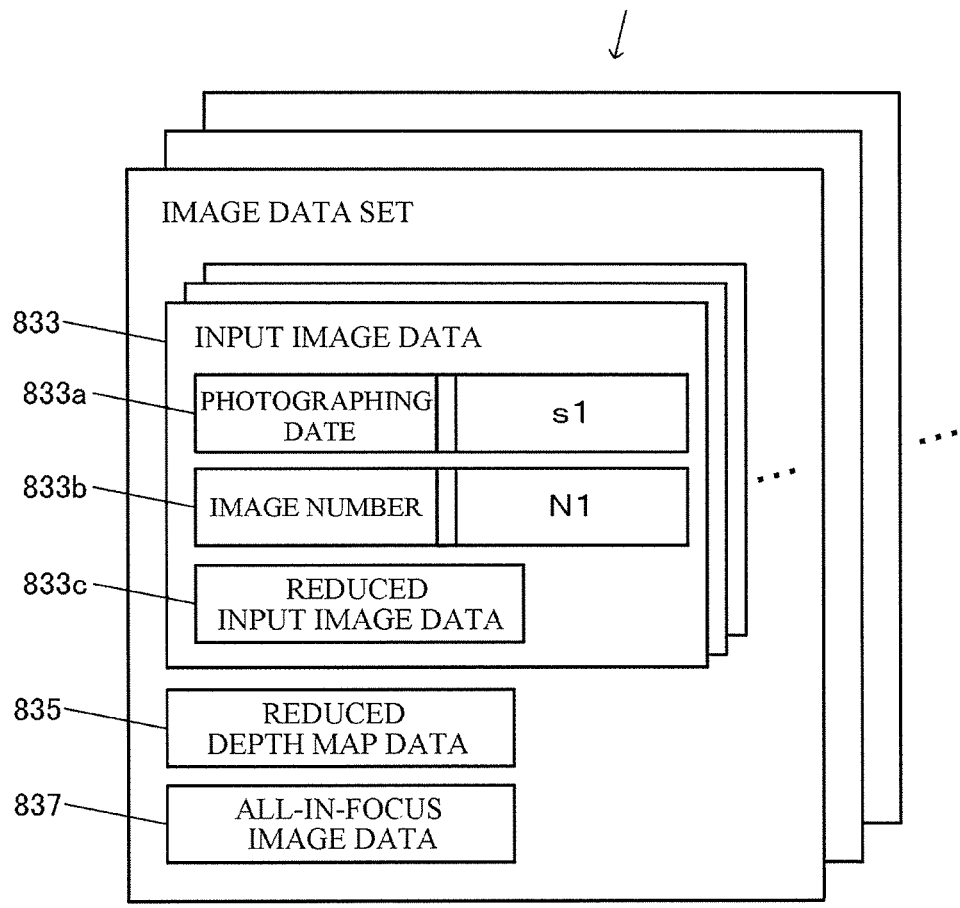

| MODE | | FIRST PENALTY VALUE | SECOND PENALTY VALUE | THIRD PENALTY VALUE |
|---|---|---|---|---|
| NORMAL STATE | | $P_1$ | $P_2$ | $P_3$ |
| EMPHASIZED IMAGE CORRECTING STATE | SIMILARITY CONDITION SATISFIED | $P_1 - \alpha$ | $P_2 - \alpha$ | $P_3 - \beta$ |
| | DISSIMILARITY CONDITION SATISFIED | $P_1 + \alpha$ | $P_2 + \alpha$ | $P_3 + \beta$ |

$P_1 < P_2 < P_3$

 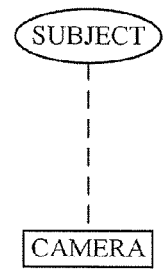
FIG. 22(1)
 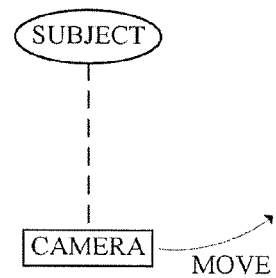
FIG. 22(2)
 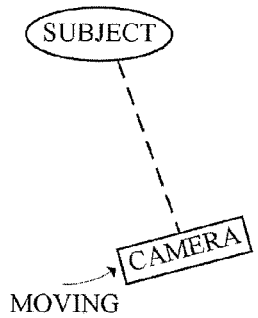
FIG. 22(3)
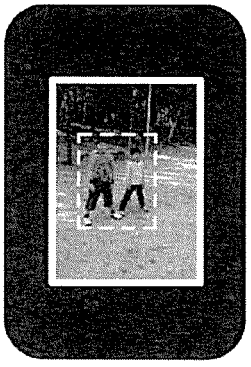 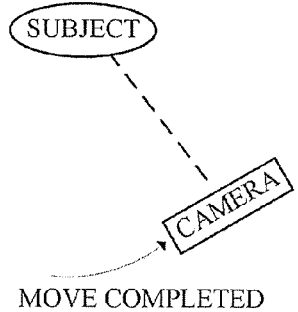
FIG. 22(4)

IMAGE PROCESSING DEVICE HAVING DEPTH MAP GENERATING UNIT, IMAGE PROCESSING METHOD AND NON-TRANSITORY COMPUTER REDABLE RECORDING MEDIUM

CROSS-REFERENCE TO RELATED APPLICATIONS

This application claims the priority benefit of Japan application serial no. 2013-226045, filed on Oct. 30, 2013. The entirety of the above-mentioned patent application is hereby incorporated by reference herein and made a part of this specification.

TECHNICAL FIELD

The present invention relates to an image processing device that performs image processing, and the like.

BACKGROUND ART

When photographing a subject with an imaging device such as a camera, the device retrieves scene information including the background around the subject and outputs an image corresponding to the scene information. In this regard, the output image can have different expressions depending on how the focus is adjusted with respect to the subject and the background.

If it is desired to obtain an output image in which the subject is emphasized, a method to achieve this is to make the depth of field shallower so that the subject, i.e. a near view, is in focus while the background, i.e. a distant view, is out of focus. Achieving a shallow depth of field requires some sort of means such as close-up shooting, a telephoto lens or a wider aperture. However, it is difficult for ordinary people to use such means or to get hardware being capable of such means. Further, due to very restrictive hardware limitations, most camera-equipped mobile phones such as smartphones output deep-focus images that have such a large depth of field that an entire image looks in focus from the near view to the distant view. Accordingly, it is difficult to obtain an image with shallow depth of field with the hardware of such widely used devices.

In order for even cameras by which it difficult to achieve a shallow depth of field to output images in which a desired subject is emphasized, a technique as proposed in Patent Document 1 and the like is to obtain an image with blur around the contour of a subject (the so-called soft focus image) in response to a photographing operation, automatically photographing sequential images that include an in-focus image in which a subject is in focus and an out-of-focus image in which the subject is out of focus, and then compositing the in-focus image and the out-of-focus image.

CITATION LIST

Patent Literature

Patent Document 1: JP 2003-8996A

SUMMARY OF INVENTION

Technical Problem

However, if a photographed image includes a plurality of subjects, a user may want a composite image in which one subject is in focus (sharp) while the other subject is out of focus (blurred), or he/she may want an opposite composite image in which the other subject is in focus while the one subject is out of focus. A problem with conventional image processing devices as described above is the difficulty in obtaining a composite image according to a desired focus state.

The present invention was made in order to solve the problem, and an object thereof is to provide an image processing device that can produce a composite image according to a desired focus state.

Solution to Problem

The present invention employs the following means for solving the above-described problem. The reference signs used in the following description of embodiments and drawings are added for the purpose of reference. However, the components of the present invention are not intended to be limited to those represented by the reference signs.

A first invention for solving the above-described problem is an image processing device, including:

a feature detecting unit (the processing section 10 of FIG. 1, e.g. the edge detecting section 107) configured to detect a predetermined feature (the feature value, the feature point) from a plurality of input images (the plurality of photographed images taken by the imaging section 50) (Step A11 of FIG. 4 and FIG. 15, Step J7 of FIG. 19); and a depth map generating unit (the processing section 10 of FIG. 1, the depth map generating section 113) configured to generate a depth map based on a detection result from the feature detecting unit (Step A17 of FIG. 4, Step F17 of FIG. 15, Step J27 of FIG. 19).

Another invention may be an image processing method, including:

detecting a predetermined feature (the feature value, the feature point) from a plurality of input images (the plurality of photographed images taken by the imaging section 50) (Step A11 of FIG. 4 or FIG. 15, Step J7 of FIG. 19); and generating a depth map based on a result of detecting the predetermined feature (Step A17 of FIG. 4, Step F17 of FIG. 15, Step J27 of FIG. 19).

Further, another invention may be a program (the image processing program 81 of FIG. 1) to make a computer (the smartphone 1 of FIG. 1, the image processing device, other information processing devices) execute the steps of:

a feature detecting step of detecting a predetermined feature (the feature value, the feature point) from a plurality of input images (the plurality of photographed images taken by the imaging section 50) (Step A11 of FIG. 4 or FIG. 15, Step J of FIG. 19); and a depth map generating step of generating a depth map based on a detection result of the feature detecting step (Step A11 of FIG. 4, Step F17 of FIG. 15, Step J27 of FIG. 19).

In the first invention, a predetermined feature is detected from a plurality of input images, and a depth map is generated based on the detected feature. It is possible to generate the depth map using the feature detected from the plurality of input images.

The depth map includes information that can specify an input image that is in focus at a pixel (i.e. in-focus input image) at a certain coordinate, or in other words, information that can specify the coordinate of an in-focus pixel (i.e. in-focus area) in a certain input image. The depth map thus generated makes it possible to generate a composite image according to a desired focus condition. The term "composite image according to a desired focus condition" includes, for example, a composite image in which a predetermined subject is in focus but the other subjects are out of focus, and a composite image in which all subjects are in focus (also referred to as all-in-focus image).

Further, after generating a composite image according to a desired focus condition, the depth map allows the generation of a different composite image by changing a subject to be in focus or changing the out-of-focus degree.

Further, since storing the depth map and the input images used for generating the depth map enables the generation of a composite image according to a desired focus condition, it is not required to generate a plurality of composite images at the time of photographing, which can reduce the amount of image data and can also reduce the burden of image file management and the like.

The present invention is particularly applicable to image processing devices that generate a deep-focus image, i.e. an image with a large depth of field that is in focus from a near view to a distant view, such as camera-equipped cellular phones or smartphones.

Further, a second invention may be the image processing device according to the first invention, wherein the feature detecting unit includes a feature value detecting unit (the processing section 10 of FIG. 1) configured to detect a predetermined feature value (the edge intensity, the DoG (Difference of Gaussian) value, degree of background, or the like) from the plurality of input images, the image processing device further includes a depth estimating unit (the depth estimating section 111 of FIG. 1) configured to estimate a depth of a target pixel (all or some pixels in the image) by means of the feature value detected by the feature value detecting unit, the depth of the target pixel being information representing which of the plurality of input images is in focus at the target pixel (Step A15 of FIG. 4 or FIG. 15), and the depth map generating unit generates the depth map based on an estimation result from the depth estimating unit (Step A17 of FIG. 4, Step F17 of FIG. 15).

In the second invention, a feature value detected from the plurality of input images is used to estimate a depth of a target pixel indicating which of the plurality of input images is in focus at the target pixel. By estimating the depth of a target pixel and indicating which of the plurality of input images is in focus at the target pixel, it becomes possible to generate the depth map based on the estimation result. The target pixel may be either all pixels in the image or pixels in a certain area of the image.

In this case, another invention may be the image processing device, wherein the feature value detecting unit (the edge detecting section 107) includes an edge detecting unit configured to detect an edge from the plurality of input images as the feature, and the depth estimating unit uses an intensity of the edge detected by the edge detecting unit as the feature value in order to estimate the depth of the target pixel.

In this invention, an edge is detected as the feature from the plurality of input images, and the intensity of the detected edge is used as the feature value to estimate the depth of the target pixel. As far as the present inventors know, the intensity of the edge detected from an input image is correlated to the in-focus degree at the focusing distance. Accordingly, by using the edge intensity as the feature value, it becomes possible to correctly estimate the input image that is in focus at the target pixel.

Further, a third invention may be the image processing device according to the second invention, wherein the depth estimating unit performs a predetermined proper solution processing on the target pixel by using the respective feature values of the plurality of input images detected by the feature value detecting unit so as to determine an input image that is in focus at the target pixel among from the plurality of input images, in which the proper solution processing uses a first parameter (the cost value) that is determined by the feature value of the target pixel, and a second parameter (the penalty values) that is a penalty imposed when a first input image that is in focus at the target pixel is different from a second input image that is in focus at a neighboring pixel of the target pixel (the score value processing to maximize or minimize the output of the energy function: Step C1 to Step C7 of FIG. 7).

By the third invention, it becomes possible to correctly determine an input image that is in focus at the target pixel by performing the predetermined proper solution processing using the first parameter and the second parameter.

In this case, another invention may be the image processing device, wherein, in the proper solution processing, a predetermined score value for the target pixel is calculated by subtracting the second parameter from the first parameter, and the depth estimating unit determines an input image in which the score value for the target pixel satisfies a predetermined high value condition as the input image that is in focus at the target pixel (Step C5 of FIG. 7).

In this invention, in the proper solution processing, the score value for the target pixel is calculated by subtracting the second parameter from the first parameter, and an input image in which the score value for the target pixel satisfies a predetermined high value condition is determined as the input image that is in focus at the target pixel. That is, an input image having the highest possible feature value is selected for the target pixel while some restriction is applied to the selection for the neighboring pixel so that the input image selected can remain the same as much as possible. By this score value processing, it becomes possible to correctly determine the input image that is in focus at the target pixel.

Further, another invention may be the image processing device, wherein, in the proper solution processing, a predetermined score for the target pixel value is calculated by adding the second parameter to the first parameter, and the depth estimating unit determines an input image in which the score value for the target pixel satisfies a predetermined low value condition as the input image that is in focus at the target pixel.

In this invention, in the proper solution processing, the score value for the target pixel is calculated by adding the second parameter to the first parameter, and an input image in which the score value for the target pixel satisfies a predetermined low value condition is determined as the input image that is in focus at the target pixel. Thereby, it becomes possible to correctly determine the input image that is in focus at the target pixel.

Further, another invention may be the image processing device, wherein, in the proper solution processing, the score value is calculated in such a manner that the second parameter increases in correspondence with an increase in difference of depth between the first input image and the second input image (the penalty table 89 of FIG. 3, $P_1 < P_2$).

In this invention, in the proper solution processing, the score value is calculated in such a manner that the second parameter increases in correspondence with an increase in difference of depth between the first input image and the second input image. By this proper solution processing, it becomes possible to calculate the score value so that an input image having the closest possible focusing distance is selected for the neighboring pixel of the target pixel.

Further, another invention may be the image processing device, wherein, in the proper solution processing, the score value is calculated using the second parameter that is individually defined according to a combination of two input images of the plurality of input images.

In this invention, in the proper solution processing, the score value is calculated using the second parameter, which is individually defined according to a combination of two input images of the plurality of input images. For example, if there is a large difference in focusing distance between the first input image and the second input image, the second parameter is set to a large value. This makes it less likely that an input image with a largely different focusing distance will be determined as the in-focus input image.

Further, another invention may be the image processing device, wherein, in the proper solution processing, the score value (the value of the energy function of Expression (2) or Expression (3)) is calculated with respect to pixels on a line of the plurality of input images (Step C3 of FIG. 7), and the depth estimating unit determines an input image that is in focus at the pixels on the line based on the score value with respect to the pixels on the line of the plurality of input images (Step C5 of FIG. 7).

In this invention, in the proper solution processing, the score value is calculated with respect to pixels on a line of the plurality of input images, and an in-focus image that is in focus at the pixels on the line is determined based on the score value with respect to the pixels one the line of an input images. By this proper solution processing, it becomes possible to facilitate the calculation for the depth estimation.

Further, a fourth invention may be the image processing device according to the third invention, further including: a motion blur area detecting unit (the processing unit 10 of FIG. 1) configured to detect a motion blur area in the plurality of input images, wherein in the proper solution processing, at least one of the first parameter and the second parameter is set to a different parameter value for the motion blur area detected by the motion blur area from parameter values for an area other than the motion blur area.

In the fourth invention, a motion blur area is detected from the plurality of input images. Then, the proper solution processing is performed such that at least one of the first parameter and the second parameter for the motion blur area detected by the motion blur area detecting unit is set to a different parameter value from those for an area other than the motion blur area. By means of this feature, it becomes possible to correctly determine an input image that is in focus at a pixel in the motion blur area.

Further, another invention may be the image processing device, further including: a contrast correcting unit (the contrast correcting section 105 of FIG. 1) configured to correct contrast of the plurality of input images (Step A9 of FIG. 4 or FIG. 15), wherein the feature value detecting unit detects the feature value from the plurality of input images that are corrected by the contrast correcting unit (Step A11 of FIG. 4 or FIG. 15).

In this invention, the contrast of the plurality of input images is corrected, and the feature value is detected from the contrast-corrected plurality of input images. Accordingly, it is possible to detect the feature value that correctly reflects the feature of the plurality of input images.

Further, a fifth invention may be the image processing device according to any one of the second to fourth inventions, further including: a focus separation determination unit (the focus separation determination section 109) configured to determine as to whether focus is correctly separated in the plurality of input images (the focus separation determination processing of FIG. 6), wherein the depth estimating unit estimates the depth of the target pixel using input images for which a determination result from the focus separation determination unit is positive (Step B7 of FIG. 6).

In the fifth invention, a determination is made as to whether the focus of the plurality of input images is correctly separated, and the depth of the target pixel is estimated using input images for which a determination result from the focus separation determination unit is positive. If the focus of an input image is not correctly separated, a desired subject may not be correctly separated from the background. To avoid such problems, the depth estimation is carried out on the basis of input images that are taken at correct focusing distances and thus have a correctly separated focus.

In this case, another invention may be the image processing device, wherein the focus separation determination unit includes a correlation calculating unit (the processing section 10 of FIG. 1) configured to calculate a correlation value between images from the respective plurality of input images that are formed by the feature value detecting unit detecting the feature value and to determine that an input image has a correctly separated focus when a corresponding image satisfies a predetermined low threshold condition of the correlation value calculated by the correlation calculating unit (Step B1 of FIG. 6).

In this invention, with respect to the images that are formed from the respective plurality of input images by the feature value detecting unit detecting the feature value, a correlation value between these images is calculated. It is then determined that an input image has a correctly separated focus when the corresponding image satisfies a predetermined low threshold condition of the correlation value. If the focus of input images is correctly separated, it is supposed that the correlation value between the corresponding images based on the detected feature values will be relatively low. Accordingly, it is possible to make an exact determination as to whether the focus of an input image is correctly separated using the correlation value between images as an index.

Further, another invention may be the image processing device, wherein the focus separation unit determines that an input image has a correctly separated focus when the number of feature or the percentage of feature of a corresponding image that is formed by the feature value detecting unit detecting the feature value satisfies a predetermined high threshold condition (Step B3 of FIG. 6) (Step B5 of FIG. 6).

In this invention, it is determined that an input image has a correctly separated focus when the number of feature or the percentage of feature of a corresponding image that formed on the basis of the feature value detected by the feature value detecting unit satisfies a predetermined high threshold condition. If the focus of an input image is correctly separated, it is supposed that the number or percentage of the feature will be relatively high. Accordingly, it is possible to make an exact determination as to whether the focus of an input image is correctly separated using the number or percentage of the feature as an index.

Further, a sixth invention may be the image processing device according to any one of the second to fifth inventions, wherein the feature value detecting unit detects the feature value from the plurality of input images or a plurality of reduced input images (the input image reducing section 101 of FIG. 4) that are obtained by reducing the plurality of input images (Step A11 of FIG. 4), and the depth map generating unit generates a reduced depth map based on the estimation result from the depth estimating unit (Step A17 of FIG. 4).

In the sixth invention, the feature value is detected from the plurality of input images or a plurality of reduced input images that are obtained by reducing the plurality of input images. Then, a reduced depth map is generated based on the estimation result of the depth. The reduced depth may be generated from the plurality of input images or the plurality of reduced input images that are obtained by reducing the plurality of input images using the depth map generating technique of the above-described invention. Since the reduced depth map has a smaller size than the depth map, the memory consumption will be reduced when stored in the memory.

Further, a seventh invention may be the image processing device according to the sixth invention, further including: a reconstructing unit (the depth map reconstructing section 115 of FIG. 1) configured to reconstruct a reconstructed depth map from the reduced depth map (Step A19 of FIG. 4); and a correcting unit (the depth map correcting section 117 of FIG. 1) configured to generate a corrected depth map from the reconstructed depth map reconstructed by the reconstructing unit by means of a predetermined corrector image (an input image) (Step A21 of FIG. 4).

In the seventh invention, the reduced depth map is subject to reconstruction by a predetermined reconstructing method. During reconstruction, the reconstructed depth map may have a problem of an irregular depth border or a deviated edge at the border part of a subject. To cope with the problem, the reconstructed depth map is corrected using a predetermined corrector image to generate a corrected depth map. As a result, the above problem is solved and the correct depth map can be obtained.

Further, an eighth invention is the image processing device according to the first invention, wherein the feature detecting unit includes a feature point detecting unit (the processing section 10 of FIG. 1) configured to detect feature points from the plurality of input images, in which the plurality of input images are a plurality of photographed images that have parallax by being taken from different viewpoints (the photographed images taken by a parallax technique) (Step J7 of FIG. 19), the image processing device further includes:

a relative viewpoint estimating unit (the processing section 10 of FIG. 1) configured to estimate relative positional relation (the camera matrix: rotation matrix, translation matrix) between respective viewpoints of the plurality of photographed images based on the feature points detected by the feature point detecting unit (Step J23 of FIG. 19); and a pixel position estimating unit configured to perform a predetermined estimating calculation (the bundle adjustment) so as to estimate three-dimensional positions of pixels of the plurality of input images (Step J25 of FIG. 19), and the depth map generating unit generates the depth map based on an estimation result from the relative viewpoint estimating unit and an estimation result from the pixel position estimating unit (Step J27 of FIG. 19).

In the eighth invention, feature points are detected from the plurality of photographed images that have parallax by being taken from different viewpoints, relative positional relation of the viewpoints are estimated from the detected feature points, and the three-dimensional positions of the pixels of the plurality of input images are estimated by a predetermined estimating calculation. Therefore, the depth map can be correctly generated based on the relative positional relation and the three-dimensional positions of the pixels.

Further, a ninth invention may be the image processing device according to the eighth invention, wherein the relative viewpoint estimating unit includes:

a feature point tracking unit (the processing section 10 of FIG. 1) configured to track the feature points detected by the feature point detecting unit (Step J11 of FIG. 19); and a base input image extracting unit (the processing section 10 of FIG. 1) configured to extract an input image from among the plurality of input images as an base input image (base frame) to be used as a reference point based on a tracking result from the feature point tracking unit (Step J13 of FIG. 19), and the relative viewpoint tracking unit estimates the relative positional relation between the respective viewpoints of the plurality of photographed images based on the feature points detected by the feature point detecting unit from the base input image extracted by the base input image extracting unit.

In the ninth invention, the base input image is extracted from the plurality of input images based on the tracking result of tracking the feature points, and the relative positional relation between the respective viewpoints of the plurality of photographed images is estimated based on the feature points detected from the base input image. Therefore, the relative positional relation can be precisely estimated.

Further, a tenth invention may be the image processing device according to the eighth or ninth invention, further including:

a display unit (the display section 30 of FIG. 1); and a display controlling unit (the display controlling section 127 of FIG. 1) configured to control the display unit to display a guide (the guide arrow and the guide figure of FIG. 22 (1) to FIG. 22 (4)) for showing a user a moving manner (moving direction, moving distance) of the device that causes parallax between the plurality of photographed images.

In the tenth invention, the guide for showing the user a moving manner of the device that causes parallax between the plurality of photographed images is displayed. Therefore, it is convenient for the user to understand how to move the device for generating the depth map.

Further, an eleventh invention may be the image processing device, further including:

a movement parameter detecting unit configured to detect a movement parameter (moving distance, moving direction) of the device (the inertial sensor 75 (acceleration sensor, gyroscopic sensor), the processing section 10, the inertial measurement unit (IMU), the GPS unit and the inertial navigation system (INS) of FIG. 1), wherein the display controlling unit changes an appearance of the guide (the display position of the guide arrow and the display position of the guide of FIG. 22 (1) to FIG. 22 (4)) based on a detection result from the movement parameter detecting unit.

In the eleventh invention, the appearance of the guide is changed based on the detected movement parameter of the device. Therefore, it is possible to inform the user of a suitable moving direction and a moving distance of the device.

Further, a twelfth invention may be the image processing device according to any one of the first to eleventh inventions, further including:

an all-in-focus image generating unit (the all-in-focus image generating section 119 of FIG. 1) configured to generate an all-in-focus image by using the depth map and the plurality of input images (Step A23 of FIG. 4 and FIG. 19).

In the twelfth invention, the all-in-focus image in which all pixels of the input images are in focus can be generated from the depth map and the plurality of input images.

Further, another invention may be the image processing device, further including:

an all-in-focus image generating unit (the all-in-focus image generating section 119 of FIG. 1) configured to generate an all-in-focus image from the depth map generated by the depth map generating unit and the plurality of input images (Step F19 of FIG. 15);

a depth map reducing unit (the depth map reducing section 121 of FIG. 1) configured to reduce the depth map generated by the depth map generating unit according to a predetermined reducing method to generate a reduced depth map (Step F21 of FIG. 15); and a memory unit (the memory section 80 of FIG. 1, the image data set 83) configured to store the reduced depth map and to associate the reduced depth map with at least the plurality of input image or the all-in-focus image.

In this invention, the all-in-focus image is generated from the depth map generated by the depth map generating unit and the plurality of input images. Then, the depth map generated by the depth map generating unit is reduced by a predetermined reducing method to generate a reduced depth map. The reduced depth map is stored and associated with at least the plurality of input images or the all-in-focus image. The reduced depth map can save the memory capacity compared to the original depth map. By associating the reduced depth map with the plurality of input images or the all-in-focus image, it becomes possible to correct the all-in-focus image by using the image information or to use the image information in the other devices later.

Further, another invention may be an image processing device, further including:

a depth map reconstructing unit (the depth map reconstructing section 115 of FIG. 1) configured to reconstruct a reconstructed depth map from the reduced depth map stored in the memory unit (Step A47 of FIG. 15); and a correcting unit (the depth map correcting section 117 of FIG. 1) configured to correct the reconstructed depth map by using a predetermined corrector image (Step A49 of FIG. 15).

In this invention, the reduced depth map stored in the memory unit is subject to reconstruction by a predetermined reconstructing method. Then, the reconstructed depth map is corrected by using a predetermined corrector image. The reconstructed depth map may have a problem of an irregular depth border or a deviated edge at the border part of a subject that are caused during the reconstruction. To cope with the problem, the reconstructed depth map is corrected by using a predetermined corrector image to generate a corrected depth map. As a result, the above problem is solved and the correct depth map can be obtained.

In this case, another invention may be the image processing device, wherein the corrector image is the all-in-focus image stored in the memory section in association with the depth map or at least one of the plurality of input images, and the correcting unit performs weighted average processing (the weighted average processing of Expression (3)) to correct a pixel value of a correcting target pixel in the reconstructed depth map, wherein a pixel value of a neighboring pixel of the correcting target pixel in the depth map is weighted in such a manner that a larger value is weighted as a pixel value of the correcting target pixel in the corrector image is closer to a pixel value of the neighboring pixel in the corrector image, and also a larger value is weighted as a distance between the correcting target pixel and the neighboring pixel is shorter.

In this invention, the all-in-focus image stored in the memory section in association with the depth map or at least one of the plurality of input images is used as the corrector image. Then, weighted average processing is performed to correct a pixel value of a correcting target pixel in the reconstructed depth map, wherein a pixel value of a neighboring pixel of the correcting target pixel in the depth map is weighted in such a manner that a larger value is weighted as a pixel value of the correcting target pixel in the corrector image is closer to a pixel value of the neighboring pixel in the corrector image, and also a larger value is weighted as a distance between the correcting target pixel and the neighboring pixel is shorter. By this processing, it becomes possible to obtain the depth map with a sharp border between the foreground and the background.

Further, a thirteenth invention may be the image processing device according to any one of the first to twelfth invention, further including:

a display unit (the display section 30 of FIG. 1);

an input unit configured to receive a user operation (the input section 20 of FIG. 1); and a composite image generating unit (an emphasized image generating unit 123 of FIG. 1) configured to generate a composite image based on the depth map according to the user operation on the input unit, in which a pixel value of a pixel in an input image corresponding to a specific depth is applied to an input image corresponding to a depth other than the specific depth, wherein the display unit displays the composite image generated by the composite image generating unit.

In the thirteenth invention, a composite image is generated based on the depth map according to the user operation on the input unit that is configured to receive user operations, in which a pixel value of a pixel in an input image corresponding to a specific depth is applied to an input image corresponding to a depth other than the specific depth.

The generated composite image is then displayed. By this feature, it becomes possible, for example, to generate a composite image in which an area specified by the user is in focus and to be shown to the user.

Further, a fourteenth invention may be the image processing device according to the twelfth invention, further including:

a display unit (the display section 30 of FIG. 1);

an input unit (the input section 20 of FIG. 1) configured to receive a user operation; and a composite image generating unit (the emphasized image generating section 123 of FIG. 1) that includes a blur processing unit (the processing section 10 of FIG. 1) configured to perform blur processing to the all-in-focus image, and is configured to generate a composite image based on the depth map according to the user operation on the input unit, in which a pixel value of a pixel in an input image corresponding to a specific depth is applied to a resultant image of the blur processing, wherein the display unit displays the composite image generated by the composite image generating unit.

In the fourteenth invention, a composite image is generated based on the depth map according to a user operation on the input unit that is configured to receive user operations, in which a pixel value of a pixel in an input image corresponding to a specific depth is applied to a resultant image of the blur processing to the all-in-focus image, and the generated composite image is then displayed. By this feature, it becomes possible, for example, to generate a composite image in which an area specified by the user is in focus and to be shown to the user.

In this case, another invention may be the image processing device, wherein the composite image generating unit makes a determination as to whether an area in the image designated by the user operation is a blurred area to which the blur processing is performed, and if a determination result is positive, the composite image generating unit changes a degree of blur of the blurred area to a value different from the predetermined degree of blur and re-performs the blur processing to the composite image.

In this invention, it is possible to change the degree of blur of the composite image that is blurred by the blur processing within an area in an image designated by the user operation so as to regenerate the blurred composite image. By this feature, for example, it becomes possible to change (increase or decrease) the degree of blur of a blurred area in the composite image according to a user tap gesture on the blurred area.

Further, a fifteenth invention may be the image processing device according to the fourteenth invention, further including:

a display controlling unit (the display controlling section 127 of FIG. 1) configured to control the display unit to display a designating figure (the circle in FIG. 25 (1) or FIG. 25 (2), an oval, a rectangle or the like) for a user designation of an in-focus target area to be in focus according to the user operation (an operation of an icon, a tap gesture) on the input unit, wherein the composite image generating unit generates the composite image in which a depth of a pixel included in the designating figure in the plurality of input images is set to the specific depth based on the depth map.

In the fifteenth invention, in response to a user operation on the input unit, a designating figure for designating an in-focus target area to be in focus is displayed on the display unit. Therefore, the user can designate the in-focus target area by a simple operation.

Further, a sixteenth invention may be the image processing device according to the fifteenth invention, wherein the input unit includes a touch panel that is integrally formed with the display unit, and after displaying the designating figure on the display unit, the display controlling unit changes a shape of the displayed designating figure (enlarges/reduces the designating figure) in response to any one of (1) a pinch gesture (pinch-in/pinch-out gesture) on the designating figure, (2) a multiple tap gesture (double tap gesture) on the designating figure and (3) a duration time of holding a tap gesture on the designating figure (long tap time when a long tap gesture is performed).

In the sixteenth invention, it is possible to change the shape of the designating figure by a simple user operation.

Further, a seventeenth invention may be the image processing device according to the thirteenth or fourteenth invention, wherein the input unit includes a touch panel (the touch panel 21 of FIG. 1) that is integrally formed with the display unit, the composite image generating unit generates the composite image, in which the specific depth is determined based on an operation on the touch panel.

In the seventeenth invention, it is possible to generate the composite image by a tap gesture on the touch panel that is formed integrally with the display unit.

Further, an eighteenth invention may be the image processing device according to the seventeenth invention, wherein the display unit displays a confirmation screen on which a subject to be photographed can be checked (the screen on which an image based on the output signal from the imaging element is displayed in real time), the processing device further includes:

a memory unit (the memory section 80 of FIG. 1) configured to store an in-focus target position that is a position to be in focus on the confirmation screen according to a tap gesture on the touch panel where the confirmation screen is displayed; and an imaging unit (the imaging section 50 of FIG. 1) configured to perform photographing after the in-focus target position is stored in the memory section when a predetermined photographing condition is satisfied, the feature detecting unit detects the feature, in which the plurality of input images are a plurality of photographed images taken by the imaging unit, and the composite image generating unit generates the composite image, in which the specific depth is a depth at the in-focus target position stored in the memory section.

In the eighteenth invention, the user can designate an in-focus target position in the confirmation screen. Thereafter, the photographing is performed, and the composite image is generated in which the specific depth is a depth at the in-focus target position designated in the conformation screen.

In this case, another invention may be the image processing device, wherein the imaging unit performs photographing after the in-focus target position is stored in the memory section, in which the predetermined photographing condition is one of (1) detection of a predetermined photographing operation on the input unit, (2) detection of a long tap gesture for a predetermined time and (3) detection of multiple tap gestures.

In this invention, after the in-focus target position is stored in response to a tap gesture, the photographing can be performed according to a simple user operation.

Further, a nineteenth invention may be the image processing device according to seventeenth invention, wherein the display unit displays a predetermined display image (an input image), the processing device further including:

an in-focus target area setting unit (the processing section 10 of FIG. 1) configured to set an in-focus target area to be in focus according to a tap gesture on the touch panel where the display image is displayed on a display screen; and a blur processing unit (the processing section 10 of FIG. 1) configured to perform blur processing to a predetermined degree of blur to an area other than the in-focus target area set by the in-focus target area setting unit, and the blur processing unit includes a blur degree changing unit (the processing section 10 of FIG. 1) configured to change the degree of blur (to increase/decrease the degree of blur) according to a pinch gesture (pinch-out/pinch-in gesture) on the in-focus target area set by the in-focus target area setting unit.

In the nineteenth invention, the user can designate an in-focus target area to be in focus by a tap gesture on the touch panel where the display image is displayed on a display screen. Then, it is possible to generate the composite image in which the in-focus target area is emphasized generated by the blur processing to a predetermined degree of blur to the area other than the in-focus target area.

Further, a twentieth invention may be the image processing device according to the nineteenth invention, wherein the blur degree changing unit increases the degree of blur in stages according to a pinch-out gesture on the in-focus target area, and decrease the degree of blur in stages according to a pinch-in gesture on the in-focus target area.

In the twentieth invention, it is possible to change the degree of blur of the blur processing performed on the area other than the in-focus target area by a simple user operation.

Further, a twenty-first invention may be the image processing device according to any one of the first to twelfth invention, wherein the plurality of input images are a plurality of photographed images taken with different focusing distances, the image processing device further includes:

a display unit (the display section 30 of FIG. 1);

an input unit (the input section 20 of FIG. 1) configured to receive a user operation;

a display controlling unit (the display controlling section 127 of FIG. 1) configured to control the display unit to display a focus range designating image for a user designation of a focus range (the focus slider S1 of FIG. 27 (1) to FIG. 27 (3)) at a predetermined position in the display unit; and a composite image generating unit (the emphasized image generating section 123) configured to generate a composite image based on the depth map, in which the composite image is in focus at a pixel at a depth corresponding to the focus range designated by the user operation on the focus range designating image and is out of focus at the other pixel, and the display unit displays the composite image generated by the composite image generating unit.

In the twenty-first invention, the user can perform an operation on the focus range designating image to allow the device to generate the composite image that is in focus at pixels at a depth corresponding to a desired focus range are in focus and is out of focus at the other pixels, so as to enable to view the generated composite image.

Further, a twenty-second invention may be the image processing device according to any one of the first to twelfth inventions, wherein the plurality of input images are a plurality of photographed images taken with different focusing distances, the image processing unit further includes:

a display unit (the display section 30 of FIG. 1);

an input unit (the input section 20 of FIG. 1) to receive a user operation;

a display controlling unit (the display controlling section 127 of FIG. 1) configured to control the display unit to sequentially display a plurality of reference images that are based on the plurality of input images (the plurality of input images, the feature detected images obtained by detecting the feature of the respective plurality of input images, the contrast corrected images obtained by correcting the contrast of the respective plurality of input images, and the product images obtained by multiplying the plurality of input images by the corresponding feature detected images); and a composite image generating unit (the emphasized image generating section 123) configured to generate a composite image based on the depth map, in which the composite image is in focus at a pixel at a depth corresponding to an input image of a corresponding reference image that is selected by a user from among the sequentially-displayed plurality of reference images and is out of focus at the other pixel, and the display unit displays the composite image generated by the composite image generating unit.

In the twenty-second invention, the user can browse the sequentially-displayed plurality of reference images and can select a reference image in which a desired subject is displayed with more intensity, so as to allow the device to generate the composite image based on the depth map, in which the composite image is in focus at a pixel at a depth corresponding to an input image of a corresponding reference image that is selected by a user from among the sequentially-displayed plurality of reference images and is out of focus at the other pixel, so as to view the generated composite image.

Further, a twenty-third invention may be the image processing device according to the twenty-second invention, further including:

a product image generating unit (the processing section 10 of FIG. 1) configured to generate product images of the respective plurality of input images (the images obtained by multiplying the plurality of input images with respective edge images in a pixel basis), in which the product images are generated by multiplying the plurality of input images with respective feature detected images (the edge images) obtained by detecting the feature by the feature detecting unit, wherein the display controlling unit controls the display unit to sequentially display the product images generated by the product image generating unit as the plurality of reference images.

In the twenty-third invention, product images are generated for the respective plurality of input images by multiplying the plurality of input images with the feature detected images obtained by detecting the feature, and the generated product images are sequentially displayed as the plurality of reference images. Therefore, the user can easily select a depth at which the image is in focus.

Further, a twenty-fourth invention may be the image processing device according to the seventeenth invention, wherein the composite image generating unit dynamically changes the specific depth according to a drag gesture on the touch panel so as to dynamically generate the composite image, and the display unit displays the composite image dynamically generated by the composite image generating unit along with the drag gesture.

In the twenty-fourth invention, it is possible to generate and display the composite image in real time according to a user drag gesture on the touch panel.

Further, a twenty-fifth invention may be the image processing device according to any one of the second to seventh inventions, further including:

an input section (the input section 20 of FIG. 1) to receive a user operation, wherein the depth estimating unit includes a depth re-estimating unit (the processing section 10 of FIG. 1) configured to re-estimate the depth of a pixel included in a designated area designated by the user operation, and the depth map generating unit includes a depth map regenerating unit (the processing section 10 of FIG. 1) configured to regenerate the depth map based on a re-estimation result from the depth re-estimating unit.

In the twenty-fifth invention, if the user finds an unnatural part in the image, he/she can designate the unnatural part. Then, the depth is re-estimated in the designated part, and the depth map in which the unnatural part is suitably corrected can be obtained based on the result of re-estimating the depth.

Further, a twenty-sixth invention may be the image processing device according to the twenty-fifth invention, wherein the depth re-estimating unit performs the proper solution processing to the pixel in the designated area so as to re-estimate the depth, in which at least one of the first parameter and the second parameter is set to a different parameter value from parameter values that are originally used in depth estimation by the depth estimating unit.

In the twenty-sixth invention, at least one of the first parameter and the second parameter is set to a different parameter value from the parameter values originally used in the depth estimation by the depth estimating unit, and the proper solution processing is re-performed to the pixels included in the designated area. Therefore, it is possible to correctly re-estimate the depth.

Further, another invention may be the image processing device, the composite image generating unit perform the blur processing to the all-in-focus image in such a manner that a degree of blur of the pixel specified by the pixel specifying unit is smaller than the predetermined degree of blur, or that a degree of blur of a pixel other than the pixel specified by a pixel specifying unit is larger than the predetermined degree of blur.

When the pixels at the depth to be emphasized are composited to the blurred all-in-focus image to which the blur processing is uniformly applied, an area having an unnatural pixel value, which looks like an outline, may occur around the border between an in-focus area and an out-of-focus area. To avoid this phenomenon, the blur processing is performed to the all-in-focus image in such a manner that a degree of blur of the pixel specified by the pixel specifying unit is smaller than the predetermined degree of blur, or that a degree of blur of a pixel other than the pixel specified by the pixel specifying unit is larger than the predetermined degree of blur. As a result, it becomes possible to avoid the phenomenon to obtain the suitable composite image.

Further, another invention may be the image processing device, further including:

a display controlling unit (e.g. the depth designating window W1 of FIG. 17) configured to control the display unit to display a depth designating window for a user designation of the specific depth at a predetermined position, wherein the specific depth is determined by the user designation that is performed on the depth designating window displayed on the display unit by means of the input unit.

In this invention, a depth designating window for a user designation of the specific depth is displayed at a predetermined position of the display unit. Then, the user designates the specific depth on the depth designating window displayed on the display unit by means of the input unit. Therefore, the user can designate a desired specific depth on the depth designating window. As a result, the emphasized image in which pixels at the specific depth are emphasized is generated and displayed on the display unit, and the user can view the composite image in which pixels at the selected depth are emphasized.

Further, another invention may be the image processing device, wherein the input unit includes a touch panel (the touch panel 21 of FIG. 1) that is integrally formed with the display unit, and the specific depth is determined according to a user tap gesture on the touch panel.

In this invention, the user can specifies the specific depth by a tap gesture on the touch panel.

Further, another invention may be the image processing device, wherein the user operation is a tap gesture, and the composite image generating unit selects the specific depth based on the designated area (e.g. Step D5 of FIG. 8), in which an area in an image tapped by the tap gesture is set to the designated area (Step D1 of FIG. 8).

In this invention, the user operation is a tap gesture, and the specific depth is selected based on the designated area, in which an area in an image tapped by the tap gesture is set to the designated area. Therefore, it becomes possible to select the specific depth from the tapped designated area in response to the user tap gesture, and to generate the composite image and to display it on the display unit.

Further, another invention may be the image processing device, further including:

a display controlling unit configured to control the display unit to display a display image that is any one of the all-in-focus image, an input image selected from the plurality of input images, the composite image and the depth map, wherein the display image is referable for the user designation of the specific depth by means of the input unit.

In this invention, the display controlling unit controls the display unit to display a display image that is any one of the all-in-focus image, an input image selected from the plurality of input images, the composite image and the depth map. Then, the user designates the specific depth based on the display image referably displayed on the display unit by means of the input unit. Therefore, the user can designate an area to be emphasized while viewing the display image.

Further, another invention may be
the image processing device,
wherein the composite image generating unit selects, as the specific depth, one of (1) a depth of a pixel closest to a center of the designated area, (2) a depth of a pixel having a deepest or shallowest depth in the depth map among pixels included in the designated area, (3) a depth of a pixel with a pixel value closest to an average pixel value of pixels included in the designated area and (4) a most common depth in pixels included in the designated area in the depth map.

In this invention, it is possible to generate the composite image by selecting, as the specific depth, one of (1) a depth of a pixel closest to a center of the designated area, (2) a depth of a pixel having a deepest or shallowest depth in the depth map among pixels included in the designated area, (3) a depth of a pixel with a pixel value closest to an average pixel value of pixels included in the designated area and (4) a most common depth in pixels included in the designated area in the depth map.

Further, another invention may be
the image processing device,
wherein the feature value detecting unit (the edge detecting section 107 of FIG. 1) includes an edge detecting unit configured to detect an edge as the feature of the plurality of input images,
the input unit includes a touch panel (the touch panel 21 of FIG. 1) that is integrally formed with the display unit,
the user operation is a drag gesture,
the image processing device further includes:
a depth selecting unit (the processing section 10 of FIG. 1) configured to select one depth according to the drag gesture (Step E5 of FIG. 9); and
a similarity calculating unit (the processing section 10 of FIG. 1) configured to calculate a similarity between a direction of the user drag gesture and a direction of the edge included in the designated area designated by the drag gesture in an input image at the depth selected by the depth selecting unit (Step E6 of FIG. 9), and
the depth re-estimating unit performs the score value processing to a pixel included in the designated area so as to re-estimate the depth, in which at least one of the first parameter and the second parameter is set to a different parameter value from the parameter values that are originally used in depth estimation by the depth estimating unit.

In this invention, the feature value detecting unit includes an edge detecting unit configured to detect an edge as the feature of the plurality of images. According to a user drag gesture on the touch panel, one depth is selected, and the similarity between the direction of the user drag gesture and the direction of the edge included in the designated area designated by the drag gesture in an input image at the selected depth. Then, the depth re-estimating unit performs the score value processing to a pixel included in the designated area, in which at least one of the first parameter and the second parameter is set to a different parameter value from the parameter values that are originally used in depth estimation by the depth estimating unit. Therefore, it is possible to suitably re-estimate the depth of the edge in the image.

BRIEF DESCRIPTION OF DRAWINGS

FIG. 2 illustrates an example of the data configuration of an image data set.

FIG. 3 illustrates an example of the table configuration of a penalty value table.

FIG. 22 (1) illustrates an example of a confirmation screen, FIG. 22 (2) illustrates an example of a guide sign, FIG. 22 (3) illustrates an example of the guide sign, and FIG. 22 (4) illustrates an example of the guide sign.

DESCRIPTION OF EMBODIMENTS

Hereinafter, a preferred embodiment of the present invention will be described with reference to the drawings. In this embodiment, the present invention is applied to a smartphone, which is a type of camera-equipped mobile phone, as the image processing device. However, it should be understood that the embodiments of the present invention are not limited to the embodiment described below.

Figure 1:
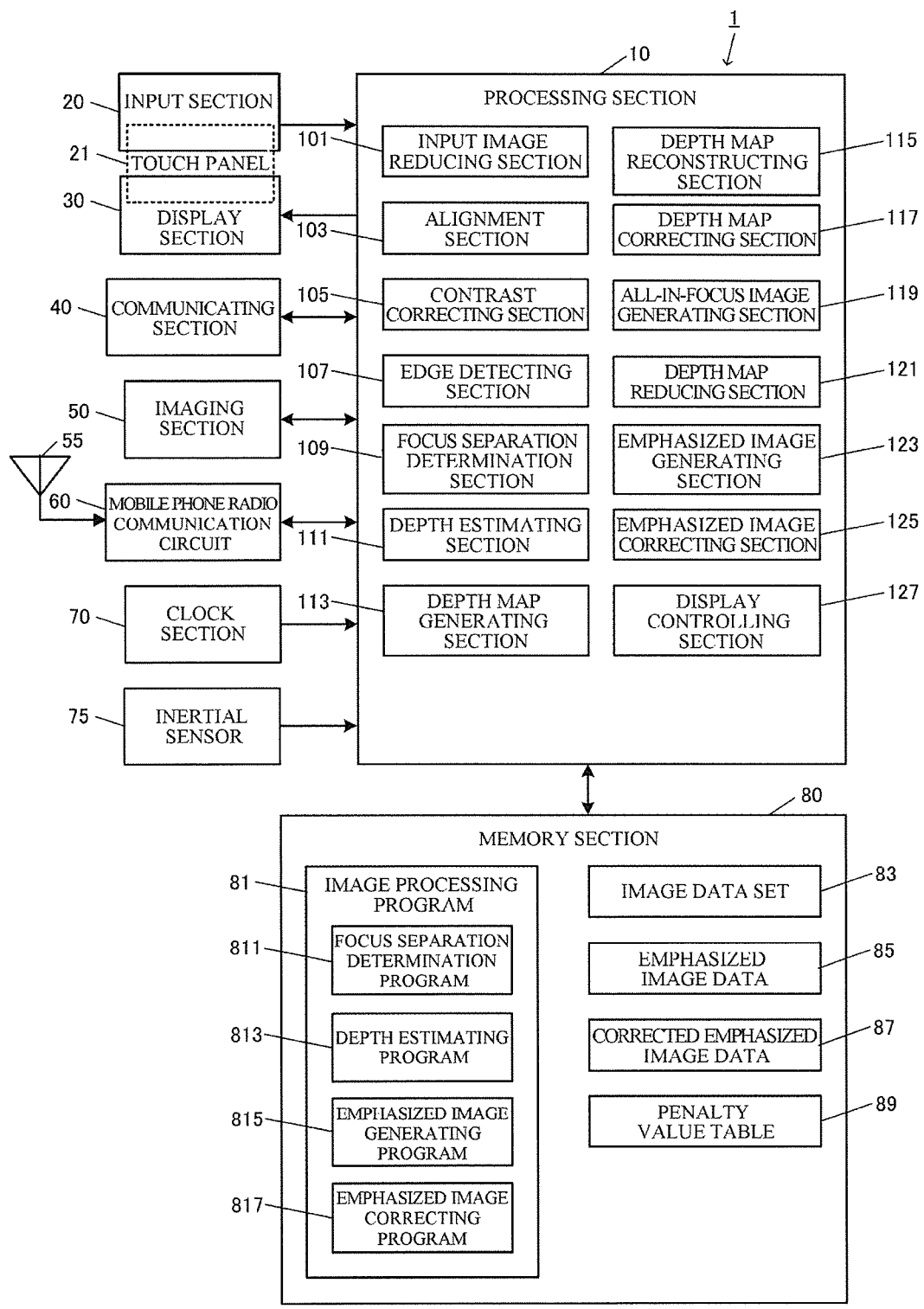
FIG. 1 is a block diagram illustrating an example of the functional configuration of a smartphone.

FIG. 1 is a block diagram illustrating an example of the functional configuration of a smartphone 1 according to this embodiment. The smartphone 1 includes a processing section 10, an input section 20, a display section 30, a communicating section 40, an imaging section 50, a mobile phone antenna 55, a mobile phone radio communication circuit 60, a clock section 70, an inertial sensor 75, and a memory section 80.

The processing section 10 is a processor that integrally controls the components of the smartphone 1 according to various programs stored in the memory section 80 such as a system program. The processing section 10 includes processors such as a CPU (central processing unit) and a DSP (digital signal processor).

In this embodiment, the processing section 10 includes, as major functional sections, an input image reducing section 101, an alignment section 103, a contrast correcting section 105, an edge detecting section 107, a focus separation determination section 109, a depth estimating section 111, a depth map generating section 113, a depth map reconstructing section 115, a depth map correcting section 117, an all-in-focus image generating section 119, a depth map reducing section 121, an emphasized image generating section 123, an emphasized image correcting section 125 and a display controlling section 127. However, it should be understood that these functional sections are merely described as an example, and the embodiment may include other functional sections as essential components.

The input section 20, which is an input device including a touch panel 21, outputs a detection signal corresponding to a user operation on the touch panel 21 to a processing section 10. The touch panel 21 serves as an input interface between a user and the smartphone 1.

In this embodiment, in response to the user selecting a camera function of the smartphone 1 through the input section 20, the user is allowed to select a mode from two modes, namely, a "photographing mode" and an "image browsing mode". Along with each mode, the user is allowed to further select a mode from two modes, namely, an "emphasized image generating mode" and an "emphasized image correcting mode".

The display section 30, which is a display device including an LCD (liquid crystal display) and the like, displays various information based on a display signal output from the processing section 10. The display section 30 displays a variety of images generated by image processing (described below) as well as time information and an icon for launching an application.

The communicating section 40 is a communicating device for transmitting and receiving information to be used in the device to and from an external image processing device (e.g. personal computer) in accordance with controls from the processing section 10. The communicating section 40 may use any of a variety of communication methods including wired connection via a cable compatible with a predetermined communication standard, connection via an intermediate device known as a cradle, which also serves as a charger, wireless connection using a near field communication technique, and the like.

The imaging section 50, which is an imaging device configured to photograph an arbitrary scene, includes an imaging element (semiconductor element) such as a CCD (charge coupled device) image sensor and a CMOS (complementary MOS) image sensor. The imaging section 50 focuses light emitted from a subject to be photographed on a light receiving surface of the imaging element by means of a lens (not shown) so as to convert the light intensity of the image into an electric signal. The generated electric signal is converted to a digital signal by an A/D (analog/digital) converter and is output to the processing section 10.

The display controlling section 127 controls the display section 30 so as to display a scene to be photographed by the user (confirmation screen, described below) based on the digital electric signal output from the imaging section 50. Then, in response to a user photographing operation (e.g. a tap gesture on a photographing button in the touch panel 21), the image signal output from the imaging section 50 is converted into an image data of a predetermined format (e.g. the JPEG format) and is stored in the memory section 80 as data of a photographed image. As used herein, a resultant image of the photographing by the imaging section 50 is referred to as a "photographed image".

The mobile phone antenna 55 is an antenna that transmits and receives a mobile phone radio signal to and from a radio base station built by a communication carrier of the smartphone 1.

The mobile phone radio communication circuit 60, which is composed of an RF converting circuit, a base band processing circuit and the like, performs modulation/demodulation of a mobile phone radio signal to enable calling, sending and reception of e-mails, and the like.

The clock section 70, which is an internal clock of the smartphone 1, includes, for example, a quartz oscillator composed of a quartz resonator and an oscillating circuit. A time acquired by the clock section 70 is constantly output to the processing unit 10.

The inertial sensor 75 detects inertial information of the smartphone 1. For example, it includes a triaxial acceleration sensor, a triaxial gyro sensor and the like, and outputs to the processing section 10, a triaxial acceleration vector and a triaxial angular velocity vector, which are detected in a three-dimensional local coordinate system based on the sensor.

The memory section 80 includes a memory device such as a ROM (read only memory), flash ROM and RAM (random access memory), stores a system program for the processing section 10 to control the smartphone 1, a variety of programs and data for executing a variety of application processings, and the like.

In this embodiment, with regard to programs, an image processing program 81 that is executed for image processing (see FIG. 3 and FIG. 4) is stored in the memory section 80. The image processing program 81 includes, as the subroutines, a focus separation determination program 811 that is executed for focus separation determination processing (see FIG. 5), a depth estimating program 813 that is executed for depth estimation processing (see FIG. 6), an emphasized image generating program 815 that is executed for emphasized image generation processing (see FIG. 7), and an emphasized image correcting program 817 that is executed for emphasized image correction processing (see FIG. 8). These processings are described in detail below with flowcharts.

As for data, the memory section 80 stores an image data set 83, emphasized image data 85, corrected emphasized image data 87 and a penalty value table 89.

The image data set 83 is composed of a variety of data that the processing section 10 uses for different image processing. An example of the data configuration is shown in FIG. 2. Each image data set 83 stores a combination of data relating to images of a certain scene photographed by the imaging section 50. Each image data set 83 includes a plurality of input image data 833, a reduced depth map data 835 that is generated based on the plurality of input image data 833, and an all-in-focus image data 837 that is generated based on the plurality of input image data 833 and the reduced depth map data 835.

Each of the plurality of input image data 833 is composed of an input image that is a photographed image taken by the imaging section 50 in one of different photographing settings of a camera (hereinafter referred to as "camera settings") such as focal length, focusing distance and aperture, and accompanying information relating to the input image. As the accompanying information of the input image of each input image data 833, a photographing date and time 833a, an image number 833b for identifying the image data individually and a reduced input image data 833c of the reduced input image are stored and associated with the input image data.

The photographing date 833a is stored and linked to the input image data 833 by the processing section 10 based on a time obtained by the clock section 70.

In this embodiment, the image number 833b is set by the processing section 10 according to a predetermined rule, and is stored and associated with the input image data 833.

For example, if the imaging section 50 performs photographing while initially bringing the focal plane to the nearest position and then gradually moving it further away, the focusing distance lengthens as the photographing time becomes later. Based on this rule, the processing section 10 assigns numbers in consecutive order starting from 1 to an input image as an image number 833b according to the photographing time 833a, thereby assigning smaller numbers to images with earlier photographing times. On the contrary, if the photographing is performed while initially bringing the focal plane to the furthermost position and then gradually moving the focal plane closer to the lens, the focusing distance shortens as the photographing time becomes later. Based on this rule, the processing section 10 assigns numbers in consecutive order starting from 1 to an input image as an image number 833b, thereby assigning smaller numbers to images with later photographing times. Alternatively, if the image names are automatically assigned according to the camera settings at the time of photographing (e.g. for an image with the file name "Image xx", the number "xx" increases as the focusing distance increases), the image numbers 833b may be assigned in the (ascending) order of the image names (Image-1, Image-2, Image-3 . . . ) of photographed images.

For another example, if the imaging section 50 puts the camera setting at the time of photographing in the input image as the meta data thereof, such as EXIF information, the image numbers 833b may be assigned according to the camera settings.

The reduced depth map data 835 is data of a reduced depth map that the depth map generating section 113 generates using the reduced input image. A depth map is map data that shows the depth of each pixel, in which each depth indicates which input image from a plurality of input images is in focus. In this embodiment, the depth estimation processing is performed on target pixels in order to estimate the depth of each pixel so as to indicate which of the plurality of input images is in focus. A depth map is generated based on the results of the depth estimation. In this embodiment, all pixels in an image are set as target pixels. However, it should be understood that the pixels included in a part of an image may be set as target pixels instead of all pixels in the image.

The all-in-focus image data 837 is data of an image in which every pixel has the pixel value of a pixel that is estimated to be in focus among the corresponding pixels of the plurality of input images, which are generated by the all-in-focus image generating section 119 using the depth map and the plurality of input images.

The plurality of input images and the all-in-focus image are encoded in, for example, a JPEG format, and are stored along with collateral EXIF information such as image number 831, photographing date and time 832, smartphone model, aperture number, focal length, focusing distance, pixel number and GPS information. In this regard, the reduced depth map data 835 may be stored as a part of the EXIF information as collateral data, which enables the memory section 80 to store it as a single JPEG file. Further, information used for generating the reduced depth map (e.g. reduction ratio) may also be included in the EXIF information. The image data set 83 is stored in a non-volatile memory (e.g. flash ROM).

Instead of including the reduced depth map in the EXIF information as collateral data, the reduced depth map may be encoded in the JPEG format and may be included in the image data set 83 along with the plurality of input images and the all-in-focus image. In this case, the information used for generating the reduced depth map (e.g. reduction ratio) may be included in the EXIF information of the encoded image data.

In this embodiment, the focus separation determination processing is performed to make a determination as to whether the focus of the plurality of input images is correctly isolated, and the input images with correctly isolated focus are used to generate the reduced depth map, which is also described in detail below. That is, an input image is not used for generating the reduced depth map if the focus is determined not to be correctly isolated. Accordingly, it is preferred that the EXIF information includes information indicating which of the plurality of input images is used for generating the reduced depth map. That is, the reduced depth map is associated with the information on the input images used to generate the reduced depth map. This makes it clear which of the plurality of input images is to be used for the subsequent processings that use the reduced depth map, such as generation of the all-in-focus image, generation of an emphasized image and correction of an emphasized image.

The emphasized image data 85 is data of an image that is generated by the emphasized image generating section 123 by emphasizing a certain part of the all-in-focus image and blurring the other part according to a user operation. The emphasized image data 85 may be stored in a volatile memory (e.g. RAM) as temporary data, or may be stored in a non-volatile memory (e.g. flash ROM) as a part of the image data set 83.

The corrected emphasized image data 87 is data of an image generated by the emphasized image correcting section 125 by correcting a part of the emphasized image according to a user operation. The corrected emphasized image data 87 may also be stored in a volatile memory (e.g. RAM) as temporary data, or may be stored in a non-volatile memory (e.g. flash ROM) as a part of the image data set 83.

The penalty value table 89 is a table of penalty values, which are a type of parameters used for score value processing, which is performed as a proper solution processing (described below) in the depth estimation processing by the depth estimating section 111. The penalty value table 89 is stored in advance in a non-volatile memory (e.g. ROM). In the score value processing, a cost value is calculated from the edge intensity of an edge image at the depth of the target pixel, and a score value is then calculated from the cost value and the penalty values as the output of a predetermined energy function. The penalty values are penalties that are imposed when there is a difference in the estimated in-focus input image between a target pixel and a neighboring pixel of the target pixel. In this embodiment, the cost value corresponds to the first parameter, and the penalty values correspond to the second parameter.

FIG. 3 illustrates an example of the table configuration of the penalty value table 89.

The penalty value table 89 defines a mode 891, and the first penalty values 893 and the second penalty values 895 that are associated to the mode 891.

The first penalty value 893 is a penalty value that is imposed when an estimated in-focus input image changes by "1" in the image number 833b at the target pixel and at the neighboring pixel. The second penalty value 895 is a penalty value that is imposed when an estimated in-focus input image changes by "2 or more" in the image number 833b at the target pixel and at the neighboring pixel. When the mode 891 is in a "normal state" the first penalty value 893 and the second penalty value 895 are set to "$P_1$" and "$P_2$" respectively, where "$P_1$"<"$P_2$".

When the mode 891 is in an "emphasized image correcting state", different penalty values are set when a user drag direction and an edge direction satisfy a predetermined similarity condition and when a user drag direction and an edge direction satisfy a predetermined dissimilarity condition. Specifically, in the former condition, the first penalty value 893 and the second penalty value 895 are set to "$P_1-\alpha$" and "$P_2-\alpha$" respectively. In the latter condition, the first penalty value 893 and the second penalty value 895 are set to "$P_1+\alpha$" and "$P_2+\alpha$" respectively. "$\alpha$" may be set to a suitable value, for example, "$\alpha=1$".

2-1. First Example
2-1-1. Processing Flow

Figure 4:
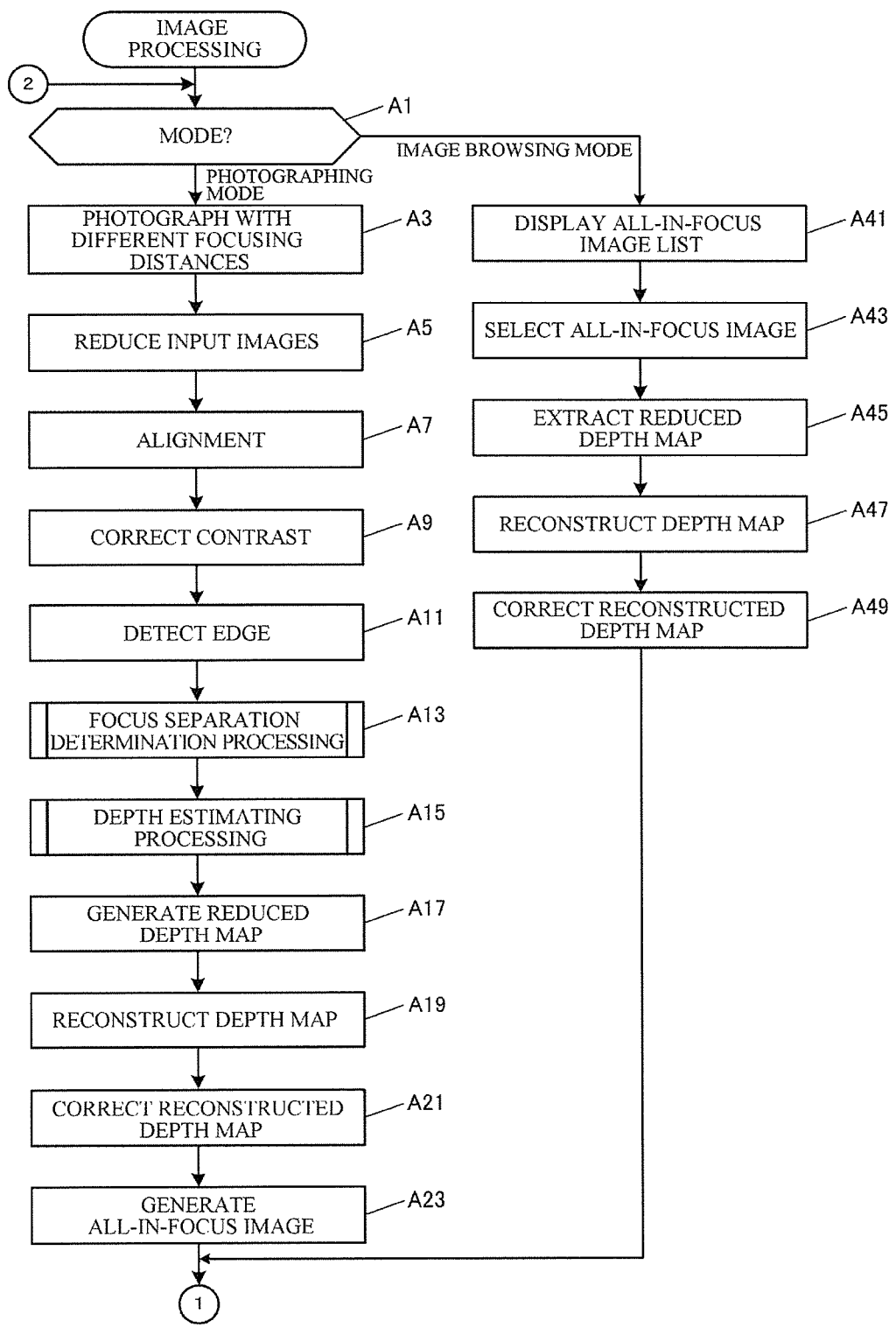
FIG. 4 is a flowchart illustrating an example of the flow of image processing.
Figure 5:
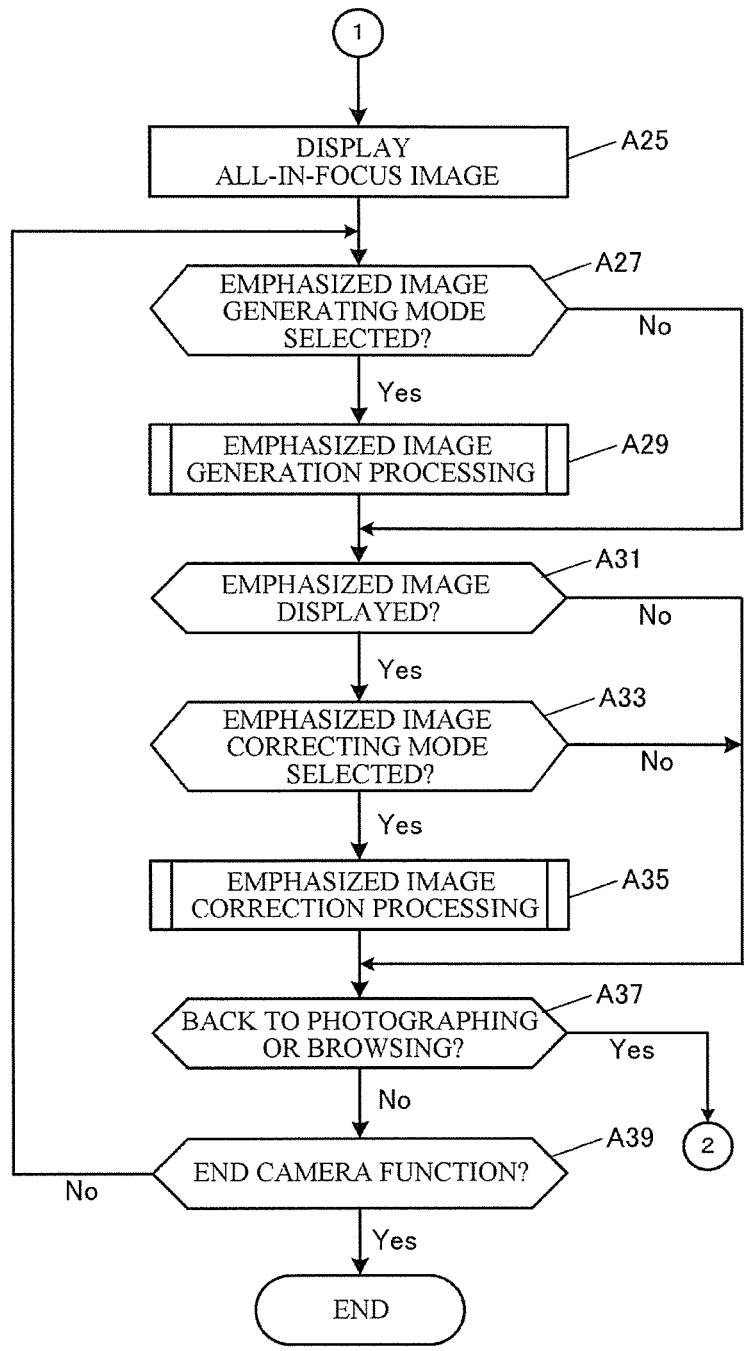
FIG. 5 is a flowchart illustrating the continuation of FIG. 4.

FIG. 4 and FIG. 5 are flowcharts of image processing that the processing section 10 executes according to the image processing program 81 stored in the memory section 80. This image processing is executed when the user selects the camera function of the smartphone 1.

In this example, the image processing is intended to generate and display the depth map, the all-in-focus image, the emphasized image and the corrected emphasized image by using the plurality of input images that are photographed, for example, with different focusing distances, which is implemented as a "photographing mode". It is also possible to take a photograph and to display it in a "normal photographing mode" in which a deep-focus image is taken without changing the focusing distance as in the camera function of conventional smartphones. However, the illustration and description of the processing for this function is omitted here.

First, the processing section 10 makes a determination as to which mode the user has selected through the input section 20 (Step A1). If "photographing mode" has been selected (Step A1; photographing mode), the processing section 10 controls the imaging section 50 to take a plurality of images of a same scene with different focusing distances in response to a shutter-releasing operation of the user (A3). For example, in response to a single shutter-releasing operation of the user, one image data set 83 on a certain scene is obtained.

Thereafter, the input image reducing section 101 performs input image reducing processing to reduce each of the plurality of input images by a predetermined reducing method (Step A5). In this regard, in order that as much of the image information of the original input images as possible is retained, the images are reduced, for example, by $\frac{1}{2^n}$ (where n is an integer of 1 or more) in length and width. The reduction of the input images may be carried out by a method known in the art, such as downsampling technique. The reduced input images are stored and associated with the respective original input images that are used for the reduction.

Thereafter, the alignment section 103 performs alignment processing to align the plurality of reduced input images stored in the memory section 80 (Step A7).

If the user takes the images while holding the smartphone 1 in his/her hand, i.e. the smartphone 1 is not in a stable state, such as a fixed state, it is highly probable that misalignment will occur between the input images. Such misalignment causes the deviated position of pixels to be output as in-focus or out-of-focus, which may result in a generated depth map with incorrect depth information. To avoid this, an alignment of the reduced input images is carried out. While a variety of techniques are applicable for the alignment processing, a known alignment technique using an optical flow may be used, for example. Such techniques include a block matching and a gradient method.

Next, the contrast correcting section 105 performs contrast correction processing (Step A9). During edge detection processing, which is described below, the problem of misaligned edges between the input images may be caused when detecting the edges due to the presence of a strong light in the photographic scene. To avoid this, contrast correction is performed on the brightness of the input images according a predetermined contrast correcting expression. In this regard, the contrast correction may be performed either on the whole area of the images or on a part of the images.

If contrast correction is performed on a part of the images, the possibility of blown-out highlights being generated must be considered. "Blown-out highlights" refers to an area with strong light irradiation that loses tone information and becomes pure white due to overexposure. The area with blown-out highlights (hereinafter referred to as "blown-out area") often has poor tone in the overall area and may cause incorrect detection of edges at edge detection.

To avoid this, a blown-out area is detected by a known technique, and the contrast is decreased locally in the detected blown-out area, preferably in an area slightly larger than the blown-out area. This processing can prevent edges from being detected at incorrect positions along the border of a blown-out area in the later edge detecting processing, which can reduce the influence of such edge deviation on the depth estimation and the depth map generation (described below).

The above-described blown-out highlights can also be avoided by HDR imaging, in which a plurality of images with different exposures are taken at a same scene, and the images are composited into a single image. The present applicant invented a technique for avoiding blown-out highlights using an exposure converting function. The details are disclosed in the description of WO 2013/054446. The exposure converting function is determined by defining the exposure converting function as "$y=a \cdot x^b$", and estimating the exposure converting parameters (a, b) in the exposure converting function by means of a least squares method and the like using sample data on the pixel values of an under-exposure input image. Then, the tone values of a target image are corrected with the determined exposure converting function, and the target image in which poor tone is eliminated is thus generated. Edge detection may be performed on the target image thus generated, which can reduce the influence of edge deviation on the depth estimation and the depth map generation (described below).

Next, the edge detecting section 107 performs edge detecting processing on the contrast corrected images obtained from the respective plurality of reduced input images by the contrast correction processing (Step A11). In this example, edges in the contrast corrected images are detected as a feature of the input images. In terms of a specific example of edge detecting processing, edge detection is carried out using the Laplacian filter. Instead of the Laplacian filter, any of the other edge detecting filters such as Sobel filter, Roberts filter, Forsen filter or range filter may be used. Alternatively, the contrast corrected images may be converted into frequency domain by the Fourier transform, and edges may be detected as a high frequency component by removing a low frequency component.

Next, the focus separation determination section 109 performs the focus separation determination processing according to the focus separation determination program 811 stored in the memory section 80 (Step A13).

Figure 6:
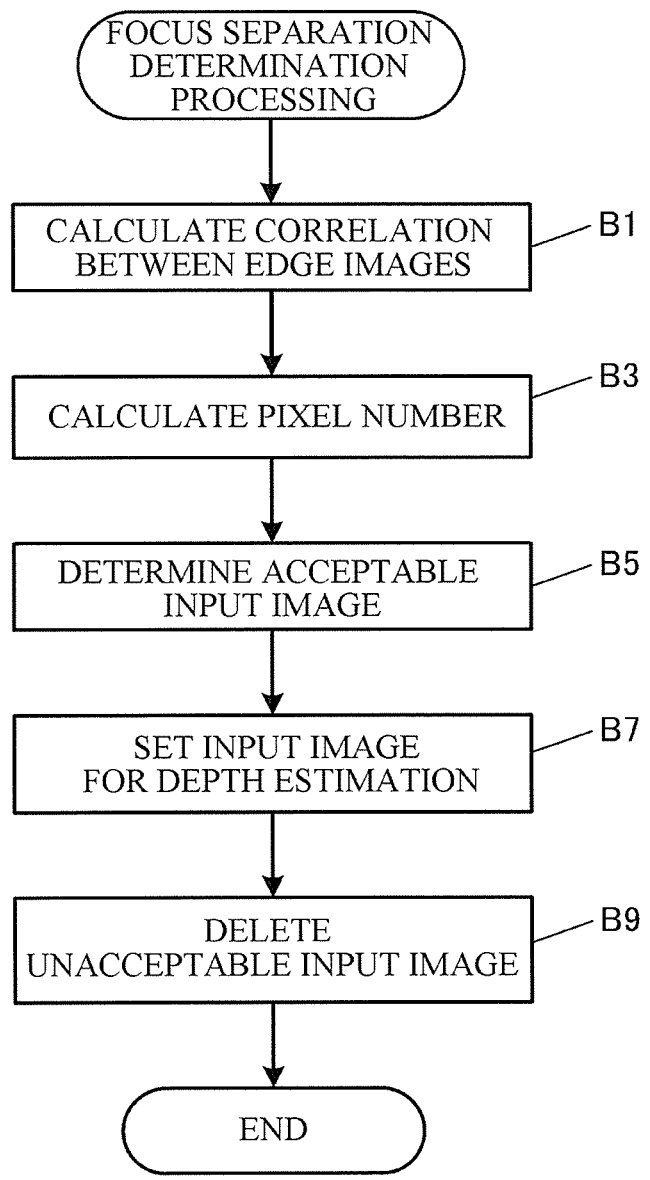
FIG. 6 is a flowchart illustrating an example of the flow of focus separation determination processing.

FIG. 6 is a flowchart illustrating the flow of the focus separation determination processing.

First, the focus separation determination section 109 calculates a correlation value between the edge images (Step B1). The correlation value can be determined by a correlation calculation that convolutes every pixel pair in two edge images. Then, the focus separation determination section 109 calculates the number of pixels that have an edge intensity greater than predetermined threshold intensity with respect to each edge image (Step B3).

Thereafter, the focus separation determination section 109 makes a determination as to which edge image satisfies a predetermined focus separation condition (Step B5). For example, the focus separation condition may be set such that the correlation value calculated in Step B1 is below a first threshold (first threshold condition) and the number of pixels calculated in Step B3 is equal to or greater than a second threshold (second threshold condition). That is, the focus separation condition may be set such that the correlation value satisfies a predetermined low threshold condition, and the number of pixels satisfies a predetermined high threshold condition.

The percentage of pixels that have an edge intensity greater than the predetermined threshold intensity may be calculated instead of the number of pixels that have an edge intensity greater than the predetermined threshold intensity. In this case, the focus separation condition may be set such that the correlation value is lower than the first threshold (first threshold condition), and the percentage of pixels that have an edge intensity greater than the predetermined threshold intensity is equal to or greater than a predetermined threshold (second threshold condition). That is, the focus separation condition may be set such that the correlation value satisfies a predetermined low threshold condition, and the percentage of pixels satisfies a predetermined high threshold condition.

Next, the input image corresponding to the edge image that is determined to have satisfied the focus separation condition is set by the focus separation determination section 109 as the input image to be used for the depth estimation (Step B7). Then, the focus separation determination section 109 deletes the input image that does not satisfy the focus separation condition (Step B9) and thereafter ends the focus separation determination processing.

The above processing may be configured to notice an error when there is an input image that does not satisfy the focus separation condition, so as to prompt the user to take images again. That is, the processing may be configured to allow the imaging section 50 to photograph a same scene with different focusing distances again.

Back to FIG. 4, after the focus separation determination processing is complete, the depth estimation section 111 performs the depth estimating processing according to the depth estimation program 813 stored in the memory section 80 (Step A15).

Figure 7:
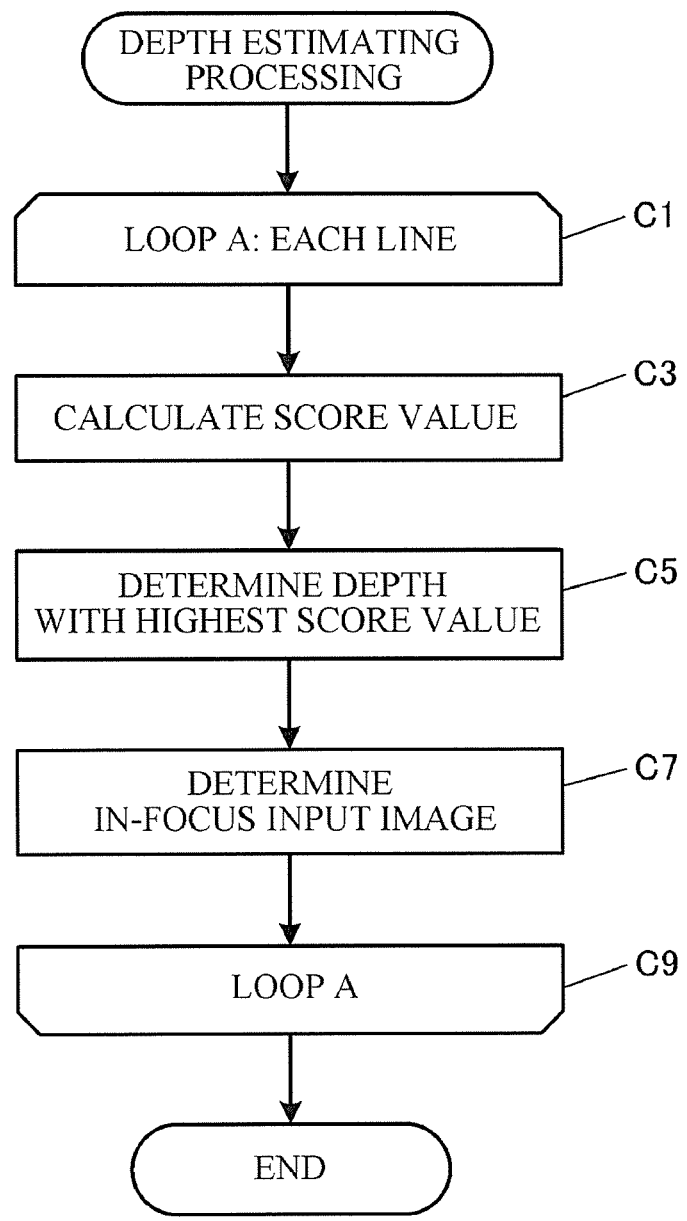
FIG. 7 is a flowchart illustrating an example of the flow of depth estimation processing.

FIG. 7 is a flowchart illustrating the flow of the depth estimation processing.

The depth estimation section 111 performs the processing of Loop A with respect to each line of the reduced input images (Step C1 to Step C9). In the processing of Loop A, the depth estimation section 111 performs proper solution processing on the pixels of each line based on an energy function (Step C3).

In the proper solution processing, score value processing is executed to calculate score values of the respective plurality of input images. Specifically, the score values are calculated with respect to each pixel of each input image based on an energy function. For a certain target pixel, a score value is calculated with respect to each input image from the cost value, which is determined according to the edge intensity of the input image at the same depth as the target pixel, and the penalty value, which is imposed when a first input image that is in focus at the target pixel is different from a second input image that is in focus at the neighboring pixel of the target pixel. Then, if the score value of an input image satisfies a predetermined high value condition, it is estimated that the input image is in focus.

The energy function used in this embodiment will be described.

As far as the present inventors know, the intensity of edges (edge intensity) in an edge image is correlated to the in-focus degree at the focusing distance. Accordingly, regarding a certain pixel, an input image with the highest edge intensity of the pixel is considered to be the most focused image among a plurality of input images. Based on this logic, a depth proper solution is obtained for each pixel based on the edge information so as to generate a depth map, which is a set of depth proper solutions. To generate the depth map from the edge images, the energy function of the following Expression (1) may be used, for example.

[Math. 1]

$$E(R) = -\sum_{p} C(p, R_p) - \sum_{q \in N_p} P_1(p)T[|R_p - R_q| = 1] - \sum_{q \in N_p} P_1(p)T[|R_p - R_q| > 1] \quad (1)$$

Where "p" and "q" are pixels (the coordinate of pixels), "$N_p$" is a predetermined neighboring area of the pixel p. The pixel q is a pixel in the predetermined neighboring area $N_p$ of the pixel p, i.e. a neighboring pixel of the pixel p.

"$R_x$" is the depth of a pixel x. For example "$R_x$" and the image numbers 833b of the input images are in one-to-one correspondence. As described above, the image numbers 833b are sequentially assigned from 1 based on a predetermined rule (e.g. the later the photographing time is, the longer or shorter the focusing distance becomes). In this case, since the image numbers 833b are in an ascending or descending order corresponding to the focusing distance, they can represent the depth of the input images.

"$C(p, R_x)$" is the cost value of the pixel p at the depth $R_x$, which is calculated as the reciprocal of the edge intensity. That is, the higher the edge intensity is, the lower the cost value becomes. T[ ] is a function that is "1" when the condition in the parentheses is satisfied and "0" when the condition is not satisfied.

"P(p)" is the penalty value of the pixel p. "$P_1$" is the first penalty value, which is the penalty value when the depth changes by 1, and "$P_2$" is the second penalty value, which is the penalty value when the depth changes by 2 or more. The first penalty value and the second penalty value are the penalty values in the "normal state" defined in the penalty table 89. As described above, "$P_1 < P_2$".

The energy function of Expression (1) is to obtain a proper solution for selecting the pixel value of the target pixel p or the neighboring pixel q from among the pixel values of the plurality of input images, wherein the most in-focus possible input image is selected for the target pixel p from among the plurality of input images, while the input image having the closest possible focusing distance is selected for the neighboring pixel q. At the proper solution, the score value, i.e. the value of this energy function, reaches the maximal value. Further, this energy function is designed to output the maximal value when the score value is determined according to the pixel values (brightness values) of the edge images, and an input image having the highest pixel value is then selected. This is shown as the cost value at the first term of the right hand side of Expression (1).

On the other hand, the energy function is configured such that if a different input image is selected for the neighboring pixel q of the target pixel p, the penalty value is imposed, i.e. a predetermined value is subtracted. This is shown as the penalty terms in the second and third terms on the right hand side of Expression (1). Specifically, if the first input image that is estimated in focus at the target pixel p is not identical to the second input image that is estimated in focus at the neighboring pixel q, a predetermined penalty value (the first penalty value and the second penalty value) is subtracted from the score value.

As described above, the second penalty value is defined as being larger than the first penalty value ($P_1 < P_2$). This means that the penalty value subtracted from the score value increases as the difference between the estimated depth "Rp" of the target pixel p and the estimated depth "Rq" of the neighboring pixel increases.

In this way, the energy function of Expression (1) is configured such that an input image providing a maximal possible pixel value is selected for the target pixel, while some restriction is applied to the selection of the neighboring pixel so that the input image selected can remain the same between the neighboring pixels as much as possible. By using the cost value, an input image with high edge intensity is more likely to be selected for each pixel as an in-focus input image, and it becomes possible to obtain a depth map that reflects the edge intensity. Further, by using the penalty values, irregularity of the estimated depth is reduced, and it becomes possible to obtain a smooth depth map in which the depth changes smoothly.

In principle, the input images taken by the imaging section 50 are different photographed images with different focusing distances. However, it is not a problem for the input images to include images with the same focusing distance. In this case, the penalty values may be configured to be "0" for input images with the same focusing distance in the above-described proper solution processing.

In this embodiment, to facilitate the calculation of the score value in the above-described proper solution processing, the dimension of the energy function of Expression (1) is converted into one-dimension so that the score value is calculated for every line of the input images and the proper depth solution is calculated. Converting the dimension of Expression (1) to one-dimension yields the following Expression (2).

[Math. 2]

$$L_r = -C(p,d) - \min(L_r(p-r,d), L_r(p-r,d\pm 1) + P_1(p), \min_i L_r(p-r,i) + P_2(p)) + \min(L_r(p-r,i)) \quad (2)$$

Where "$L_r$" is a penalty function for line r. "$L_r(p, d)$" is the cost value of pixel p on line r. "C(p, r)" is the cost value of pixel p with depth r.

In Step C3, score value calculating processing is executed based on the energy function of Expression (2) to calculate the score value for each pixel of the line. Then, the depth estimation section 111 determines the depth Rx where pixel x has the highest score value for each pixel of the line (Step C5). Then, the depth estimation section 111 determines that the input image having the image number 833b corresponding to the determined depth Rx is in focus at the pixel x (Step C7). Then, it advances the processing to the next line.

After all lines of the input images are subjected to the processing of Step C3 to Step C7, the depth estimation section 111 terminates the processing of Loop A (Step C9) to terminate the depth estimation processing.

Back to the image processing of FIG. 4, after the depth estimation processing is complete, the depth map generating section 113 performs reduced depth map generation processing (Step A17). Specifically, it generates a depth map in which a bit value corresponding to the estimated depth is allocated to each pixel of the reduced input images based on the results of the depth estimation processing. The depth map thus generated is used as a reduced depth map. The number of bits of the reduced depth map to be generated may be selected according to the number of input images to be used in the depth estimation processing. For example, if the number of input images is 3 or 4, the depth map may be drawn with 2 bits. If the number of input images is 5 to 8, the depth map may be drawn with 3 bits. The generated reduced depth map is stored as a part of the image data set 83 in the memory section 80 and is associated with the plurality of input images.

Next, a depth map reconstructing section 115 performs reduced depth map reconstruction processing (Step A19).

Specifically, it enlarges the reduced depth map to the original size by a predetermined reconstructing method. The depth map thus enlarged is used as a reconstructed depth map.

Next, the depth map correcting section 117 performs depth map correcting processing (Step A21). Specifically, the depth map correcting section 117 corrects the reconstructed depth map using a corrector image that is selected from among the plurality of input images. In this regard, for example, the input image with the focusing distance closest to the intermediate value may be selected from among the plurality of input images as the corrector image.

Alternatively, a composite image of two or more input images selected among from the plurality of input images may be used as the corrector image.

The depth map can be corrected by weighted mean processing using the pixel values of the corrector image. The weighted mean processing is represented by the following Expression (3).

[Math. 3]

$$D'(p) = \frac{\sum_{q \in N(p)} (G(p,q)W(I(P), I(q))D(q))}{\sum_{q \in N(p)} (G(p,q)W(I(P), I(q)))} \quad (3)$$

Where "p" is a correction target pixel, and "q" is a neighboring pixel that is located near the correction target pixel. "G(p, q)" is a function that outputs a higher value as the distance between the correction target pixel p and the neighboring pixel q reduces, and it is, for example, a gauss function. Further, "I(p)" is the brightness value of the corrector image at the corrector target pixel p, and "I(q)" is the brightness value of the corrector image at the neighboring pixel q. "W(I(p), I(q))" is a function that outputs a higher value as the brightness values "I(p)" and "I(q)" become closer to each other. "D(q)" is the value of the depth map at the neighboring pixel q, and "D'(p)" is the corrected value of the depth map at the correction target pixel p obtained by the weighted average processing. The corrected depth map thus obtained is used as the depth map in the following processing.

To reduce the processing load of the weighted average processing of Expression (3), the weighted average processing may be performed according to the following Expression (4) using a quantization code, although a detailed description for the principle is omitted here.

[Math. 4]

$$D'_{code_i}(p) = \frac{\sum_{q \in N(p)} (G(p,q)W(code_i, I(q))D(q))}{\sum_{q \in N(p)} (G(p,q)W(code_i, I(q)))} \quad (4)$$

Next, the all-in-focus image generating section 119 performs all-in-focus image generation processing (Step A23). Specifically, pixel values are selected and extracted from the plurality of input images based on the depth map corrected in Step A21 so as to generate the all-in-focus image in which every pixel has the pixel value of an input image having a high in-focus degree at the pixel. The generated all-in-focus image data 837 is stored as a part of the image data set 83 in the memory section 80 and is associated with the input image data 833 and the reduced depth map 835.

Proceeding to FIG. 5, the display controlling section 127 controls the display section 30 in order to display the all-in-focus image (Step A25). Thereafter, the processing section 10 makes a determination as to whether the user has selected an "emphasized image generating mode" through the input section 20 (step A27). If it determines the mode has been selected (Step A27, Yes), the emphasized image generating section 123 performs the emphasized image generation processing according to the emphasized image generating program 815 stored in the memory section 80 (Step A29).

Figure 8:
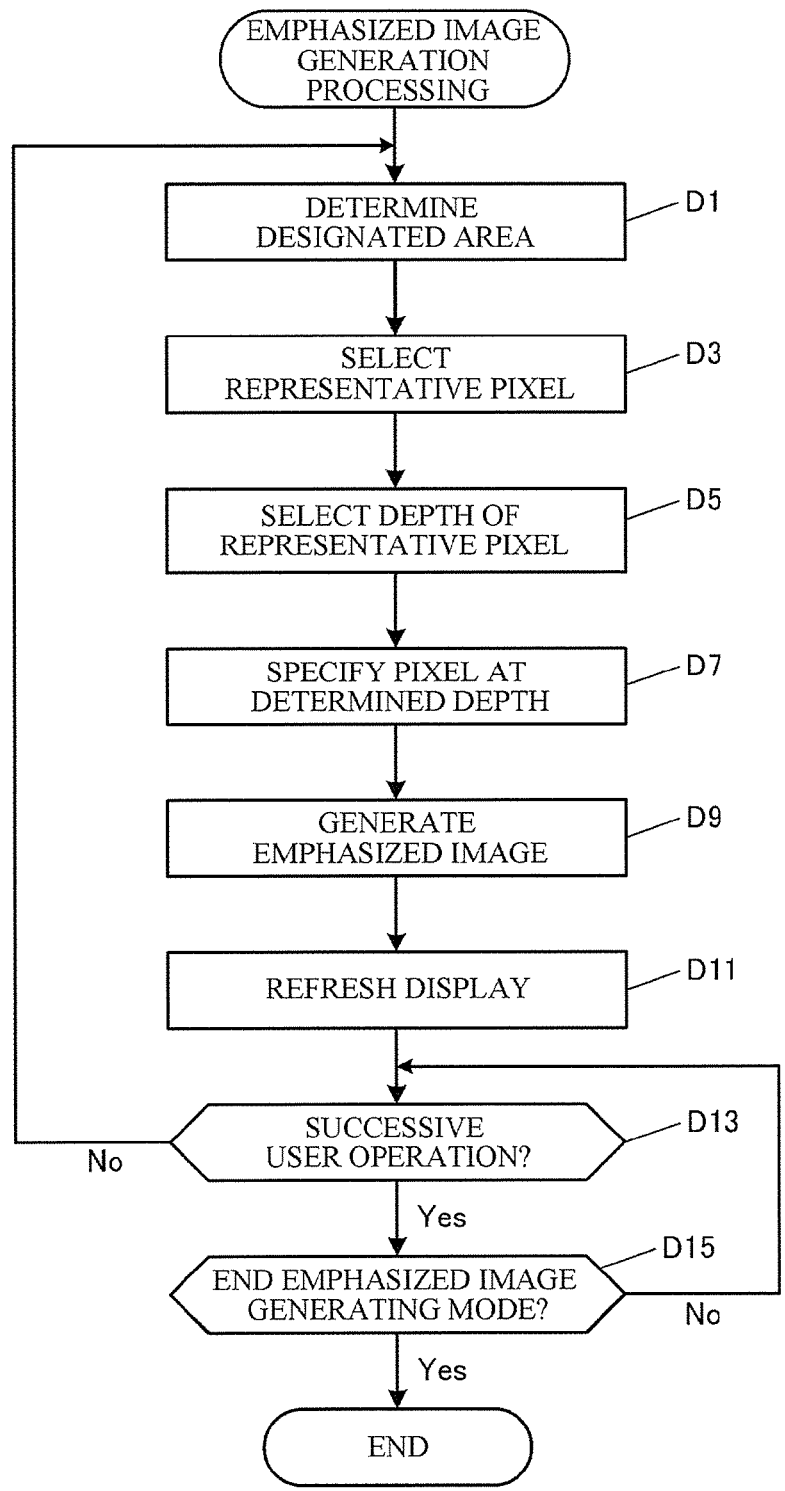
FIG. 8 is a flowchart illustrating an example of the flow of emphasized image generation processing.

FIG. 8 is a flowchart illustrating the flow of the emphasized image generation processing.

The emphasized image generating section 123 determines a designated area according to a user operation (Step D1). Specifically, it specifies a tapped area on the touch panel 21 and determines the tapped area as the designated area. Thereafter, the emphasized image generating section 123 selects a representative pixel from among those in the designated area (Step D3).

Since the point tapped by the user has a certain area, it corresponds to not one but a plurality of coordinates. Accordingly, a plurality of pixel values can be extracted, and it is impossible to determine a unique focusing distance to be emphasized (to be kept in-focus). To cope with this problem, in this example, a representative pixel is selected from those in the designated area instead of extracting a plurality of pixel values.

In this example, to select the representative pixel, any one of (1) the pixel closest to the center of the designated area, (2) the pixel having the deepest or shallowest depth in the depth map among the pixels included in the designated area and (3) the pixel with the pixel value closest to the average of the pixel values of the pixels included in the designated area may be selected as the representative pixel.

Thereafter, the emphasized image generating section 123 selects the depth of the representative pixel based on the depth map (Step D5). That is, it determines the value of the depth associated with the selected representative pixel in the depth map and selects the determined depth.

Instead of selecting the representative pixel and then selecting the depth of the representative pixel, it is also possible to select one depth by using the depth map without selecting the representative pixel. Specifically, Step D3 is omitted, and (4) the depth of most pixels within the designated area in the depth map may be selected in Step D5, for example.

Next, the emphasized image generating section 123 specifies the pixels that have the depth selected in Step D5 based on the depth map (Step D7). That is, it makes a determination as to which pixels have the same depth as the depth determined in Step D5 based on the bit values of the depth map that represent the depth of the respective pixels.

Thereafter, the emphasized image generating section 123 generates the emphasized image (Step D9). Specifically, blurring processing is performed on the entire all-in-focus image at a predetermined blur level using a blur filter. A known filter such as Gaussian filter, for example, may be used as the blur filter. Then, the pixel values of the pixels specified in Step D7 are composited to the blurred image obtained by the blurring processing. The resultant image thus obtained is the emphasized image (composite image). Then, the display controlling section 127 updates the display of the display section 30 with the generated emphasized image (Step D11).

When the pixels at the focusing distance to be emphasized are composited to the all-in-focus image to which the blur filter is uniformly applied, an area having an unnatural pixel value, which looks like an outline, may occur around the border between an in-focus area and an out-of-focus area. This phenomenon occurs because pixels at the focusing distance to be emphasized affect the other pixels near the border of a subject in a photographic scene although they are at the focusing distance not to be emphasized. To avoid this phenomenon, weights are assigned to the pixels not to be emphasized when the blur filter is applied to the all-in-focus image and the composition is performed. Specifically, the blur processing is performed such that the image part other than the pixels specified in Step D7 in the all-in-focus image is blurred to a higher blur level than the above-described predetermined described blur level.

Instead of the processing above, the blur processing may be performed such that the pixels specified in Step D7 in the all-in-focus image are blurred to a lower blur level than the above-described predetermined blur level.

Next, the emphasized image generating section 123 makes a determination as to whether there has been a successive user operation (Step D13). If it is determined there has been a successive user operation (Step D13, Yes), the emphasized image generating section 123 returns the processing to Step D1. This user operation can be a drag gesture of the user from the tapped position or another tap gesture of the user at a different point. That is, if the user performs a drag gesture, the representative pixel is dynamically selected following a change of the designated area according to the drag gesture, and the depth of the representative pixel is dynamically determined based on the depth map. Then, based on the depth that is dynamically determined following a change of the designated area according to the drag gesture, the emphasized image generating section 123 dynamically generates the composite image according to the representative pixel, and the display control section 129 controls the display 30 to dynamically display the dynamically generated composite image along with the drag gesture.

In Step D13, if it is determined that there has been no successive user operation (Step D13, No), the emphasized image generating section 123 makes a determination as to whether to terminate the emphasized image generating mode according to a user operation (Step D15). If it is determined not to terminate the mode (Step D15, No), the processing returns to Step D13. If it is determined to terminate the mode (Step D15, Yes), the emphasized image generation processing is terminated.

Back to FIG. 5, after the emphasized image generation processing is complete, the processing section 10 makes a determination as to whether the display section 30 is displaying the emphasized image (Step A31). If it is determined that the image is being displayed (Step A31, Yes), the processing section 10 makes a determination as to whether the user has selected the "emphasized image correcting mode" through the input section 20 (Step A33). Then, if it is determined that the mode has been selected (Step A33, Yes), the emphasized image correcting section 125 performs the emphasizing image correction processing according to the emphasized image correcting program 817 stored in the memory section 80 (Step A35).

Figure 9:
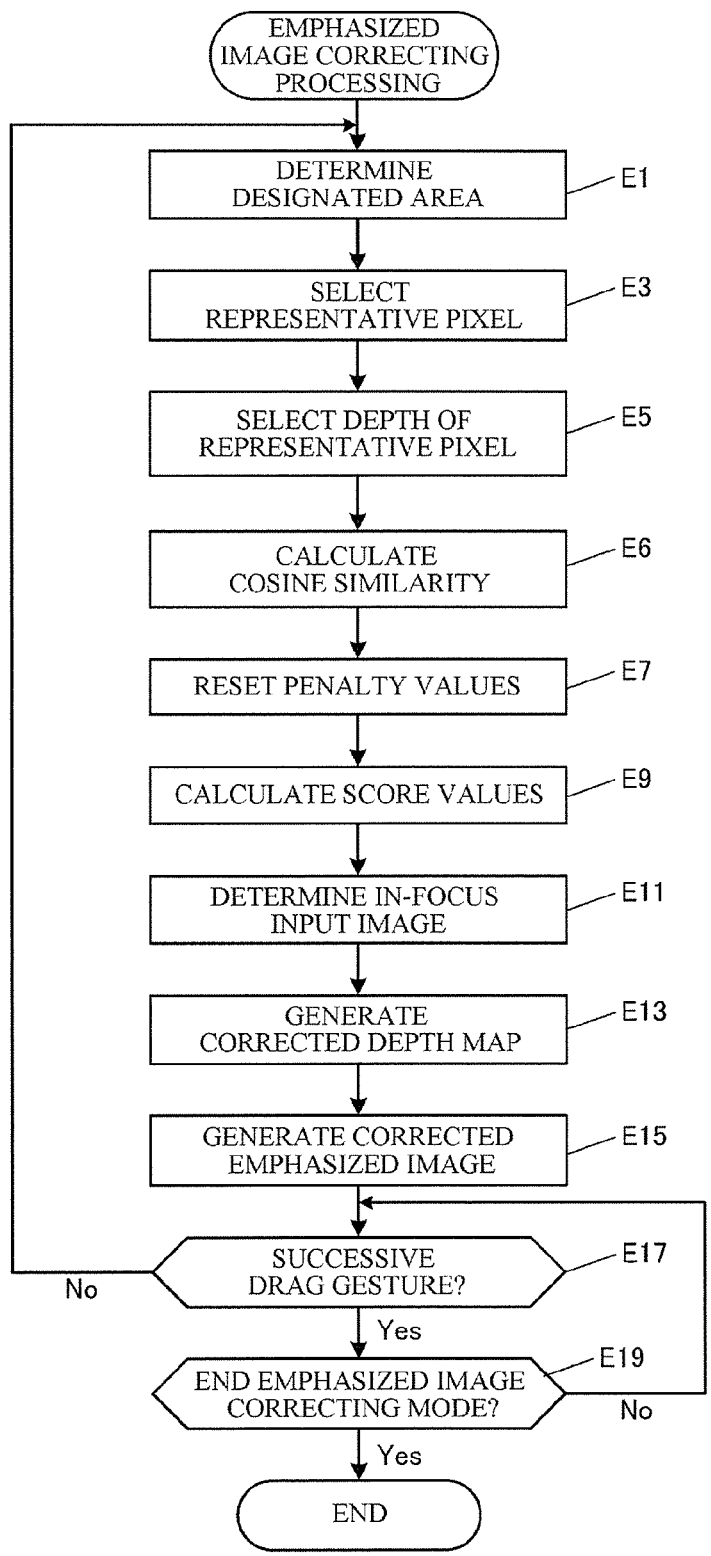
FIG. 9 is a flowchart illustrating an example of the flow of emphasized image correction processing.

FIG. 9 is a flowchart illustrating the flow of the emphasized image correction processing.

The emphasized image correcting section 125 sets the area specified by a drag gesture of the user through the touch panel 21 to a designated area (Step E1). Then, the emphasized image correcting section 125 selects a representative pixel from the pixels in the designated area (Step E3). The representative pixel may be selected by the same method as when selecting the representative pixel in Step D3 of the emphasized image generation processing of FIG. 8.

Next, the emphasized image correcting section 125 selects the depth of the representative pixel based on the depth map (Step E5). That is, it makes a determination as to which depth the selected representative pixel is associated with, and selects the determined depth.

Thereafter, the emphasized image correcting section 125 calculates a cosine similarity, which is an index representing the relative relation between the direction of a user's drag gesture and the direction of an edge in the representative area of the input image at the depth selected in Step E5 (Step E6). The cosine similarity, which is a technique to calculate similarity in a vector space model, is an index representing the similarity of angle between vectors. If the value of the cosine similarity is close to "1", it means the vectors are similar to each other. If the value is close to "0", it means the vectors are not similar to each other. Instead of the cosine similarity, a cosine distance between the drag direction and the edge direction may be calculated.

The emphasized image correcting section 125 sets the penalty values for the pixels in the designated area based on the cosine similarity calculated in Step E5. Specifically, if the cosine similarity is greater than a predetermined threshold (e.g. 0.7), it is determined that the drag direction and the edge direction satisfy a similarity condition, and the penalty values are set to the values defined in the penalty table 89 (the first and second penalty values are set to "$P_1$-$\alpha$" and "$P_2$-$\alpha$" respectively). If the cosine similarity is equal to or less than the threshold, it is determined that the drag direction and the edge direction satisfy a dissimilarity condition, and the penalty values are set to the values defined in the penalty value table 89 (the first and second penalty values are set to "$P_1$+$\alpha$" and "$P_2$+$\alpha$" respectively).

As a result, if the drag direction and the edge direction satisfy the similarity condition (e.g. the drag direction and the edge direction are parallel to each other), the penalty value becomes lower than in the normal state, i.e. the penalty for the depth difference between the target pixel and the neighboring pixel of the target pixel becomes low. As a result, this extends the latitude of selectable in-focus input images for the pixels in the designated area, and increases the possibility that the input images are selected from those within a wider range of depth, which eventually produces an effect of enhancing (emphasizing) the edge part.

In contrast, if the drag direction and the edge direction satisfy the dissimilarity condition (e.g. the drag direction and the edge direction are orthogonal to each other), the penalty value becomes higher than in the normal state, i.e. the penalty for the depth difference between the target pixel and the neighboring pixel of the target pixel becomes high. As a result, this narrows the latitude of selectable in-focus input images for the pixels in the designated area, and strictly limits the range of the depth of selectable input images, which eventually produces an effect of weakening (erasing) the edge part.

In the above-described processing, the penalty values become lower than in the normal state if the drag direction and the edge direction satisfy the similarity condition. Instead, the penalty values may retain the same values as in the normal state if the drag direction and the edge direction satisfy the similarity condition. In this case, the depth map generated in the normal state is maintained, and edge information that is similar to the drag direction is maintained.

Next, the emphasized image correcting section 125 performs the score value processing based on the energy function of Expression (1) on the pixels in the designated area (Step E9). Then, for each pixel in the designated area, the emphasized image correcting section 125 determines the input image having the highest score value to be an in-focus input image (Step E11).

Thereafter, the emphasized image correcting section 125 performs corrected depth map generation processing (Step E13). Specifically, based on the determination result of Step E11, it generates a depth map in which a bit value corresponding to the input image that is determined to be in focus is allocated to each pixel of an input image. The depth map thus generated is used as the corrected depth map.

Thereafter, the emphasized image correcting section 125 performs corrected emphasized image generation processing (Step E15). Specifically, it generates an emphasized image in which the pixel values in the designated area are corrected using the corrected depth map generated in Step E13.

Next, the emphasized image correcting section 125 makes a determination as to whether the user has successively performed a drag gesture (Step E17). If there has been a drag gesture (Step E17, Yes), the emphasized image correcting section 125 returns the processing to Step E1. If there has been no drag gesture (Step E17, No), the emphasized image correcting section 125 makes a determination as to whether the user has performed an operation to terminate the emphasized image correction mode (Step E19).

If it is determined that the operation to terminate the emphasized image correction mode has not been performed (Step E19, No), the emphasized image correcting section 125 returns the processing to Step E17. If it is determined that the operation to terminate the emphasized image correction mode has been performed (Step E19, Yes), the emphasized image correcting section 125 terminates the emphasized image correction processing.

Back to FIG. 5, after the emphasized image correcting processing is complete, the processing section 10 makes a determination as to whether the user has selected a photographing mode or an image browsing mode through the input section 20 (Step A37). If it is determined that one of the modes has been selected (Step A37, Yes), the processing section 10 returns the processing to Step A1. If it is determined that no mode has been selected (Step A37, Yes), the processing section 10 makes a determination as to whether the user has performed an operation to terminate the camera function through the input section 20 (Step A39).

If it is determined that the operation to terminate the camera function has not been performed (Step A39, No), the processing section 10 returns the processing to Step A27. If it is determined that the operation to terminate the camera function has been performed (Step A39, Yes), the processing section 10 terminates the image processing.

On the other hand, in Step A1, if it is determined that the user has selected the "image browsing mode" (Step A1, image browsing mode), the image controlling section 127 controls the display section 30 to display a list of all-in-focus images in the image data sets 83 stored in the memory section 80 (Step A41). Then, the processing section 10 selects one all-in-focus image from among the listed all-in-focus images according to a user operation on the input section 20 (Step A43).

Next, the processing section 10 extracts the reduced depth map that is associated with the all-in-focus image selected in Step A43, which is stored as a part of the image data set 83 (Step A45). Then, the depth map reconstructing section 115 performs reduced depth map reconstruction processing to reconstruct the extracted reduced depth map (Step A47). The reduced depth map stored as a part of the image data set 83 is reconstructed to the original size because it cannot be used as the depth map while it is reduced in size.

In this regard, a problem with the reconstructed depth map, which is obtained by reconstructing the reduced depth map, is that the reconstruction process causes misalignment with the all-in-focus image at the edge parts. If the above-described emphasized image generation processing is performed under this condition, a subject to be emphasized is not precisely emphasized, and a part of the background may be included in the in-focus area, or a part of the target subject is included in the out-of-focus area. For this reason, the reconstructed depth map, which is obtained by the reconstruction, is not appropriate to be used as the depth map unless it is changed. To cope with this problem, the depth map correcting section 117 performs depth map correcting processing to correct the reconstructed depth map (step A49).

Specifically, the depth map correcting section 117 reads out the all-in-focus image that is stored and associated with the reduced depth map extracted in Step A49, and performs weighted average processing using the all-in-focus image as a corrector image so as to correct the reconstructed depth map. This weighted average processing may be carried out using the same expression as the above-described Expression (3).

In Expression (3) of this case, "p" is a correction target pixel, and "q" is a neighboring pixel that is located near the correction target pixel. "G(p, q)" is a function, such as a gauss function, that outputs a higher value as the distance between the correction target pixel p and the neighboring pixel q reduces. Further, "I(p)" is the brightness value of the all-in-focus image at the corrector target pixel p, and "I(q)" is the brightness value of the all-in-focus image at the neighboring pixel q. "W(I(p), I(q))" is a function that outputs a higher value as the brightness values "I(p)" and "I(q)" become closer to each other. "D(q)" is the value of the depth map at the neighboring pixel q, and "D'(p)" is the corrected value of the depth map at the correction target pixel p obtained by the weighted average processing. The corrected depth map thus obtained is used for the following processing as the depth map.

Rather than using the all-in-focus image as the corrector image, an input image selected from among the plurality of input images may be used to correct the reconstructed depth. Also in this case, for example, the input image with the focusing distance closest to the intermediate value may be selected from among the plurality of input images as the corrector image. Alternatively, a composite image of two or more input images selected from among the plurality of input images may be used as the corrector image to correct the reconstructed depth map.

After the reconstructed depth map correction processing is complete in Step A49, the processing section 10 advances the process to Step A25. That is, the display controlling section 127 controls the display section 30 to display the all-in-focus image selected in Step A43. Thereafter, the same steps are performed.

2-1-2. Experimental Result

Next, an experimental test is conducted for the above-described processing using an actual image, and the result thereof is described.

Figure 10:
FIG. 10 (1) is an example of an input image, FIG. 10 (2) is an example of an input image, FIG. 10 (3) is an example of an edge image, and FIG. 10 (4) is an example of an edge image.
Figure 10:
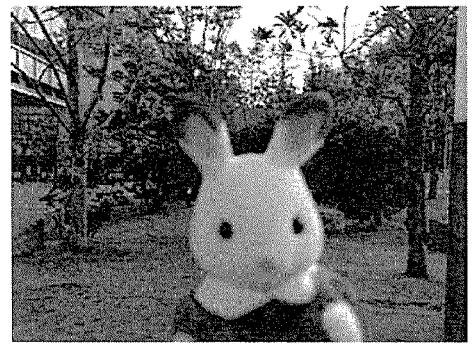
Figure 10:
Figure 10:
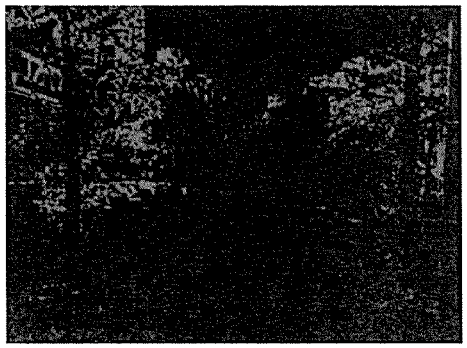

FIG. 10 (1) to FIG. 10 (4) illustrate two images of the same scene that are taken with different focusing distances.

FIG. 10 (1) is an input image that is taken when the camera is focused on the stuffed rabbit, i.e. the foreground, and FIG. 10 (2) is an input image that is taken when the camera is focused on the trees, i.e. the background.

FIG. 10 (3) and FIG. 10 (4) are edge images that are obtained by performing the alignment processing and the contrast correction processing on the input images, and thereafter performing the edge detection processing on them. FIG. 10 (3) is an edge image obtained by performing the edge detection processing on the input image of FIG. 10 (1), in which the contour of the stuffed rabbit is detected as an edge because the image was taken when the camera was focused on the stuffed rabbit. In contrast, FIG. 10 (4) is an edge image obtained by performing the edge detection processing on the input image of FIG. 10 (2), in which edges are detected in the trees in the background because the image was taken when the camera was focused on the trees in the background.

Figure 11:
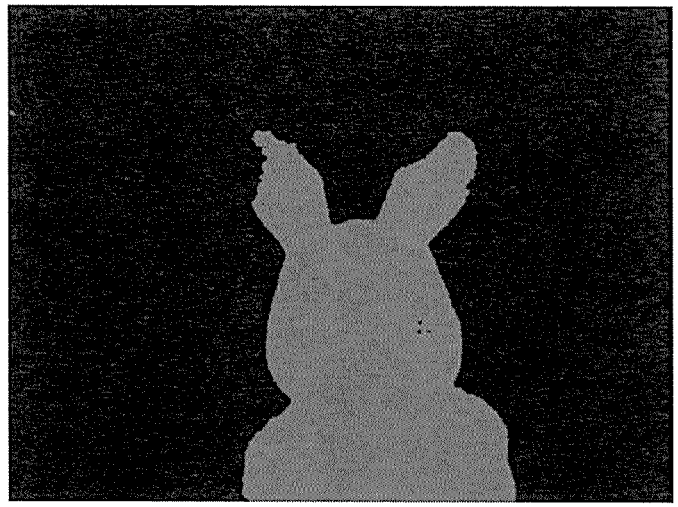
FIG. 11 (1) is an example of a depth map, and FIG. 11 (2) is an example of an all-in-focus image.
Figure 11:
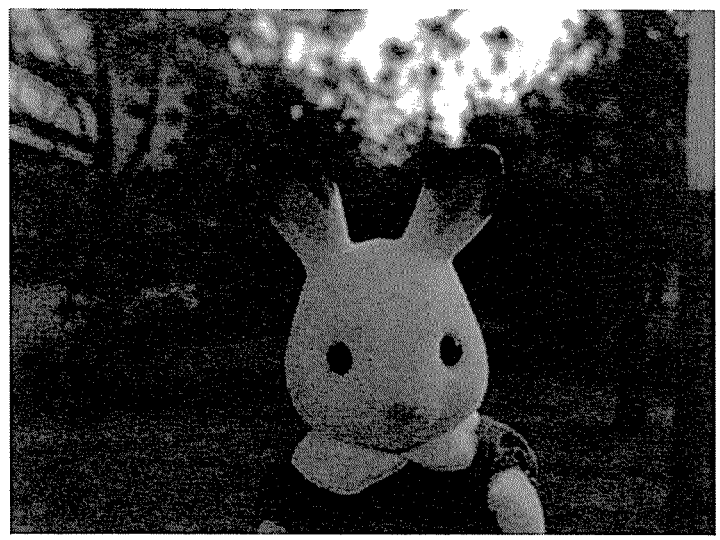

FIG. 11 (1) is a depth map that is generated by performing the proper solution processing on the two edge images of FIG. 10 (3) and FIG. 10 (4). Since the number of input images is two, the depth map is represented by 1 bit. As can be seen in this figure, the area of the stuffed rabbit in the foreground is correctly separated from the area of the trees in the background.

FIG. 11 (2) is an all-in-focus image generated from the depth map of FIG. 11 (1) and the two input images. As can be seen in this figure, in the generated all-in-focus image, both the stuffed rabbit in the foreground and the trees in the background are in focus.

Figure 12:
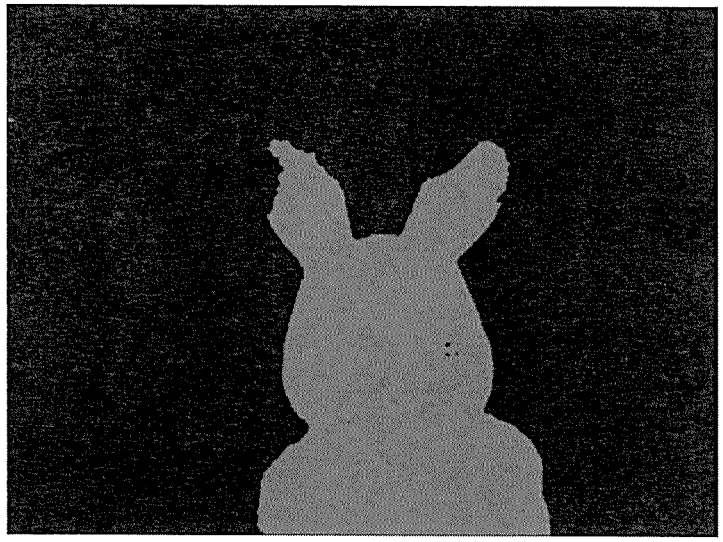
FIG. 12 (1) is an example of a reconstructed depth map, and FIG. 12 (2) is an example of a corrected depth map.
Figure 12:

FIG. 12 (1) illustrates a reconstructed depth map that is reconstructed using depth map reconstruction processing, and FIG. 12 (2) illustrates a corrected depth map that is generated using depth map correction processing. As can be seen in the figures, performing the weighted average processing on the reconstructed depth map using a selected input image results in a corrected depth map that has a clear border between the stuffed rabbit in the foreground and trees in the background.

Figure 13:
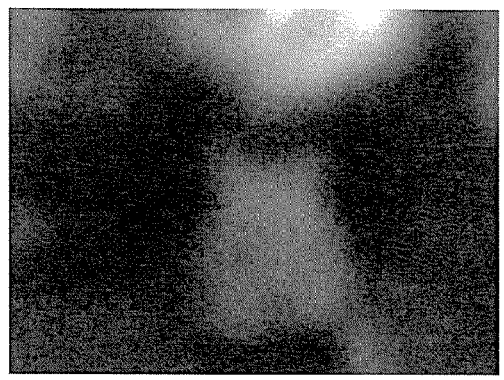
FIG. 13 (1) is an example of a blur image of an all-in-focus image, FIG. 13 (2) is an example of an emphasized image, FIG. 13 (3) is an example of a blur image, and FIG. 13 (4) is an example of an emphasized image.
Figure 13:
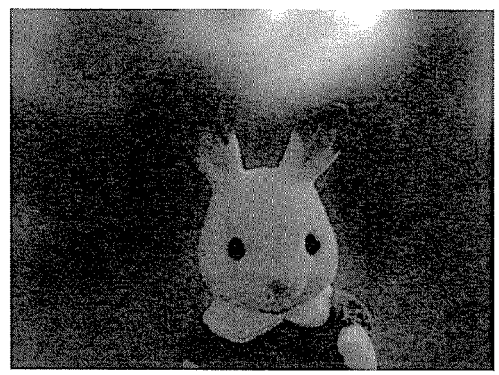
Figure 13:
Figure 13:

FIG. 13 (1) to FIG. 13 (4) illustrate the results of generating emphasized images using emphasized image generation processing. FIG. 13 (1) illustrates the result of uniformly applying the blur processing to the whole all-in-focus image, and FIG. 13 (2) illustrates the result of compositing the area of the stuffed rabbit in the foreground onto the blur image of FIG. 13 (1) to emphasize it.

As can be seen in FIG. 13 (2), there is an unnatural area (like halation) around the stuffed rabbit. This phenomenon occurs because the pixels to be emphasized affect other pixels around the border between the stuffed rabbit and the trees in the background, even though pixels at their depth should not be emphasized. FIG. 13 (3) illustrates the result of applying the blur processing to the all-in-focus image where the area of the stuffed rabbit in the foreground is less weighted. Further, FIG. 13 (4) illustrates the result of compositing the area of the stuffed rabbit in the foreground onto the blur image of FIG. 13 (3) to emphasize it. As can be seen in the figure, the unnatural area, which occurs around the stuffed rabbit in FIG. 13 (2), is eliminated.

Figure 14:
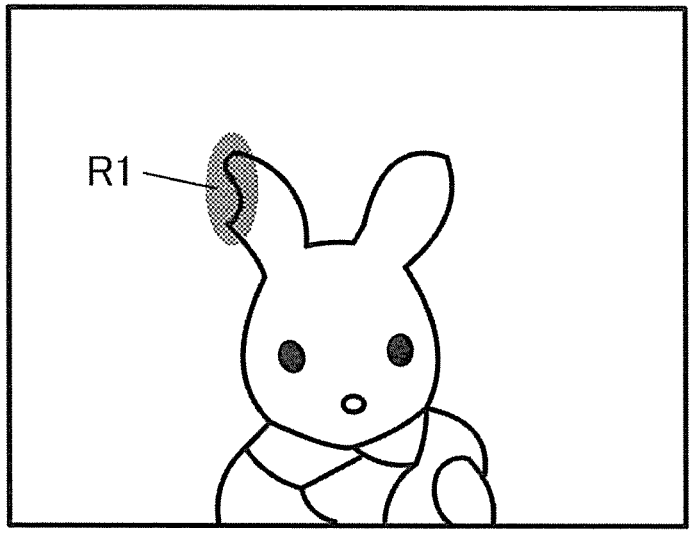
FIG. 14 (1) is an example of an emphasized image, and FIG. 14 (2) is an example of a corrected image of the emphasized image.
Figure 14:
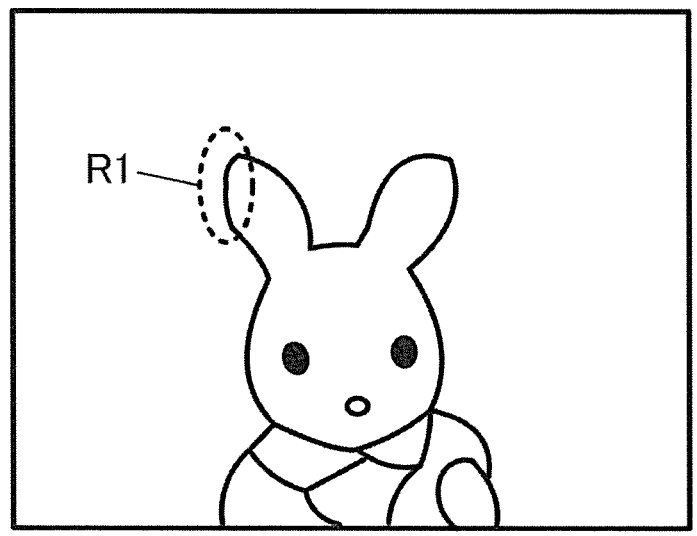

FIG. 14 (1) schematically illustrates only the stuffed rabbit in the foreground from the emphasized image generated by the emphasized image generation processing. As a result of a user tap gesture on the stuffed rabbit, the stuffed rabbit is emphasized in the emphasized image displayed on the display section 30. As can be seen in the figure, the right ear of the stuffed rabbit is partly lost and scooped inward. This is because, in the depth map of FIG. 12 (1) and FIG. 12 (2), the depth is not correctly estimated at the right ear of the stuffed rabbit, and the generated depth map is partly incorrect.

When the above-described energy function is used to select an input image having a high in-focus degree, it may not be possible in some cases to select the correct input image, depending on the setting of the coefficients in the energy function. In such cases, the displayed image may contain mistakenly non-blurred pixels other than those of the subject at the desired focusing distance.

When the user finds that the displayed emphasized image contains mistakenly non-blurred pixels other than those of the subject at the desired focusing distance, he/she can select the emphasized image correcting mode. Then, in the emphasized image correcting mode, he/she performs a drag gesture to trace the area to be corrected. Specifically, the user performs a drag gesture to trace the area R1 in the image of FIG. 14 (1). In response, the processing section 10 sets the area R1 to the designated area R1, and performs the calculation of the energy function again with different coefficients (to be more specific, different penalty values) on the pixels in the designated area R1. The processing section 10 thus corrects the emphasized image by means of the recalculation.

Specifically, the cosine similarity between the drag direction and the edge direction is calculated, and the penalty values are selected according to the calculated value. In this example, if it is determined that the cosine similarity is equal to or less than a predetermined threshold, i.e. if the drag direction and the edge direction satisfy a similarity condition, the recalculation is performed with the first and second penalties set to "$P_1$-$\alpha$" and "$P_2$-$\alpha$" respectively. That is, the recalculation is performed with lower penalty values than in the normal state. As described above, this produces an effect of relatively emphasizing an edge in the drag direction, and the designated area R1 in the resultant depth map is corrected in depth distribution to a great extent in comparison to the depth map generated in the normal state. By correcting the composite image based on this corrected depth map, the missing right ear edge of the stuffed rabbit is emphasized and recovered. As illustrated in FIG. 14 (2), the corrected emphasized image, in which the right ear shape of the stuffed rabbit is suitably corrected in the designated area R1, is thus displayed on the display.

2-1-3. Function and Effect

In the first example, in the smartphone 1, the edge detecting section 107 detects edges as a feature from the plurality of input images, and further detects the intensity of the detected edges as feature values. Then, the depth estimating section 111 uses the edge intensity detected by the edge detecting section 107 to estimate the depth of a target pixel, wherein the depth indicates which input image from among the plurality of input images is in-focus at the target pixel. Then, the depth map generating section 113 generates the depth map based on the estimation result of the depth estimating section 111.

To be more specific, the input image reducing section 101 reduces each of the plurality of input images, and detects an edge from each reduced input image. Then, the proper solution processing is performed to estimate the depth of a target pixel from the detected edge intensity, and the depth map is generated based on the estimation result.

In the depth estimation, the edge intensity of the edge detection images of the respective plurality of input images, i.e. the detection result of the edge detection section 107, is used to perform the predetermined proper solution processing so as to estimate the depth. In the proper solution processing, the score value processing is performed. In this score value processing, with respect to the target pixel, the cost value calculated from the edge intensity is added to the score value, while the penalty values are subtracted from the score value when a different input image is selected for a neighboring pixel of the target pixel. That is, an input image with an edge intensity that is as strong as possible is selected for the target pixel, while some restriction is applied to the selection of the neighboring pixel in order that an input image as close as possible to the focusing distance is selected. In this way, performing the score value processing determines an input image that satisfies the predetermined high value condition of the score value for in-focus input images, which makes it possible to correctly estimate the depth.

The depth map includes information that can specify an input image that is in focus (i.e. depth) at a pixel at a certain coordinate, or, in other words, information that can specify the coordinate of the in-focus pixel (i.e. in-focus area) in a certain input image. In this embodiment, the all-in-focus image is generated from the depth map and the plurality of input images, and is displayed on the display section 30.

The all-in-focus image displayed on the display section 30 is used for the generation of the emphasized image according to a user operation. Specifically, a certain depth is selected according to a user tap or drag gesture on the touch panel 21. Then, based on the depth map, pixels at the selected depth are specified and the emphasized image is generated. Specifically, the blur processing is applied to the all-in-focus image to a predetermined blur level, the pixel values of an input image at the depth of the specified pixels are composited to the resultant image, and the emphasized image thus generated is displayed on the display section 30. In this way, it becomes possible to generate the emphasized image in which an area designated by the user is in focus, and to allow the user to browse it.

Further, the emphasized image is corrected according to a user operation. Specifically, in response to detecting a user operation, the depth estimating section 111 re-estimates the depth of the pixels included in the designated area designated by the user. Then, the depth map generating section 113 regenerates the depth map based on the result of the re-estimation of the depth, and the corrected emphasized image is generated based on the regenerated depth map. In this way, it becomes possible to correct an area specified by the user in the emphasized image so as to provide the corrected emphasized image according to the user request.

2-2. Second Example

In the first example, the plurality of input images with different focusing distances are reduced, and the depth estimating processing is performed on the reduced input images to generate the reduced depth map. In the second example, the plurality of input images are not reduced but the original size is maintained, and the same image processing as the first example is performed on the plurality of input images to generate the depth map.

Figure 15:
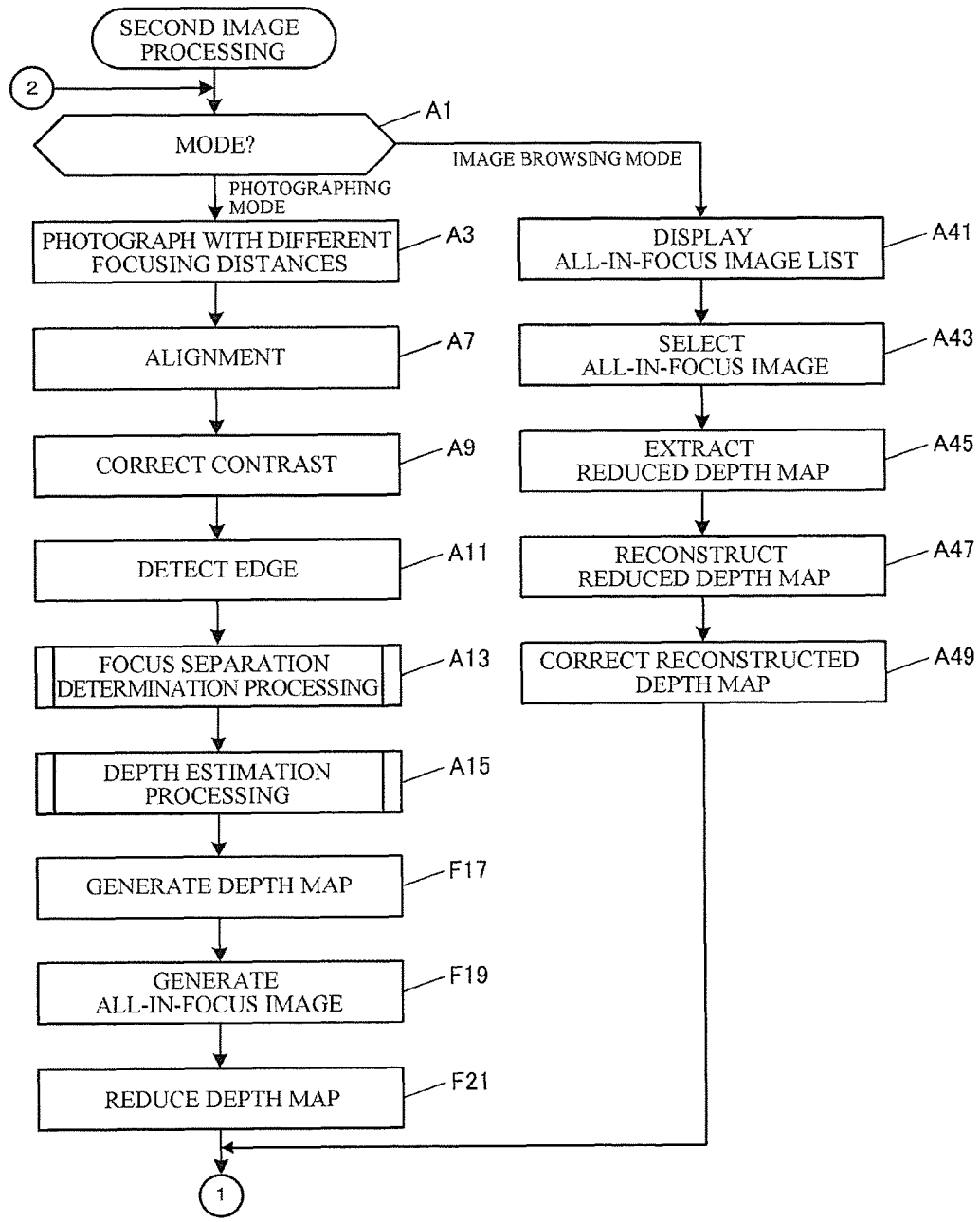
FIG. 15 is a flowchart illustrating an example of the flow of second image processing.

FIG. 15 is a flowchart illustrating a second image processing that the processing section 10 executes in replace of the image processing of FIG. 4 and FIG. 5, where only a part corresponding to the image processing of FIG. 4 is illustrated. The same reference signs are used to denote the same steps as those of the image processing.

First, the processing section 10 makes a determination as to which mode is selected by a user through an input section 20 (Step A1). If the selected mode is a "photographing mode", the processing section 10 controls the imaging section 50 to take a plurality of images of a same scene with different focusing distances according to a user shutter-releasing operation (Step A3). A plurality of input images is stored as the image data set 83.

Thereafter, the contrast correcting section 105 performs alignment processing (Step A7) and contrast correction processing (Step A9) on each of the plurality of input images with different depths stored in the image data set 83. Then, the edge detecting section 107 performs edge detecting processing on each of the corrected plurality of input images corrected by the contrast correction processing (Step A11).

Thereafter, a focus separation determination section 109 performs focus separation determination processing on each of edge images obtained by edge detection processing (Step A13). Then, a depth estimating section 111 performs depth estimation processing using edge images for which the focus separating section has determined that the focus is correctly separated (Step A15).

Thereafter, the depth map generating section 113 performs depth map generation processing (Step F17). Specifically, it generates a map in which a bit value corresponding to the estimated depth is allocated to each pixel of the input images based on the results of the depth estimation processing, and the map thus generated is used as the depth map. The number of bits of the depth map to be generated may be selected according to the number of input images to be used in the depth estimation processing. For example, if the number of input images is 3 or 4, the depth map may be drawn with 2 bits. If the number of input images is 5 to 8, the depth map may be drawn with 3 bits.

Thereafter, the all-in-focus image generating section 119 performs all-in-focus image generating processing (Step F19). Specifically, based on the depth map generated by the depth map generation processing, pixel values are selected and extracted from the plurality of input images so as to generate the all-in-focus image in which every pixel has the pixel value of an input image having a high in-focus degree. The generated all-in-focus image is stored as a part of the data set 83 in the memory section 80, and is associated with the plurality of input images.

Thereafter, the depth map reducing section 121 performs depth map reducing processing (Step F21). Specifically, the depth map generated in Step F17 is reduced by a predetermined reduction method. In this regard, the images are reduced, for example, by ½"(where n is an integer of 1 or more) in length and width in order that the image information of the original input images is retained as much as possible when reconstructing the depth map to the original size. The reduction of the input images may be carried out by a method known in the art such as downsampling technique. The reduced input images are stored as a part of the image data set 83 in the memory section 80 and are associated with the plurality of input images and the all-in-focus image.

3. Third Example

A third example is to generate a depth map using a different technique from those of the above-described first and second examples. In this example, changing the camera position in order to take a plurality of images from different viewpoints produces parallax, and the plurality of photographed images are used to generate the depth map. This photographing mode of producing parallax by changing the camera position in order to take images from different viewpoints is referred to as a "parallax mode", which will be described below.

3-1. Flow of Generating Depth Map

Figure 19:
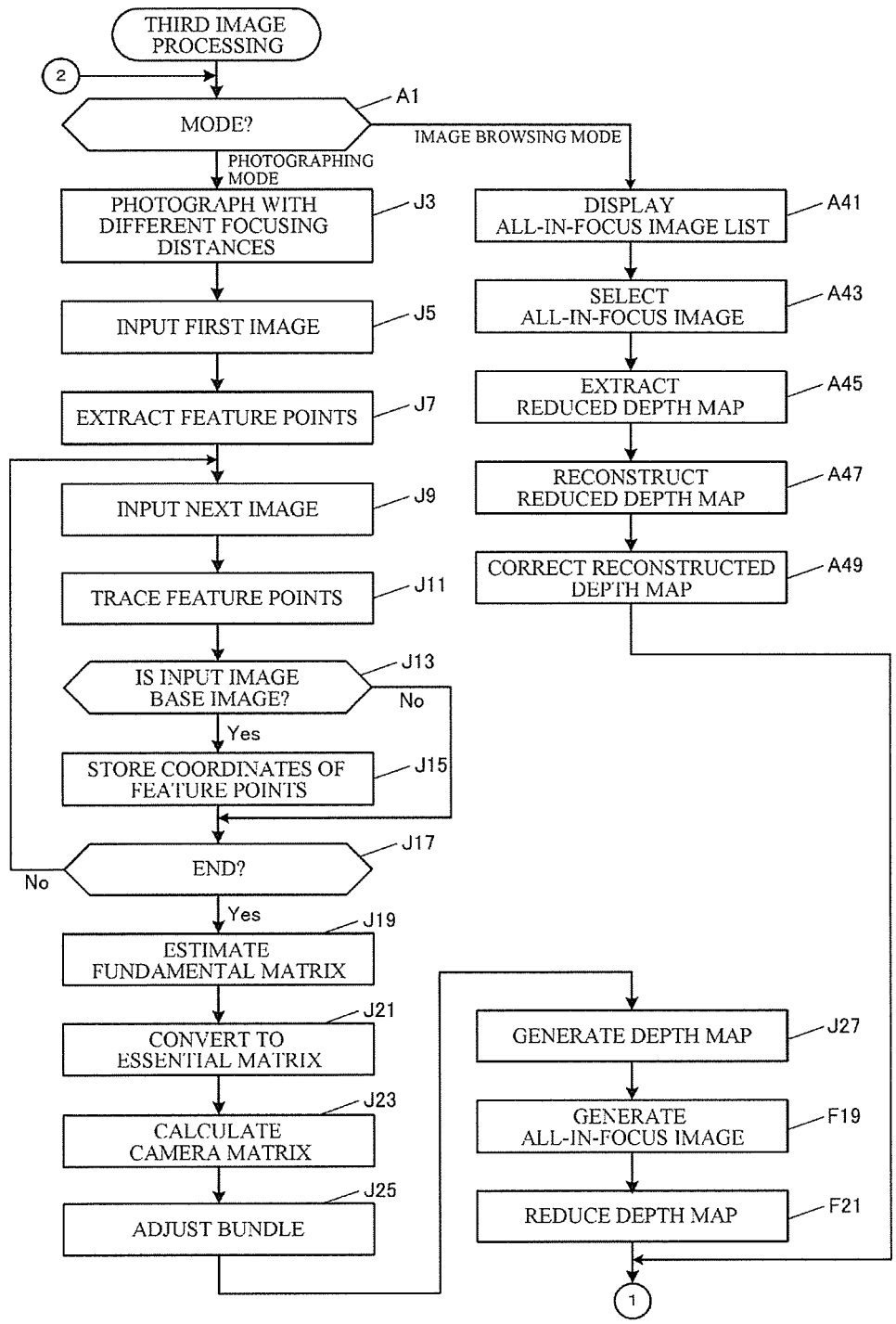
FIG. 19 is a flowchart illustrating the flow of third image processing.

FIG. 19 is a flowchart of a third image processing that the processing section 10 executes in the third example in place of the image processing of FIG. 4 and FIG. 5, illustrating only the part corresponding to FIG. 4. The same reference signs denote the same steps as those of the image processing, and repetitive description is omitted.

In Step A1, if the processing section 10 determines that the mode is the photographing mode (Step A1, photographing mode), it controls the imaging section 50 to take a plurality of images from different viewpoints by changing the camera position (Step J3). In the method of this example, parallax is required between photographed images of a desired subject in order to generate the depth map. For this reason, it is suitable that the user is prompted to change the camera position in order to photograph a desired subject from different viewpoints.

Next, the processing section 10 inputs the first photographed image as a reference input image (Step J5). Then, the processing section 10 performs feature point detection processing on the reference input image to detect a plurality of feature points (Step J7). The feature points can be detected by any method, including methods known in the art such as the method using a corner detecting algorithm by Harris, Stephens and Plessey and a method of detecting SIFT features by affine transformation of the input image.

Figure 20:
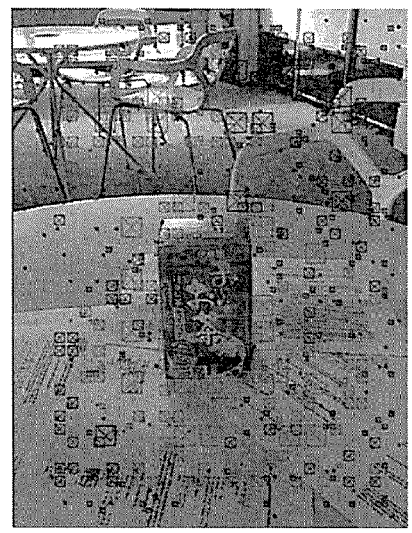
FIG. 20 (1) illustrates an example of a feature point detection result, FIG. 20 (2) illustrates an example of a feature point detection result, and FIG. 20 (3) illustrates an example of a feature point tracking result.
Figure 20:
Figure 20:
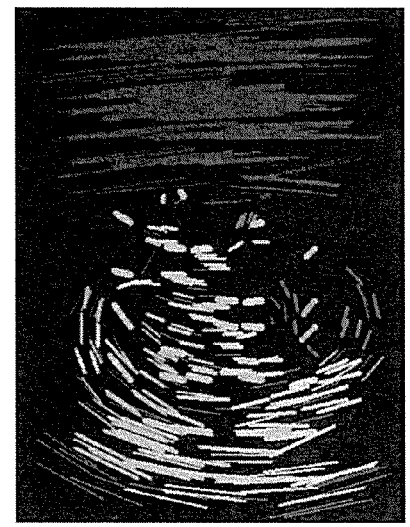

FIG. 20 (1) illustrates a result of detecting the feature points of the reference input image.

This reference input image is a photographed image of a subject (box) placed on a table that is taken by a camera from a front viewpoint. The many rectangular markers shown on the image correspond to the feature points detected by the feature point detection processing. As can be seen from the figure, a number of feature points are detected in the reference input image.

Next, the processing section 10 inputs a subsequently photographed image as an input image (Step J9). Next, the processing section 10 performs a feature point track processing (Step J11). For example, a technique using a multi resolution analysis may be used for tracking the feature points. For example, multi resolution images produced from the reference input image and multi resolution images produced from the input image are prepared, and the feature points are tracked between two images at the same resolutions repeatedly from images from lower resolution. Further, the feature points can be tracked more stably by dividing the input image into a plurality of blocks, which enables block-based propagation of the displacement of the feature points. This kind of tracking calculates in which direction and how much each feature point detected in the reference image is displaced in the input image. That is, the direction and the amount of displacement are calculated for each feature point.

FIG. 20 (2) illustrates a result of detecting feature points in the input image.

This input image is a photographed image taken from a left side viewpoint of the same subject on the table as FIG. 20 (1). FIG. 20 (3) illustrates a result of tracking the feature points of this input image. In FIG. 20 (3), the initial point and the terminal point of each line represent the position of a feature point, the line color represents the direction of displacement of a feature point, and the line length represents the amount of displacement of a feature point. As can be seen from the figure, the feature points shift between the photographed images taken from different viewpoints.

Next, the processing section 10 makes a determination as to whether to extract the input image as a base input image (key frame) (Step J13). A base input image refers to an input image in which the feature points are successfully tracked. The input image is extracted as a base input image when, for example, the overall amount of displacement of the feature points is not less than (or is greater than) a first threshold (a predetermined threshold value) as a result of propagating the displacement amount of the feature points in an input image.

If a determination is made to extract the input image as a base input image (Step J13, Yes), the processing section 10 stores the coordinates of the feature points in the base input image in the memory section 80 (Step J15). If a determination is made not to extract the input image as a base input image, (Step J13, No), the processing section advances the processing to Step J17.

Next, the processing section 10 makes a determination as to whether to terminate the extraction of a base input image (Step J17). For example, if the overall amount of displacement of the feature points is not less than (or is greater than) a second threshold which is greater than the first threshold, in Step J13, a determination is made to terminate the extraction of a base input image. That is, when the overall displacement of the feature points increases to a certain level, the extraction of a base input image is terminated. If the processing section 10 determines not to terminate the extraction of a base input image (Step J17, No), it returns the processing to Step J9. As a result, a plurality of input images is extracted as a base input image.

If the processing section 10 makes a determination to terminate the extraction of a base input image (J17, Yes), it estimates a fundamental matrix F of the base input image from the coordinates of the feature points that was stored in the memory section 80 in Step J15 (Step J19). The fundamental matrix F is obtained by similarity transformation of an essential matrix E into the coordinate system of the images based on the epipolar geometry, where the essential matrix E defines a relation between projected points on two images in a normalized image coordinate. Since the fundamental matrix E and the essential matrix E themselves are known in the art, description of the matrix elements is omitted here.

The fundamental matrix F is a 3-by-3 matrix with nine elements. However, practically speaking, the number of unknown elements is eight as the Frobenius norm is set to "1" for the fundamental matrix F. That is, the fundamental matrix X can be determined by the coordinates of at least eight pairs of feature points. Accordingly, the coordinates of eight or more pairs of feature points, which were stored in the memory section 80 in Step J15, are used to estimate the fundamental matrix F for a pair of base input images. In this regard, for example, a RANSAC (random sampling consensus) algorithm is used to exclude outliers to estimate the proper fundamental matrix F. After applying the RANSAC, all feature points within a predetermined range of error are used as sample data, and the least-squares method is used to estimate the more proper fundamental matrix F.

Next, the processing section 10 transforms the fundamental matrix F estimated in Step J19 into the essential matrix E (Step J21). The essential matrix E can be determined by applying an internal parameter of the camera to the fundamental matrix F. In this example, the internal parameters of the camera shall be known.

Thereafter, the processing section 10 calculates a camera matrix from the essential matrix E determined in Step J21 (Step J23). The camera matrix represents the relative location of the viewpoint of the base input image, which includes a rotation matrix and a translation vector representing displacement of the camera. Determining the camera matrix is the same as determining the relative location of the viewpoint of the base input image.

Next, the processing section 10 performs bundle adjustment processing (Step J25). Bundle adjustment is a technique to estimate a geometrical three-dimensional model parameter from input images. In the bundle adjustment processing, the three-dimensional coordinate of each feature point is calculated based on the correspondence of the feature points between the input images. Then, the calculated three-dimensional coordinate of each feature point is projected again to an image plane, and a reprojection error, which is the distance between the reprojected point and the feature point, is estimated repeatedly. The three-dimensional coordinate of each feature point is thus estimated more precisely. Further, in the bundle adjustment processing, the parameter values of the camera matrix calculated in Step J23 are estimated similarly so as to adjust the parameters of the camera matrix.

Figure 21:
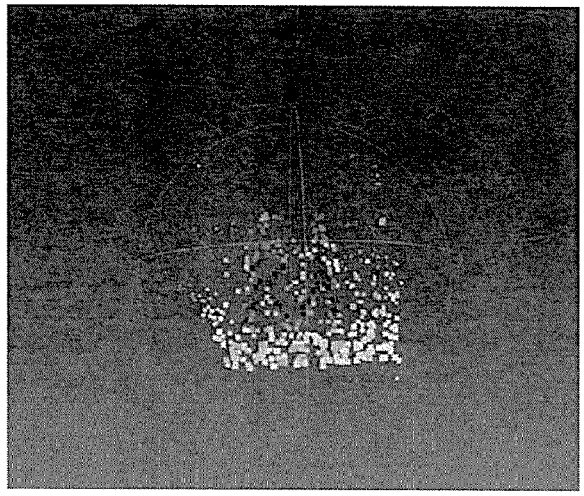
FIG. 21 (1) illustrates an example of a result of estimating the coordinate of a feature point as viewed from a front viewpoint, FIG. 21 (2) illustrates an example of a result of estimating the coordinate of a feature point as viewed from a top viewpoint, and FIG. 21 (3) illustrates an example of a result of estimating the coordinate of a feature point as viewed from a left viewpoint.
Figure 21:
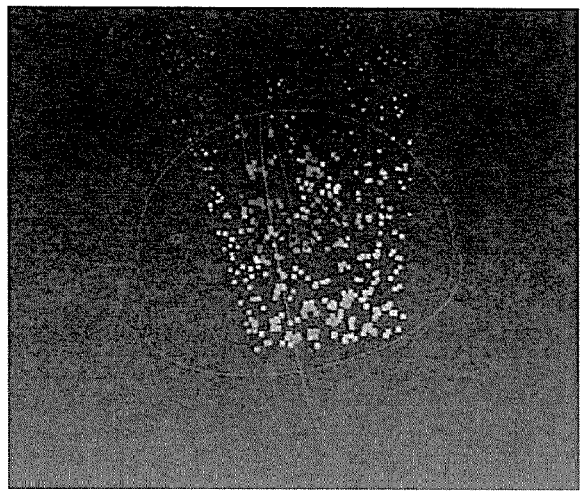
Figure 21:
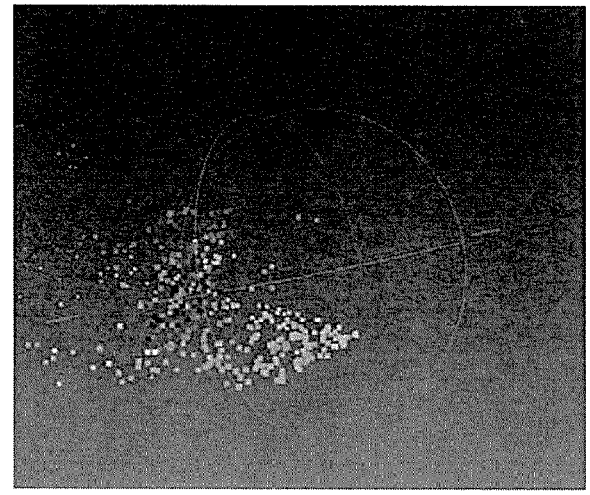

FIG. 21 (1) to FIG. 21 (3) are sample images of the same group of feature points drawn by estimating the three-dimensional coordinates, as viewed from different viewpoints.

FIG. 21 (1) is a sample image of the feature point group as viewed from a front viewpoint, FIG. 21 (2) is a sample image of the feature point group as viewed from a top viewpoint, and FIG. 21 (3) is a sample image of the feature point group as viewed from a left viewpoint. As can be seen from these sample images, the feature points are correctly estimated, and the distribution of the feature points differs depending on the viewpoint.

Thereafter, the processing section 10 generates the depth map using the result of the bundle adjustment processing of Step J25 (Step J27). To generate the depth map, it is required to calculate the positional coordinate in the three-dimensional space of each pixel. Accordingly, the location of an intended pixel (hereinafter referred to as a "target pixel") on the base input image (hereinafter referred to as the "projected pixel location"), which is a projection of the location of the target pixel in the three-dimensional space (hereinafter referred to as the "target pixel location") onto the base input image, and the location of the camera at the time of taking the base input image are used to estimate the target pixel location.

First, the location of the camera where each base input image is taken is estimated using the camera matrix, which has its parameters adjusted by the bundle adjustment processing, and the initial location of the camera, which is stored in advance in the memory section 80. The initial location may be set to any location, and a predetermined three-dimensional coordinate is stored in the memory section 80 as the coordinate of the initial location. Using this initial location and the camera matrix (rotation matrix and translation vector), the location of the camera at the time of taking each base input image is calculated with reference to the initial location.

Instead of storing a predetermined location in the memory section 80, the initial location may also be set to a location that is calculated by a positioning signal from a GPS (global positioning system) or the like, and the above-described calculation may be performed using the initial location thus determined.

Further, correspondence between a pair of base input images is calculated in a pixel basis. Specifically, in a pair of base input images, a corresponding points search is conducted in only a certain line in the images using the essential matrix E. To be more specific, in a pair of base input images, the positions of the corresponding points of a target pixel are calculated using a semiglobal optimization technique in order that the corresponding points basically have a similar color and similar relationship to the neighboring pixel.

The positions of the corresponding points of the calculated target pixel in the pair of the base input images are set as the projected pixel positions. Then, the target pixel position is estimated from the two camera positions and two projected pixel positions estimated in the pair of the base input images, and the distance from the viewpoint to the target pixel is calculated. All of the pixels are selected as target pixels to perform the above-described processing, and a depth map is generated in which the calculated distances represent the depth of each pixel.

Figure 31:
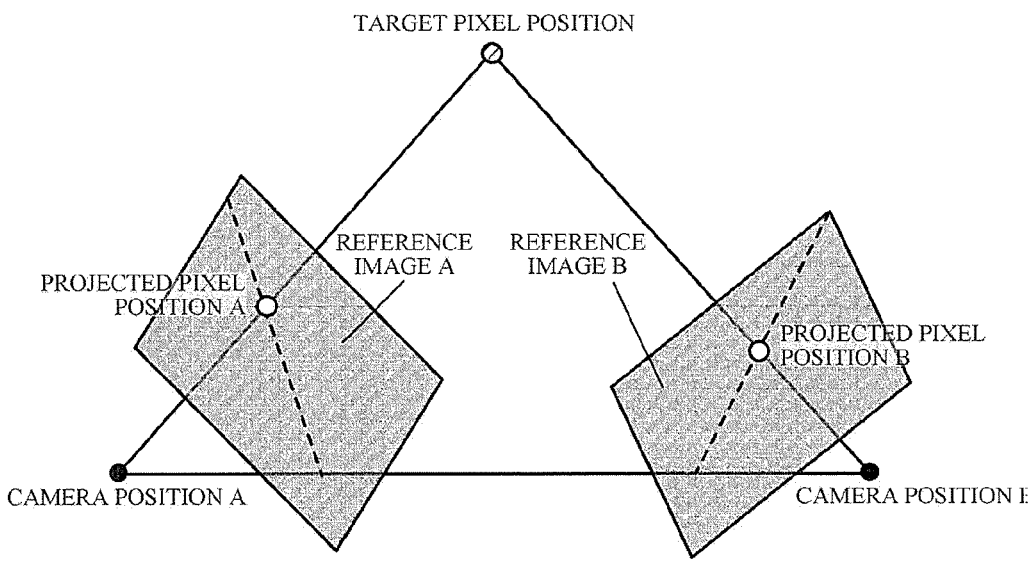
FIG. 31 is an explanatory view for the principle of depth map generation using a parallax technique.

FIG. 31 is an explanatory view for the principle of depth map generation using a parallax technique.

FIG. 31 illustrates a pair of a base input image A and a base input image B, where the camera positions when the respective base input images are taken are referred to as a camera position A and a camera position B, which are shown as closed circles. Further, one certain pixel is selected as the target pixel. The projected position of the target pixel position on the base input image A is referred to as a projected pixel position A, and the projected position of the target pixel position on the base input image B is referred to as a projected pixel position B, which are shown as open circles.

In FIG. 31, the intersection of the line connecting the camera position A and the projected pixel position A with the line connecting the camera position B and the projected pixel position B is estimated as the target pixel position. Once the target pixel position is determined, the distance from the viewpoint to the target pixel position can be calculated, and the depth of the target pixel is determined. All of the pixels are selected as target pixels to calculate the target pixel positions and the distances from the viewpoint to the target pixel positions, and a depth map is generated in which the calculated distances represent the depth.

The processing that follows the generation of the depth map, as described above, is the same as that of the first and second examples.

3-2. Guide

In the above method of generating the depth map, it is required that the user moves the camera to take images from a plurality of viewpoints in order to create parallax. At the time of photographing, it is not enough to simply prompt the user to move the camera, as he/she may not understand how to move the camera, thus it is not an ideal way of prompting. For example, if the camera is only rotated while in the same position, no distance information can be obtained because no parallax is created. Therefore, it is required that the user is prompted not to move the camera in such ways as the above. To achieve this, the following processing may be carried out.

After taking the first photographed image, the processing section 10 allows the user to designate a subject, for example, by allowing the user to tap the part of a screen where a desired subject is displayed. Then, the processing section 10 performs human detection or object detection to detect a subject area and shows the detected subject area. For example, a figure that contains the subject area and is slightly larger than the subject area (hereinafter referred to as a "subject designating figure") is superimposed on the first photographed image. For example, a dotted or dashed rectangle may be displayed as the subject designating figure.

Next, the display controlling section 127 controls the display section 30 to display a guide to show the user the direction in which to move the device (camera) (either a right, left, up or down direction) or the distance to move the device (how far to move the device). Specifically, as the guide, the display section is controlled to display an arrow that shows which direction to move the device (hereinafter referred to as a "guide arrow") or a figure that guides the user to an intended photographing position (hereinafter referred to as a "guide figure"). For example, the guide figure may have the same shape and size as the confirmation screen. In this case, the user can understand the need to move the camera so as to align the preview screen with the guide figure.

The confirmation screen refers to a screen that is displayed on the display section 30 based on a signal output from the imaging section 50 (imaging device) when the camera is started in the photographing mode. The image of the confirmation screen is refreshed according to the output signal from the imaging device. That is, an image to be photographed is displayed on the confirmation screen, which is refreshed in real time. By viewing the confirmation screen, the user who takes the images can check the photographed figure of a subject and, at the time of photographing, can check whether a desired subject will be suitably photographed, and can consider the position and the angle of the photographing.

In this regard, the direction in which the device is moved may be any direction that can create parallax. For example, the direction may be either the vertical direction or the horizontal direction. However, the device is preferably moved in the upward direction with respect to the direction of gravitational force. This is because a subject as a photographing target is usually placed on a certain object (ground, floor, desk, etc.). Specifically, in the case of moving the device in the vertical or downward direction, information on a subject portion at the opposite side to the moving direction (lateral portion or upper portion of the subject) which was within the camera view, would disappear from the camera view after the device is moved, since such portion would be located behind the subject itself, that is, occlusion occurs. As a result, the detected feature points, which will be necessary for creating the depth map, disappear from the image obtained after moving the device. In contrast, in the case of moving the device in the upward direction, since the subject is placed on the ground, floor, desk or the like, there is little information regarding the bottom portion of the subject within the camera view before moving the device, and thus an area which will disappear after moving the device is small. Therefore, it is possible to suppress the occlusion where losing many of the feature points is avoided. The processing section 10 can determine the upward direction on the basis of the direction of gravitational force, which is detected by the inertial sensor 75. Therefore, it can guide the user to move the device in the upward direction regardless of the photographing angle of the camera (the direction in which the confirmation screen is displayed).

After storing the first photographed image, the processing section 10 tracks the detected subject area to allow the corresponding subject designating figure to follow the subject area, and also to change the displayed guide according to the movement of the device. At this point, the moving distance and the moving direction of the device with respect to the original photographing position changes as the device is moved. Accordingly, for example, the moving distance and the moving direction of the device are detected as movement parameters of the device, and the display section 30 is controlled to change the guide according to the detection result.

The inertial sensor 75, which includes a triaxial acceleration sensor and a triaxial gyroscopic sensor, outputs a triaxial acceleration vector and a triaxial angular velocity vector, which are vectors in the sensor-based local coordinate system to the processing section 10. The processing section 10 integrates the triaxial angular velocity vector output from the inertial sensor 75 to determine the attitude of the camera, and performs a coordinate conversion based on the determined attitude to convert the triaxial acceleration vector in the local coordinate system to the triaxial acceleration vector in an absolute coordinate system, which, for example, may be based on the earth. Then, the processing section 10 integrates the coordinate-converted triaxial acceleration vector to determine a triaxial velocity vector. The processing section 10 performs this processing at predetermined time intervals, and determines the moving distance and the moving direction of the device in each time interval based on the determined triaxial velocity vector in the time interval.

Based on the determined moving direction of the camera, the processing section 10 makes a determination as to which direction to shift the guide figure displayed on the screen (shift direction of the guide figure). Further, based on the deter mined moving distance of the camera, the processing section 10 makes a determination as to how far to shift the guide figure displayed on the screen (shift distance of the guide figure). Then, the processing section 10 changes the guide figure based on the determined shift direction and shift distance.

In this regard, when a certain feature point on the subject is given, the moving distance required to create a certain level of parallax with respect to the feature point increases in correspondence with an increase in distance to the subject (e.g. the focusing distance). Accordingly, it is preferred that the refreshing condition of the guide figure is changed according to the distance to the subject. For example, the shift width of the guide figure is changed in such a manner that if the focusing distance is equal to or longer than a predetermined distance, the guide figure is shifted by a shift width A with respect to a predetermined moving distance X, while if the focusing distance is shorter than the predetermined distance, the guide figure is shifted by a shift width B with respect to the predetermined moving distance X, wherein A<B holds.

FIG. 22 (1) to FIG. 22 (4) illustrate an example of the guide in this case.

FIG. 22 (1) to FIG. 22 (4) illustrate a display screen of the smartphone 1, which is an example of electronic equipment with the image processing device. The whole area surrounded by the outer frame is the display screen of the smartphone 1, and the above-described confirmation screen is displayed at the center part of the display screen.

FIG. 22 (1) illustrates a photographed image of subjects that is taken from a front viewpoint. After the imaging section 50 has performed the photographing and the first photographed image has been stored, the confirmation screen is displayed again. In response to a user tap gesture on the part of the confirmation screen where the children, i.e. the subjects, are displayed, a dashed rectangle enclosing the two children, i.e. the subject designating figure, is displayed as illustrated in FIG. 22 (1).

Subsequently, a rectangle to guide the user to move the camera, for example, in the horizontal direction (right direction in the figure), is displayed as the guide, which is illustrated in FIG. 22 (2). In the figure, a right-pointing guide arrow is displayed, which guides the user to move the camera in the right direction in relation to the user. Further, the rectangular guide figure, which has the same size as the confirmation screen, is displayed such that it is deviated to the right from the confirmation screen. The user moves the camera in the right direction according to the guide arrow and the guide figure while paying attention so as to keep the subjects at the center of the confirmation screen.

Thereafter, when the camera is moved in the right direction, the processing section 10 determines the shift direction and the shift distance of the guide, and shifts the display position of the guide in the opposite direction to the moving direction of the smartphone 1 by a distance according to the moving distance of the smartphone 1. Specifically, as illustrated in FIG. 22 (3), the guide figure on the screen shifts to the left in relation to the screen as the user moves to the right.

When the guide figure is aligned with the confirmation screen as illustrated in FIG. 22 (4) as a result of the user movement (when it is determined that the contour of the guide figure is aligned with the contour of the confirmation screen), the processing section 10 determines that the user movement is complete, and the imaging section 50 automatically performs photographing at that position so as to obtain the second photographed image that has parallax with respect to the first photographed image.

The acceleration sensor and the gyroscopic sensor of the inertial sensor of FIG. 1 may be an IMU (inertial measurement unit), which is a packaged acceleration sensor and gyroscopic sensor.

Further, in the above-described example, the movement parameters of the device are detected based on the acceleration vector and the angular velocity vector, which are detected by the inertial sensor or the inertial measurement unit. Instead, the image processing device may include a unit that calculates the position by using a positioning signal transmitted from a positioning satellite, such as a GPS unit, so that it can detect the movement parameters based on the detection result of the unit. The GPS unit can calculate the position of the device by performing positional calculation using a pseudo range and a Doppler frequency (pseudo range positioning, Doppler positioning) based on GPS satellite signals transmitted from the GPS satellites. The moving velocity and the moving direction of the device may be detected based on a difference between the calculated positions as determined by the positional calculation. Further, the GPS unit can calculate the velocity vector of the device by performing a velocity vector calculation using a Doppler frequency. The moving distance and the moving direction of the device may be detected based on the calculated velocity vector.

Further, instead of the inertial sensor 75, the image processing device may include an INS (inertial navigation system) that independently detects the moving distance and the moving direction by performing inertial navigation calculation, so that the inertial navigation system can detect the moving distance and the moving direction of the image processing device.

In the above-described example, the movement parameters (moving direction and moving distance) of the device are detected, and the guide is changed based on the detection result. Instead, the guide may be changed, for example, based on the result of tracking the feature points in the feature point tracking processing of Step J11 of the third image processing (see FIG. 19). That is, based on the result of tracking the feature points in the feature point tracking processing, a determination is made as to which direction and what distance the feature points have moved (the moving direction and the moving distance of the feature points). Then, based on the determination result, it is determined which direction and how much distance to shift the guide figure on the display screen (the shift direction and the shift distance of the guide figure), and the guide is changed accordingly.

4. Fourth Example 4-1. Setting of Default Focus Position by User Operation

In the above-described examples, the all-in-focus image is generated, and thereafter when the emphasized image generation processing is performed in the emphasized image generating mode, the user designates an area to be emphasized in the all-in-focus image to generate the emphasized image in which the pixels in the designated area are in focus. However, a problem with this process is that a user who wants to make a desired image is required to designate an area to be emphasized every time the imaging section 50 performs photographing, which is inconvenient for the user.

To cope with this problem, the device may be configured such that the user can designate an in-focus position as a default setting (hereinafter referred to as a "default in-focus position") before the imaging section 50 performs photographing. Specifically, the default in-focus position can be designated, for example, by the user performing a tap gesture on the display where the confirmation screen is displayed.

Figure 23:
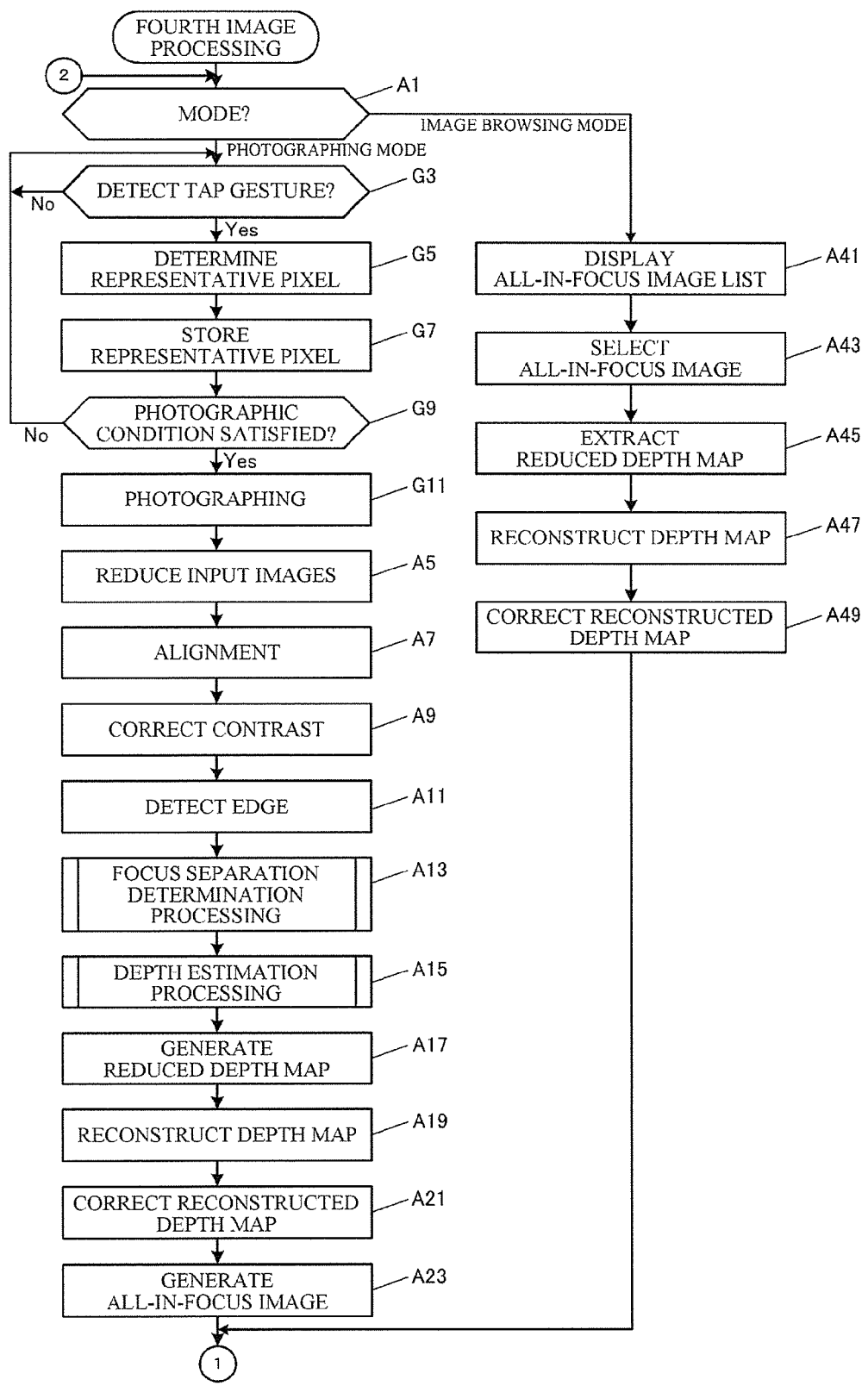
FIG. 23 is a flowchart illustrating an example of the flow of fourth image processing.

FIG. 23 is a flowchart illustrating a fourth image processing that the processing section 10 executes in place of the image processing of FIG. 4 and FIG. 5, where only a part corresponding to the image processing of FIG. 4 is illustrated. The same reference signs are used to denote the same steps as those of the image processing, and repetitive description is omitted.

If the processing section 10 determines that the mode is the photographing mode (Step A1), it makes a determination as to whether a tap gesture is detected (Step G3). If it is determined that a tap gesture is detected (Step G3, Yes), the processing section 10 determines a representative pixel based on a designated area (Step G5). The designated area means an area tapped by the user, and the processing section selects one pixel from the designated area as the representative pixel as with the above-described examples. In this case, to select the representative pixel, for example, the pixel closest to the center of the designated area, or the pixel with the pixel value closest to the average of the pixel values of the pixels included in the designated area may be selected as the representative pixel. Then, the processing section 10 stores the determined representative pixel in the memory section 80 (Step G7).

Next, the processing section 10 makes a determination as to whether a photographing condition is satisfied (Step G9). Specifically, the photographing condition may be (1) a detected tap gesture in Step G3, (2) a detected tap gesture in Step G3 and a subsequent detected push operation of a photographing button, (3) a detected tap gesture in Step G3 and a lapse of a predetermined time (e.g. 5 seconds) with the finger being held at the tapped position (detection of long tap), (4) a detected tap gesture in Step G3 and a subsequent detected tap gesture at the same spot (detection of double tap gesture) and the like. If any one of these photographing conditions is satisfied, the processing section 10 allows the imaging section 50 to perform photographing.

If it is determined that the photographing condition is not satisfied (Step G9, No), the processing section 10 returns the processing to Step G3. If it is determined that the photographing condition is satisfied (Step G9, Yes), the processing section 10 performs photographing processing to allow the imaging section to take a plurality of images with different focusing distances (Step G11). Then, the processing section 10 returns the processing to Step A5.

Figure 24:
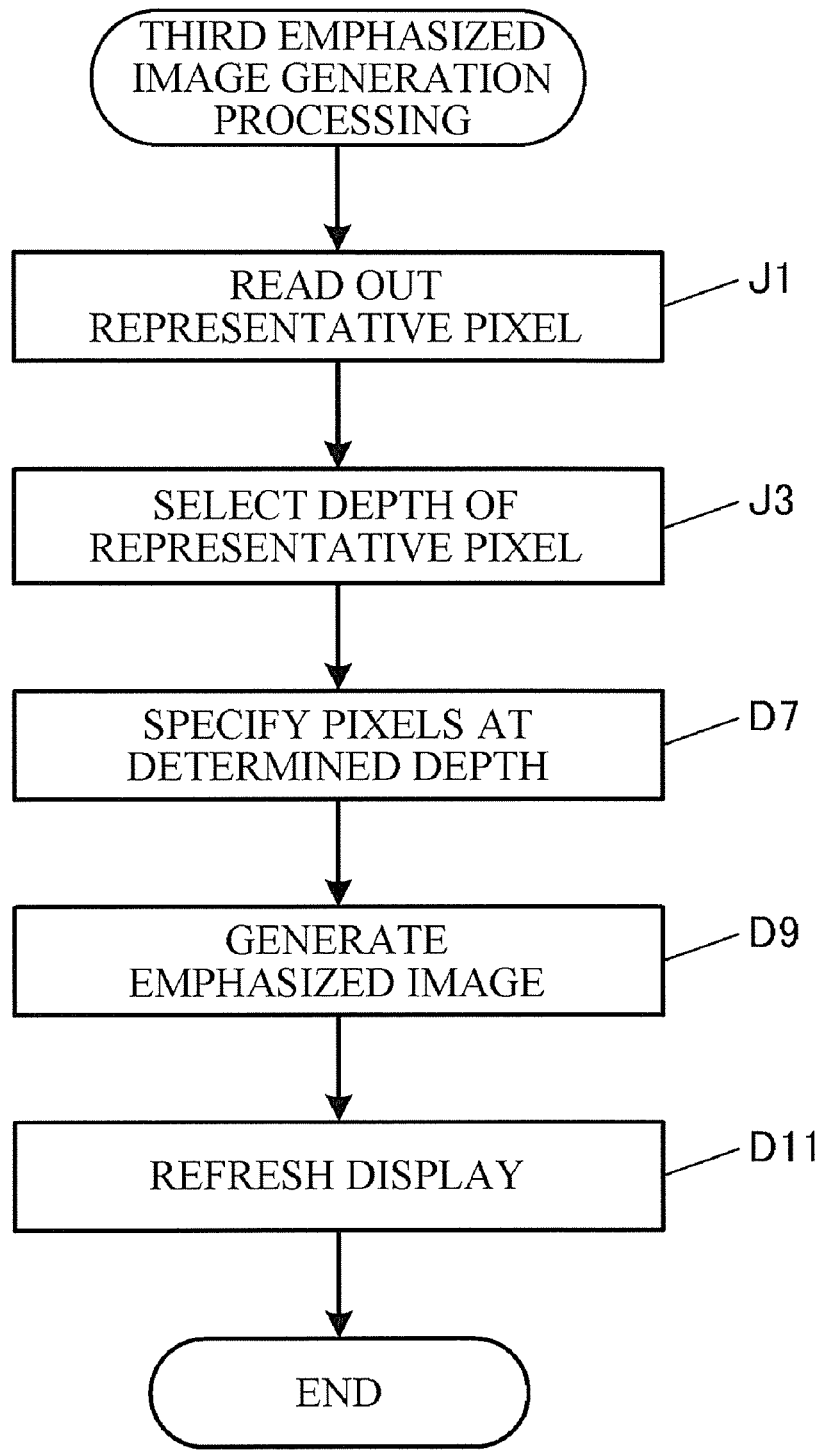
FIG. 24 is a flowchart illustrating an example of the flow of third emphasized image generation processing.

FIG. 24 is a flowchart illustrating an example of the flow of third emphasized image generation processing that the processing section 10 executes in the fourth image processing in place of the emphasized image generating processing of FIG. 8. The same reference signs are used to denote the same steps as those of the emphasized image generation processing, and repetitive description is omitted.

The processing section 10 reads out the representative pixel that was stored in Step G7 from the memory section 80 (Step J1). Then, the processing section 10 determines the depth of the retrieved representative pixel based on the depth map stored in the memory section 80 (Step J3). Then, the processing section advances the processing to Step D7.

In designating the default in-focus position in the fourth image processing, the device may also be configured such that the user can designate an in-focus position on a pixel basis using a cursor or the like. Also, the device may be configured such that the user can designate an in-focus position with respect to each subject by enclosing a subject with a finger gesture or the like.

Further, instead of determining the representative pixel in Step G5, for example, the designated area may be firstly determined according to a user operation (e.g. a tap gesture on the touch panel), and thereafter the imaging section 50 performs photographing. After the photographing, the most common depth among the pixels (and the depths) in the previously determined designated area is specified, and the emphasized image in which pixels at the specified depth are in focus is generated. That is, without determining the representative pixel, the depth at which the pixels are in focus may be determined from the designated area designated by the user.

Further, the photographing processing in Step G11 may be performed such that the imaging section 50 photographs a desired subject from different viewpoints by guiding the user to change the camera position as with the photographing in Step J3 of the third image processing described in the third example.

4-2. Face Detection/Setting of Default In-Focus Position by Human Detection

Upon setting the default in-focus position in the above-described processing, a person or a face of a person displayed as a subject may be detected in the confirmation screen, and the detected person or face may be set as the default in-focus position. The emphasized image is then generated by the same processing as described above. Further, after photographing an image, a person or a face of a person displayed as a subject may be detected in the input image display screen, and the detected person or face may be set as the default in-focus position. The emphasized image is then generated by the same processing as described above.

5. Fifth Example
5-1. Area Designation by Figure

In the above-described example, when the focus is brought to a desired subject, if there is another subject at a similar depth to the desired subject, the generated image is in focus also at this subject. Accordingly, if an unintended subject is photographed at a similar depth to the desired subject, a problem with the above-described examples is that it is impossible to bring the focus only to the desired subject and to perform blur processing on the unintended subject.

To cope with this problem, for example, the device may be configured such that a certain figure including a circle, an oval, a rectangle figure and the like centered on a point tapped by the user (hereinafter referred to as a "area designating figure") is displayed on a preview screen where the photographed input image is displayed, and the user can dynamically change the size of the area designating figure so as to specify an area which is not blurred by the blur processing.

Figure 25:
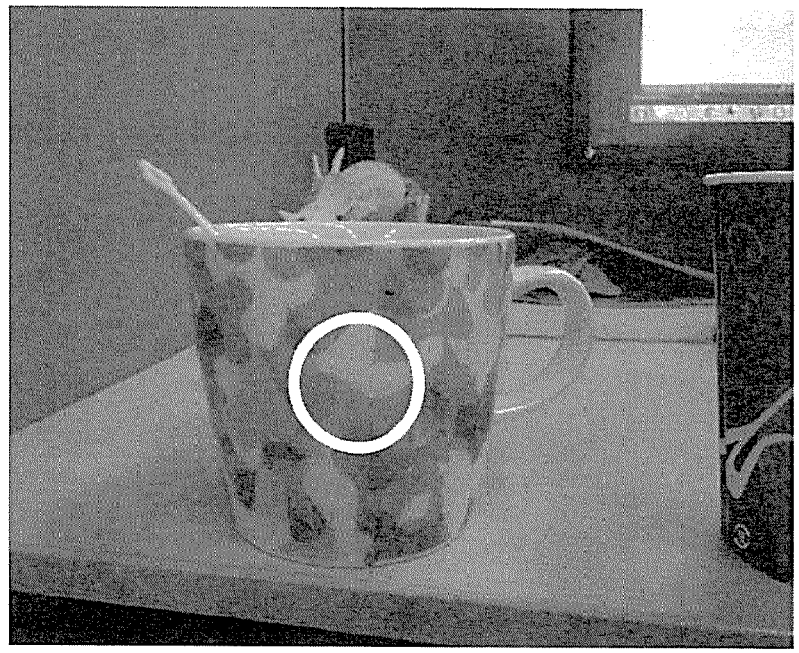
FIG. 25 (1) illustrates an example of an area designating pattern, and FIG. 25 (2) is an explanatory view for size adjustment of the area designating pattern.
Figure 25:
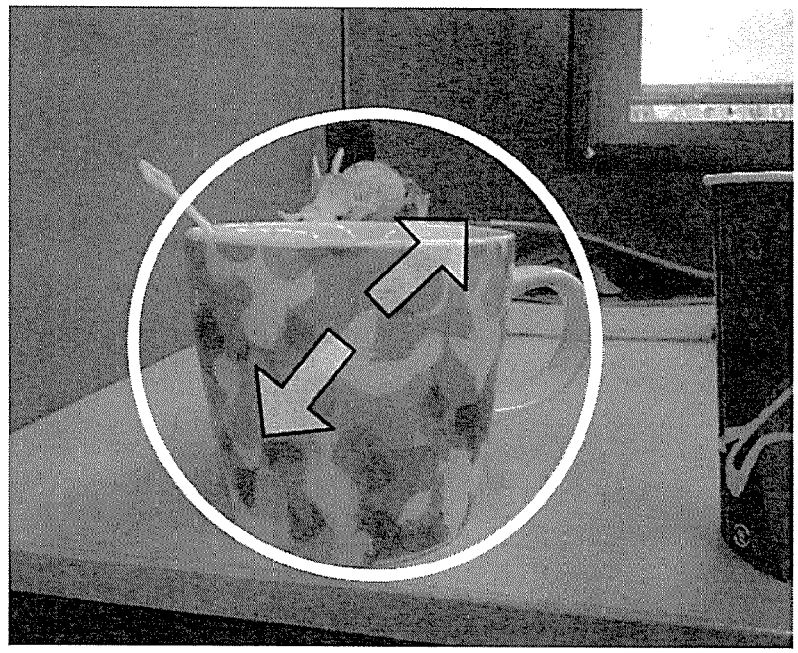

FIG. 25 (1) and FIG. 25 (2) illustrate an example of the area designating figure in this example.

FIG. 25 (1) and FIG. 25 (2) are input images in which a mug is photographed at the center as a desired subject. At the right end of this input image, a part of a paper cup, i.e. an unintended subject, is photographed. The user manipulates the area designating figure to designate the mug in the image in order to emphasize the image of the mug, i.e. the desired subject and to blur the image of the paper cup, i.e. the unintended subject.

Specifically, as illustrated in FIG. 25 (1), in response to detecting a user tap gesture on the mug, i.e. the desired subject, in the image, the display controlling section 127 controls the display section 30 to display the area designating figure, such as an oval, at the tapped point. At this point, the displayed area designating figure may have a predetermined size. In FIG. 25 (1), the area designating figure displayed at the center of the mug has a comparatively small size. The size of the area designating figure can be changed by means of a two-finger pinch gesture. The area designating figure is enlarged by means of a pinch-out gesture and reduced by a pinch-in gesture.

As illustrated in FIG. 25 (2), in response to a user two-finger pinch-out gesture on the area designating figure, the area designating figure is enlarged. The user adjusts the size and shape of the area designating figure by a pinch-out gesture so that the area designating area fully covers the mug. Then, the user performs a confirmation operation, e.g. pushes a confirmation button, so as to confirm the area to be emphasized.

In the emphasized image generation processing of this case, the processing section 10 sets the designated area as the area enclosed by the area designating figure after detecting the confirmation operation. Then, for example, the most common depth among the pixels in the designated area is specified, and pixels that have the specified depth in the depth map (or within a predetermined range above and below the specified depth) are set to be in focus, while the other pixels in the designated area are subjected to blur processing to be out of focus. Further, the area other than the designated area is subjected to blur processing to be out of focus. In the blur processing of this case, if another subject is photographed in the area on which the blur processing is performed, for example, the depth of the depth map may be rewritten so that the subject has approximately the same depth as the background around the subject, and the blur processing may be performed based on the regenerated depth map.

In the blurred area, the degree of blur may be changed according to the difference in depth from the depth of the in-focus area, or the distance from the point tapped by the user. For example, in the area other than the designated area, the blur processing may be performed in such a manner that the degree of blur increases in correspondence with an increase in the difference in depth from the in-focus area. Alternatively, in the area other than the designated area, the blur processing may be performed in such a manner that the degree of blur increases in correspondence with an increase in the distance from the tapped point. In these cases, the blur processing may be performed in such a manner that the degree of blur is equal in the area with the same depth difference from the in-focus area, or in the area at the same distance from the center of the tapped area.

The method of manipulating the area designating figure is not limited to the above method. For example, the area designating figure may be displayed in response to the first tap gesture, and the area designating figure may be configured to enlarge in stages every time a tap gesture is performed on the displayed area designating figure. Alternatively, the area designating figure may be configured to enlarge according to the period of holding a tap gesture without taking the finger away after the tap gesture is performed. In this case, the longer the period is, the more the figure enlarges.

In addition to enlarging/reducing the area designating figure according to a user pinch gesture (pinch-in/pinch-out gesture), for example, the shape of the area designating figure may be changeable according to a user tap gesture at the outer rim of the area designating figure and a subsequent gesture to expand or reduce the outer rim.

Further, the degree of blur by the blur processing may be changed according to the distance from the center of the area designating figure and the size of the area designating figure. Specifically, the longer the distance from the center of the area designating figure is, or the larger the size of the area designating area is, the greater the degree of blur may become.

Further, instead of using an area designating figure to designate the area to be emphasized, as described above, the user may be able to designate an area not to be blurred by a drag and drop gesture to paint the desired area, although it is not shown in the figure.

5-2. Change of Degree of Blur According to User Operation

Further, when the blur processing is performed on the area other than the area to be emphasized, the degree of blur in the target area may be adjustable by the user. Specifically, for example, the degree of blur in the blur processing may be changed according to a pinch gesture on the display screen before performing the blur processing.

Specifically, for example, in the display screen where the all-in-focus image is displayed, the user is prompted to designate an area to be emphasized by a pinch gesture. In this case, for example, the blur processing may be performed to calculate the center point of the two-finger pinch gesture on the screen, to set the in-focus target area as an area composed of pixels that have the same depth as the pixel at the calculated center point in the depth map, and to set the area on which blur processing is performed as the area other than the in-focus target area. The blur processing is then performed on this blur target area.

In this case, the degree of blur in the blur processing is changed according to the user pinch gesture, and the blur processing is performed on the blur target area. Specifically, if a pinch-out gesture is performed, the blur processing is performed on the blur target area to the degree of blur that increases in stages according to the pinch-out gesture. If a pinch-in gesture is performed, the blur processing is performed on the blur target area to the degree of blur that decreases in stages according to the pinch-in gesture.

Figure 26:
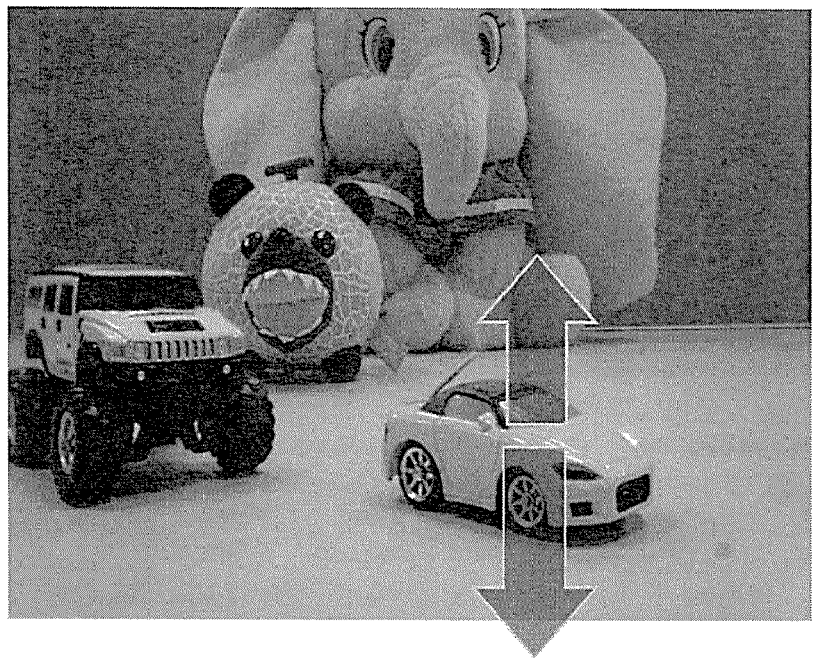
FIG. 26 (1) is an explanatory view for changing a blur degree by a pinch-out gesture, and FIG. 26 (2) is an explanatory view for changing a blur degree by a pinch-in gesture.
Figure 26:
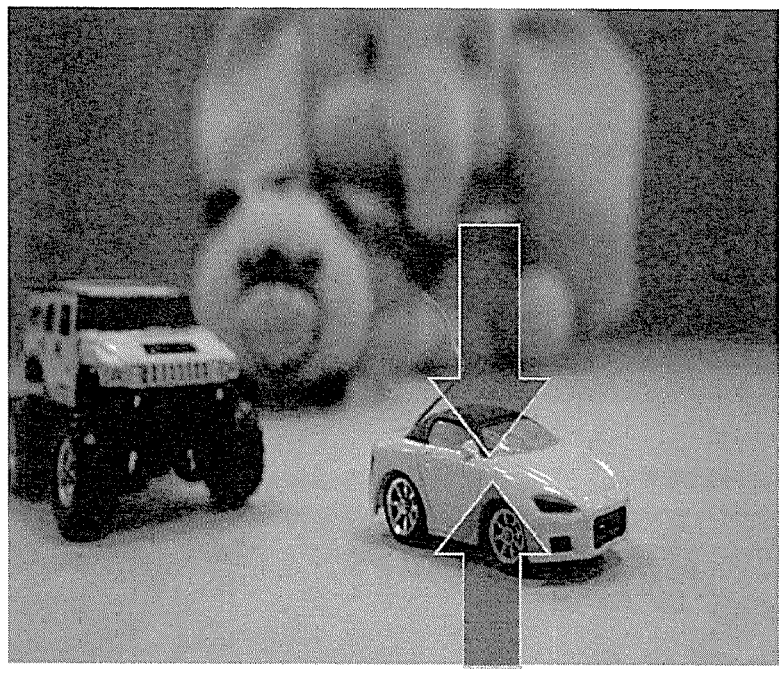

FIG. 26 (1) and FIG. 26 (2) illustrate an example of the blur processing in this case.

FIG. 26 (1) is an all-in-focus image in which a plurality of subjects, including a miniature car and stuffed animals, are photographed. In this image, the user selects the miniature car as a desired subject, and wants to blur the other subjects and the background. In this case, as illustrated in FIG. 26 (1), in response to a user tap gesture and a subsequent two-finger pinch-out gesture on the miniature car in the image, the processing section 10 performs blur processing on the image other than the miniature car in such a manner that the degree of blur increases in stages as the distance between the two fingers (the distance between the two coordinates of the two fingers in contact with the screen) spreads out. As a result, as illustrated in FIG. 26 (2), an image is generated in which the mature car is clearly displayed while the other part of the image is blurred.

In contrast, in FIG. 26 (2), in response to a two-finger pinch-in gesture by the user on the miniature car in the image, the processing section 10 performs blur processing on the image other than the miniature car in such a manner that the degree of blur decreases in stages as the distance between the two fingers (the distance between the two coordinates of the two fingers in contact with the screen) narrows. As a result, the image gradually changes back to the state of FIG. 26 (1).

In changing the degree of blur as described above, the blur processing may be performed in such a manner that the degree of blur is individually selected with respect to each area at the same depth in the depth map. Specifically, the depth of the center point of the two-finger pinch gesture on the screen is set as a reference depth, and the blur processing is performed in such a manner that the area composed of pixels at the reference depth is blurred to a predetermined degree of blur or the area is excluded from the blurred area. Further, areas may be set in order of closeness to the reference depth, and the degree of blur in the areas may be increased in stages as the difference of depth from the reference depth increases.

For example, in the case where the degree of blur is increased according to a pinch-out gesture, areas composed of pixels at the same depth are denoted as area A to area D in order of focusing distance. In this case, if the pixel at the center point of the two-finger pinch gesture on the screen is included in area B, the degree of blur in area B may be set to 20%, the degree of blur in area A and area C may be set to 50%, and the degree of blur in area D may be set to 80%. The blur processing is then performed on all pixels in each area to the corresponding degree of blur.

In this case, it can also be said that an effect of reducing the degree of blur is allocated to a pinch-out gesture. For example, assuming that the default degree of blur is originally set to 100% for all areas in the above-described case, the degree of blur in area B is greatly reduced from 100% to 20%, the degree of blur in area A and area C is reduced from 100% to 50%, i.e. to a half degree, and the degree of blur in area D is slightly reduced from 100% to 80%. In this case, the degree of blur in area D may be retained at 100% so that the generated emphasized image has a certain level of contrast.

In the above-described case, the degree of blur in the blur processing is reduced in stages when a pinch-in gesture is performed on an area where a desired subject is displayed. However, the degree of blur in the blur processing may be reduced in stages when a pinch-in gesture is performed on any area in the image. Further, instead of a pinch-in gesture, the degree of blur in the blur processing may be reduced in stages when a pinch-out gesture is performed on any area in the image.

6. Sixth Example

In order to enable images that are in focus in a desired focus range to be freely generated, a focus range slider for user designation of a focusing distance range may be displayed in or on the side of an output image in an editing screen that is displayed during or after generation of an output image so that the user can set a desired focusing distance range. In this example, the focusing distance and the depth correspond one-to-one with each other.

Figure 27:
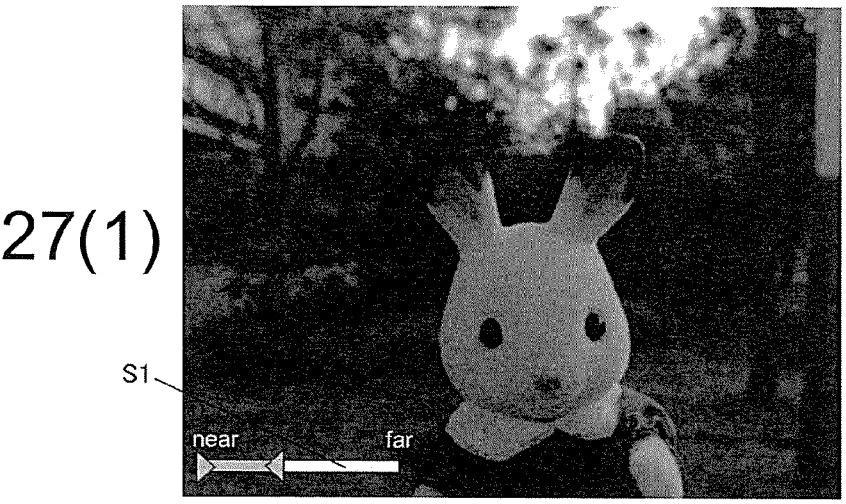
FIG. 27 (1) illustrates an example of a focusing distance slider, FIG. 27 (2) illustrates an example of a focusing distance slider, and FIG. 27 (3) illustrates an example of a focusing distance slider.
Figure 27:
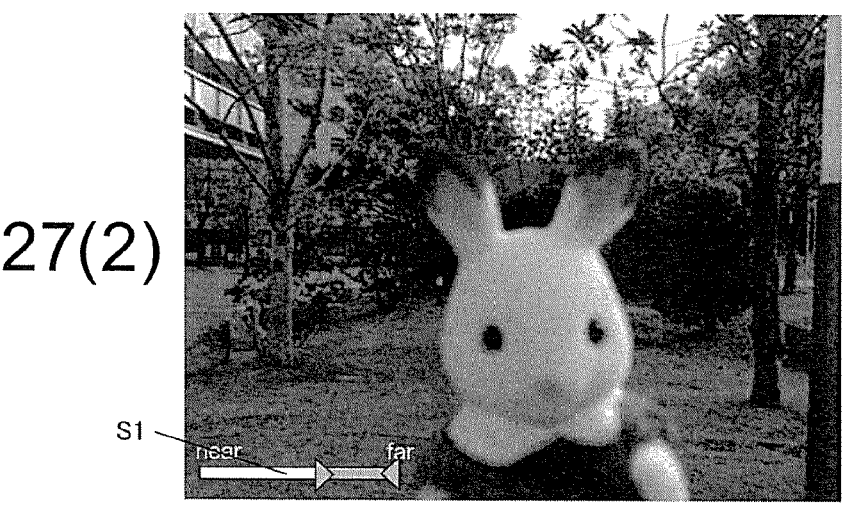
Figure 27:
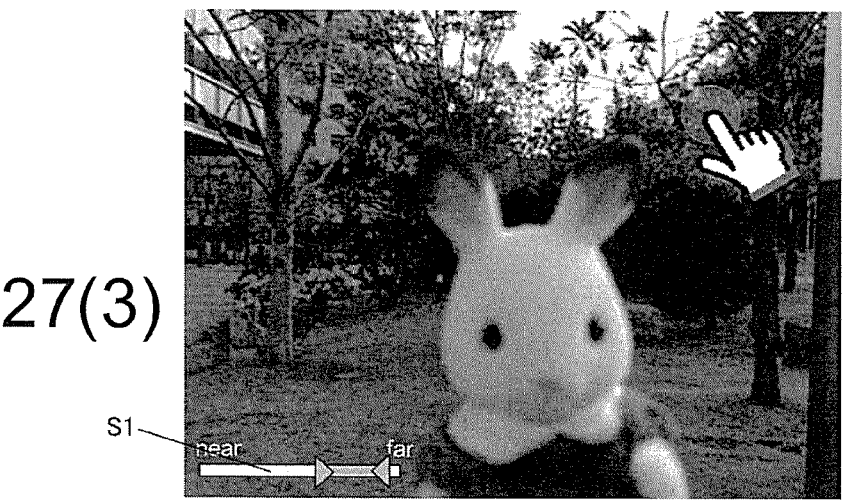

FIG. 27 (1) to FIG. 27 (3) illustrate an example of the focus range slider.

FIG. 27 (1) to FIG. 27(3) are an example of an output image in which a stuffed rabbit is displayed at the center in the foreground and trees and a building are displayed in the background. Further, a focus range slider S1 in the shape of a lateral bar is displayed in the lower left part of the output image. In the focus range slider S1, the focusing distance becomes shorter (near) toward the left end and becomes longer (far) toward the right end.

As the focus range slider S1 a rightward triangular lower limit designating icon for user designation of a lower limit of the focusing distance, and a leftward triangular upper limit designating icon for user designation of an upper limit of the focusing distance are displayed on the bar. By sliding these icons in lateral directions by means of a drag gesture, the user can designate a desired focusing distance range.

In response to a change of the focusing distance range, the processing section 10 references the depth map stored in the memory section 80 so as to specify pixels at the depth corresponding to the designated focusing distance range. Then, it generates an image in which the specified pixels are in focus while the other pixels are out of focus. With regard to the pixels to be out of focus, it is preferred that the blur processing is performed in such a manner that the degree of blur increases as the focusing distance of the pixels becomes further away from the focusing distance range. Such processing makes it possible to generate a natural image in which the degree of blur increases in the area composed of pixels that are not included in the designated focusing distance range as the focusing distance becomes further away from the designated focusing distance range.

As illustrated in FIG. 27 (1), sliding the focusing distance range of the focus range slider S1 toward a shorter focusing distance (foreground) generates an image in which the stuffed rabbit in the foreground is emphasized while the trees and building in the background are blurred. In contrast, as illustrated in FIG. 27 (2), sliding the focusing distance range of the focus range slider S1 toward a longer focusing distance (background) generates an image in which the trees and building in the background are emphasized while the stuffed rabbit in the foreground is blurred.

Further, if a user tap gesture is detected, the depth corresponding to the focusing distance of the pixels included in a predetermined area around the tapped position may be determined, and the determined depth may then be reflected in the focusing distance range of the focus range slider S1.

For example, as illustrated in FIG. 27 (3), if the user performs a tap gesture on the trees in the background, pixels included in a circle with a predetermined radius centered at the tapped position are set as neighboring pixels, and the minimal depth and the maximal depth in the neighboring pixels are determined. Then, the positions of the lower limit designating icon and the upper limit designating icon of the focus range slider S1 are automatically changed corresponding to the determined minimal depth and the maximal depth.

Further, if the emphasized image generation processing is performed according to a user tap gesture on the desired point in an image so that an emphasized image is generated in which pixels at the same focusing distance as the tapped point are in focus while pixels at the other focusing distances are out of focus, the pixels at the same focusing distance as the tapped point may be displayed distinguishably from the pixels at the other focusing distances in order to show the user which pixel will be in focus (or out of focus).

Specifically, the processing section 10 determines the pixels included in the spot tapped by the user. In this case, for example, the processing section 10 specifies the pixel at the center of the tapped spot and sets the pixel as a processing target pixel. Then, the processing section 10 references the depth map to specify pixels at the same focusing distance as the processing target pixel, and makes the specified pixels distinguishable from the other pixels, for example, by displaying them in a flashing manner.

Figure 28:
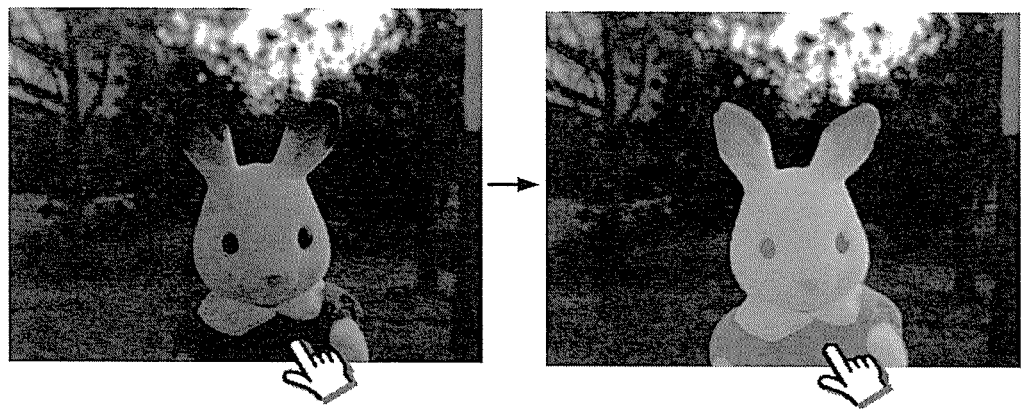
FIG. 28 (1) and FIG. 28 (2) illustrate an example of pixel separation display.
Figure 28:
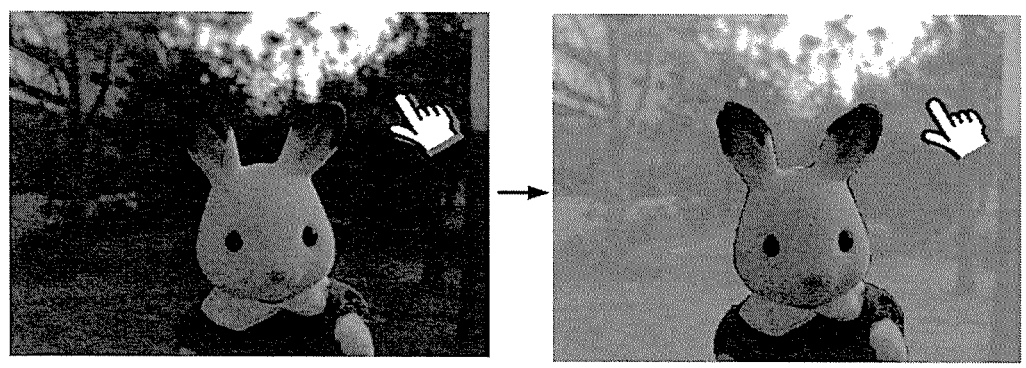

FIG. 28 (1) and FIG. 28 (2) illustrate an example of a distinguishable display of an image where a stuffed rabbit is displayed in the foreground and trees and a building are displayed in the background.

As illustrated in FIG. 28 (1), in response to a user tap gesture on the body of the stuffed rabbit in the foreground, pixels in the tapped spot are determined, and pixels at the same focusing distance are displayed in a flashing manner. Assuming that all pixels of the stuffed rabbit have the same focusing distance, for ease of description, the pixels of the stuffed rabbit are determined as the target of the distinguishable display. Accordingly, the stuffed rabbit in the image is displayed in a flashing manner as illustrated in FIG. 28 (1).

Further, as illustrated in FIG. 28 (2), in response to a user tap gesture on the trees in the background, pixels in the tapped spot are determined, and pixels at the same focusing distance are displayed in a flashing manner. Assuming that all pixels of the trees and building in the background have the same focusing distance, for ease of description, the pixels of the trees in the background are determined as the target of the distinguishable display. Accordingly, the background in the image is displayed in a flashing manner as illustrated in FIG. 28 (2).

As variations of the above-described distinguishable display, the pixels at the same focusing distance may be displayed distinguishably by displaying them in a semi-transparent color that is different from the color of the other pixels, painting them in a different color or covering them with a predetermined pattern or hatching.

7. Seventh Example

In the above-described examples, after the photographing is performed in the imaging section 50, a certain time is required to generate the emphasized image in the emphasized image generation processing. Since it is inefficient to make the user just wait during the processing, the emphasized image generation processing includes a processing for a user designation of which part of the image is in focus/out of focus.

Specifically, a plurality of photographed images taken with different focusing distances are used as the input images, and, for example, an edge is detected as the feature of the input images. Then, with respect to each input image, an image (hereinafter referred to as a "product image") is generated by multiplying the input image with the corresponding edge image generated from the input image. These product images are sequentially displayed in order from a shorter (or longer) focusing distance as reference images. If all images are displayed, the display loops back to the first image.

The user browses the sequentially displayed product images, and, when a desired subject to be in focus is clearly displayed in a product image, the user performs a selecting operation (e.g. a gap gesture) to select the product image. In this case, an input image that corresponds to the product image selected by means of a user selecting operation is specified, and an image in which pixels at the same focusing distance as the input image are in focus and the other pixels are out of focus is generated and displayed.

Figure 29:
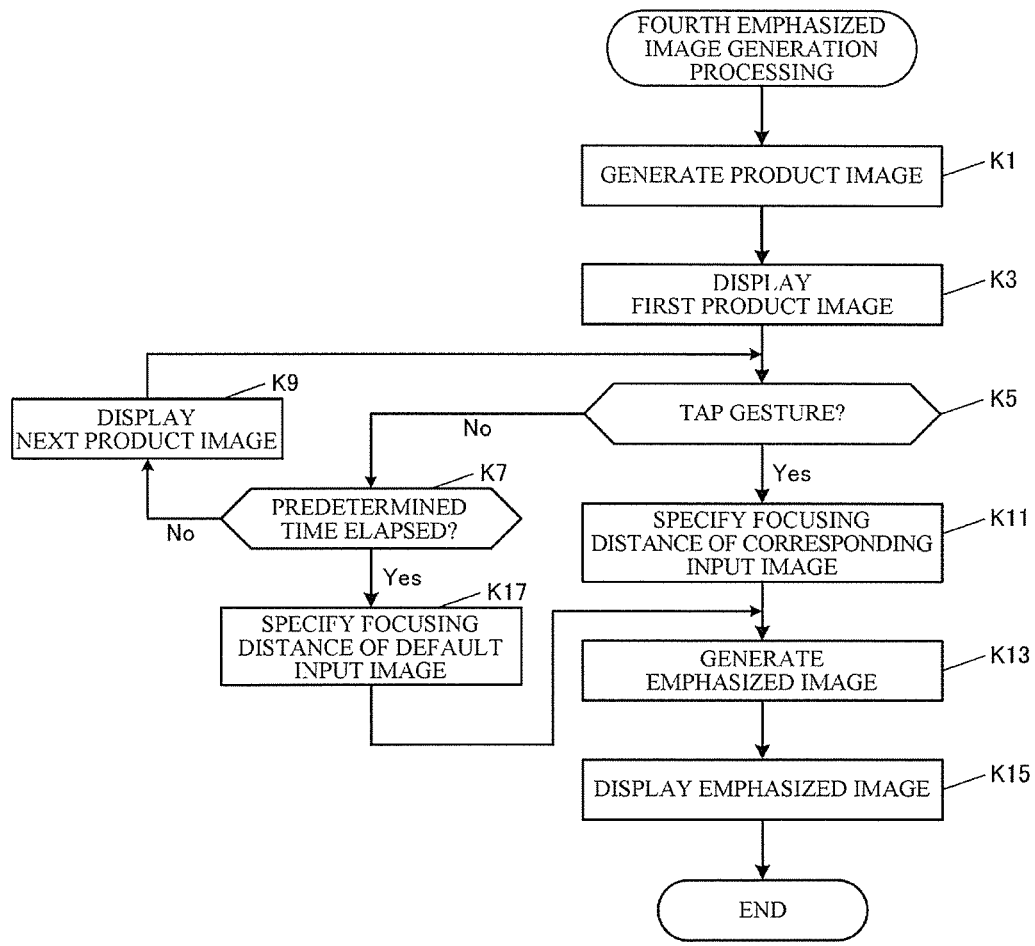
FIG. 29 illustrates an example of the flow of fourth emphasized image generation processing.

FIG. 29 is a flowchart illustrating an example of the flow of fourth emphasized image generation processing, which is executed in this case by the processing section 10 in place of the emphasized image generation processing of FIG. 8.

First, the processing section 10 performs product image generation processing (Step K1). Specifically, with respect to each of the plurality of input images, a product image is generated by multiplying the input image with the corresponding edge image obtained in the edge detection processing of Step A11.

Since the product images of the input images and the edge images may have low brightness, it is preferred that a processing is performed to increase the lightness in the generated product images.

Next, the display controlling section 127 controls the display section 30 to display the first product image (Step K3). Specifically, for example, the display section 30 displays a product image that corresponds to an input image with the shortest focusing distance or a product image that corresponds to an input image with a longest focusing distance.

Thereafter the processing section 10 makes a determination as to whether a tap gesture is performed on the touch panel 21 (Step K5). If it is determined that no tap gesture is performed (Step K5, No), the processing section 10 makes a determination as to whether a predetermined time (e.g. one minute) has elapsed after the first product image is initially displayed (Step K7).

If it is determined that the predetermined time has not elapsed yet (Step K7, No), the display controlling section 127 controls the display section 30 to display a next product image (Step K9). Then, the processing section 10 returns the processing to step K5.

If it is determined that a tap gesture is performed (Step K5, Yes), the processing section specifies 10 the focusing distance of an input image corresponding to the product image (Step K11). Then, the emphasized image generating section 123 generates an emphasized image (Step K13). Specifically, if the depth map has been generated and stored in the memory section 80, it generates an emphasized image based on the depth map stored in the memory section 80 in which pixels at the depth corresponding to the focusing distance specified in Step K11 are in focus and the other pixels are out of focus due to blur processing. If the depth map has not generated yet, it waits until the depth map is generated.

Next, the display controlling section 127 controls the display section 30 to display the generated emphasized image (Step K15). Then, the processing section 10 terminates the fourth emphasized image generation processing.

If it is determined in Step K7 that the predetermined time has elapsed (Step K7, Yes), the processing section 10 specifies the focusing distance of a default input image (Step K17). As used herein, the default input image may be, for example, an input image with the shortest focusing distance or an input image with the longest focusing distance. Then, the processing section 10 advances the processing to step K13.

Since it depends on user preferences as to which focusing distance in the image is in focus, it is difficult to automatically determine an area to be in focus. However, the above-described processing can solve this problem by making the user designate an area to be in focus. Furthermore, it can also eliminate the inefficiency of making the user just wait during the emphasized image generation processing.

The product image generation processing in Step K1 may be omitted. Instead, in Step K3, the display controlling section 127 may control the display section 30 to sequentially display the plurality of input images taken by the imaging section 50 as the reference images, for example. Alternatively, the feature detected images that are obtained by detecting a feature (e.g. edge) of the respective plurality of input images taken by the imaging section 50, the contrast corrected images that are obtained by correcting the contrast of the plurality of input images, or the like may be sequentially displayed as the reference images.

8. Eighth Example

An eighth example is intended for input images that have blown-out highlights and relates to a blur processing that is effective for an area of blown-out highlights (hereinafter referred to as "blown-out effective blur processing"). It is preferred that an area with blown-out highlights is blurred in such a manner that the area expands according to the light intensity. However, if a simple convolution (spatial weighted average) filter is used for blur processing on an area with blown-out highlights, the resultant image has unnatural blur that is beyond reality.

A normal blur processing is represented by the following Expression (5).

[Math. 5]

$$I'(x)=\Sigma w(n)*I(x+n)/\Sigma w(n) \tag{5}$$

Where "x" is a pixel, "I(x)" is the pixel value of the pixel x of an image to be blurred, "I'(x)" is the pixel value of the pixel x of a blurred image, "w(n)" is the spatial weight (blur kernel), and "n" is a neighboring pixel of the pixel x.

The problem with a blown-out highlights area is that the original light intensity is lost. When 8-bit gray scale is saturated, the gray level of a pixel that is originally equal to or greater than 256 is corrected to 255. That is, let "L(x)" be the light intensity of a pixel x, then the pixel value is calculated as "I(x)=min(L(x), 255)". Accordingly, if Expression (5) is used to perform the blur processing, the weighted average value of the pixel becomes unreasonably low. As a result, no expansion occurs in the blown-out highlight area.

To cope with the problem, the blur processing of this example is performed according to the following Expression (6) and Expression (7).

[Math. 6]

$$L'(x)=\Sigma w(n)*L(x+n)/\Sigma w(n) \tag{6}$$

[Math. 7]

$$I'(x)=\min(L'(x),255) \tag{7}$$

That is, the weighted average is obtained not from saturated pixel values but from light intensities, and the obtained weighted average of the light intensities is used to correct the pixel values of an input image to obtain the pixel values of a resultant blurred image.

Another technique to solve the above-described problem is to set a greater weight for a blown-out highlights area and to obtain the weighted average of pixel values. Specifically, the weighted average is obtained by the following Expression (8).

[Math. 8]

$$I'(x)=\Sigma w2(I(x+n))*w(n)*I(x+n)/\Sigma w(n)*w2(I(x+n)) \tag{8}$$

Where "w2" is a weight for a blown-out highlight area, which makes it possible to set a greater weight for the pixels in the blown-out highlight area. Specifically, the weight "w2" can be calculated and set according to one of the following Expression (9) to Expression (11).

[Math. 9]

$$w2(p)=\max(1,p-240) \tag{9}$$

[Math. 10]

$$w2(p) = p > 240 ? 10 : 1 \tag{10}$$

[Math. 11]

$$w2(p) = \exp(-(p-255)^2/s) \tag{11}$$

Where "s" in Expression (11) is a suitable parameter value.

Figure 32:
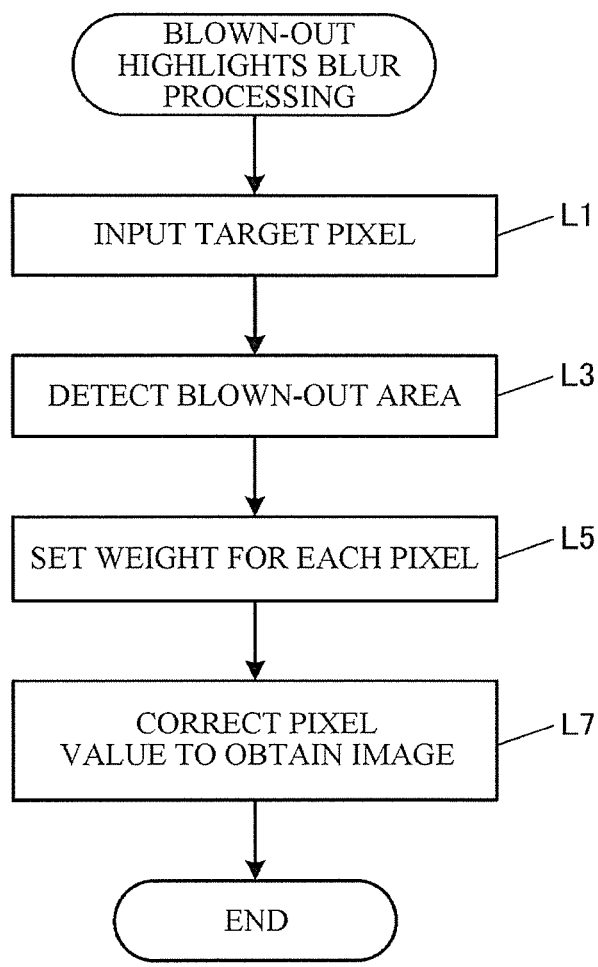
FIG. 32 is a flowchart illustrating an example of the flow of blown-out effect blur processing.

FIG. 32 is a flowchart illustrating an example of the flow of blown-out effective blur processing that is executed by the processing section 10 in this case.

First, the processing section 10 inputs a processing target image to which the processing is to be performed (Step L1). Then, the processing section 10 performs blown-out highlights area detection processing to detect a blown-out highlights area from the input processing target image (Step L3).

Next, the processing section 10 sets the weight "w2" for the blown-out highlights area on a pixel basis (Step L5). Specifically, with respect to each pixel, the weight "w2" for the blown-out highlights area is calculated and set according to one of Expression (9) to Expression (11).

Next, the processing section 10 calculates the weighted average for the pixel values "I" of the processing target image according to Expression (8) using the weight "w2" for the blown-out highlight area set in Step L5 and the pixel values "I" of the processing target image so as to obtain a resultant blurred image that is composed of the corrected pixel values "I" (Step L7). Then, the processing section 10 terminates the blown-out effective blur processing.

In order to achieve more realistic blur, the above-described blown-out effective blur processing may be performed using a model that is based on an assumption that the light intensity becomes stronger toward the center of the blown-out highlights area. For example, the weight "w2" for the blown-out highlights area may be set to increase according to the distance from the border of the blown-out highlights area and the other non-blown-out highlights area. Specifically, the border between the blown-out highlights area and the other non-blown-out highlights area is detected by a border detecting technique known in the art. Then, the weight "w2" for the pixels in the blown-out highlights area is set to a greater value as the distance from the detected border increases, and the weighted average for the pixel values "I" is calculated.

Instead of the above-described blown-out effective blur processing, for example, an underexposed image with the same viewpoint as the reference image may be used to estimate the true pixel values in the blown-out highlights area, and the blur processing may be performed using the estimated pixel values.

To estimate the true pixel values in the blown-out highlight area, a variety of techniques may be used. Specifically, for example, the pixel values of two pixels (excluding those in a blown-out highlights area) that correspond in two images, namely a reference image to be blurred and an underexposed image, are plugged into the above-described exposure converting function, which is represented by "$y = a \cdot x^b$", and the exposure converting parameter values (a, b) included in the exposure converting function are calculated by the least squares method. Then, the pixel values of the underexposed image are converted using the calculated values of the exposure converting parameters (a, b) so that the true pixel values of the blown-out highlights area are estimated.

The above-described various blur processings for blown-out highlights may be applied to, for example, a plurality of photographed images (input images) that are taken by focus bracketing, which is to take a plurality of images with different focusing distances as described in the first and second examples, or a plurality of photographed images (input images) taken by a parallax technique as described in the third example as the processing target image.

That is, a blown-out effective blur processing program for performing the above-described blown-out effective blur processing is stored in the memory section 80 as a subroutine of the image processing program for executing the image processings described in the above examples, and the processing section 10 reads out and executes the blown-out effective blur processing program in the image processing according to the image processing program. As a result, it becomes possible to perform effective blur processing adapted for blown-out highlights to images that are taken by different techniques.

9. Variation

It should be understood that the examples to which the present invention can be applied are not limited to the above-described examples and changes and modifications may be made in the embodiments without departing from the scope of the present invention. Hereinafter, variations will be described, where the same reference signs are used to denote the same components as those of the above-described examples, and repetitive description is omitted.

9-1. Image Processing Device

In the above-described embodiment, the image processing device is a smartphone. However, the electronic equipment that can be used as the image processing device is not limited to a smartphone. For example, it should be understood that electronic equipment such as cameras, digital cameras, tablets and PDAs may be used as the image processing device. Any electronic equipment with an imaging section can be used as the image processing device.

Further, for example, the user may select a depth based on the depth map or the all-in-focus image displayed on the display section of the image processing device, and the emphasized image generated based on the selected depth may be displayed on a display section of a predetermined information processing device. Specifically, for example, the user allows his/her smartphone to connect and communicate with a personal computer. Then, the user selects a depth based on the depth map or the all-in-focus image displayed on the display of the smartphone. The smartphone generates the emphasized image based on the depth selected by the user, and transmits the emphasized image to the personal computer. The personal computer displays the emphasized image received from the smartphone on a display, and the user checks the emphasized image on the display screen of the personal computer.

In this case, the system may be configured such that the smartphone transmits a set of image data to the personal computer, and the personal computer generates the emphasized image instead of the smartphone and displays it on the display. In this case, the combination of the smartphone and the personal computer is the image processing device of the present invention.

9-2. Feature Value

In the above-described embodiment, an edge is detected as the feature value from the plurality of input images with different depths that are taken by changing the focusing distance, and the intensity of the edge is used as the feature value to estimate the depth. However, the present invention is not limited thereto.

For example, the DoG (difference of Gaussian) value, which is a difference between Gaussian functions, is another feature value that is positively correlated with the in-focus degree like the edge intensity. The DoG value may also be detected as the feature value. In this case, for example, two Gaussian filters with different standard deviations σ (variance σ²) are applied to each of the plurality of input images to obtain two smoothed images with different standard deviations σ with respect to each input image. Then, the difference between the two smoothed images is calculated to obtain a DoG image of each of the plurality of input images. A proper solution processing that is similar to that of the above-described embodiment is performed using the pixel value (DoG value) of each pixel of the obtained DoG images, so that the depth is estimated for each pixel. Also in this case, the depth map, which represents the in-focus degree of each pixel, can be generated.

As another evaluation index other than the in-focus degree, for example, the degree of background of an image may be detected as the feature value. A proper solution processing that is similar to that of the above-described embodiment may be performed using the detected degree of background as the feature value, so that a map that represents the degree of background of each pixel may be obtained. In this case, an input image including the background is preferentially selected from among the plurality of input images, and the map that represents the degree of background of each pixel is generated.

In addition to the above, for example, a color feature such as the representative color and the percentage thereof in an image and the color distribution may be detected as the feature value. Further, the texture, which is a regular pattern included in an image, may be detected as the feature value. Further, the shape of an object in an image may be detected as the feature value. Further, specific orientation information may be detected as the feature value using an orientation selective filter. In any case, if the feature value indicates the in-focus degree, the obtained map represents the in-focus degree. If the feature value is a different estimation index, the obtained map represents the estimation index.

9-3. Proper Solution Processing

In the proper solution processing of the above-described embodiment, the score value is calculated using the energy function of Expression (1), and an input image that provides the maximal score value is determined as an in-focus input image. Instead, the energy function of Expression (12) may be used in place of the energy function of Expression (1) to calculate the score value, and an input image that provides the minimal score value may be determined as an in-focus input image.

[Math. 12]

$$E(R) = \sum_p C(p, R_p) + \sum_{q \in N_p} P_1(p)T[|R_p - R_q| = 1] + \sum_{q \in N_p} P_2(p)T[|R_p - R_q| > 1] \quad (12)$$

In Expression (12), the terms on the right hand side are not negative but positive values. In this Expression, the cost value that corresponds to the edge intensity of an edge image at a target pixel is added to the score value, and, if the first input image that is in focus at the target pixel is different from the second input image that is in focus at a neighboring pixel of the target pixel, the penalty value is added to the score value. Then, an input image that satisfies a predetermined low value condition of the score value is determined as an in-focus input image.

Extending the energy function of Expression (12) to one dimension gives the following Expression (13), which corresponds to Expression (2).

[Math. 13]

$$L_r = C(p,d) + \min(L_r(p-r,d), L_r(p-r,d\pm1) + P_1(p), \min_i L_r(p-r,i) + P_2(p)) - \min(L_r(p-r,i)) \quad (13)$$

Further, in the embodiment using the energy function of Expression (1), an input image that gives the maximal score value is determined as an in-focus input image. However, this is only one example. For example, a predetermined percentage (e.g. 30 percent) of the score values may be specified from the highest score value, and one score value may be selected from among these score values to determine an in-focus input image. That is, it is not required to always select the one with the highest score value, but one with the second or third highest score value may also be selected. This is an example of determining an input image that satisfies a predetermined high value condition of the score value as an in-focus input image.

Similarly, if the energy function of Expression (12) is used, a predetermined percentage (e.g. 30 percent) of the score values may be specified from the lowest score value, and one score value may be selected from among these score values. This is an example of determining an input image that satisfies a predetermined low value condition of the score value as an in-focus input image.

9-4. Display Image

In the above-described embodiment, the all-in-focus image that is generated based on the depth map is displayed as the display image on the display section 30. However, it is not required to display the all-in-focus image on the display section 30.

Specifically, instead of the all-in-focus image, a representative image selected from among the plurality of input images may be displayed as the display image on the display section 30. In this case, for example, an input image that is taken first, an input image that is taken last, or an input image with a focusing distance closest to the intermediate value may be selected as the representative image.

In addition, the depth map may be displayed as the display image on the display section 30, or a composite image of any input image selected from the plurality of input images may be displayed as the display image on the display section 30.

In any case, the user operates the input section 20 to select the part to be corrected in the image while viewing the display image displayed on the display section 30.

9-5. Depth Selection Window

When the display controlling section 127 controls the display section 30 to display a predetermined display image, a depth selection window for user selection of a depth may be displayed at a predetermined position of the display screen. In this case, the user selects a depth in the depth selection window through an input section 20.

Figures 16, 17:
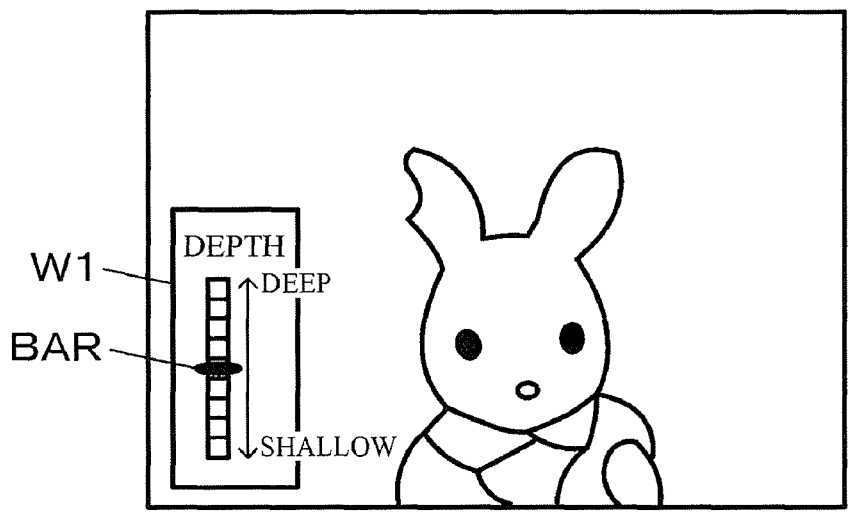
FIG. 16 illustrates an example of the table configuration of a penalty value table according to a variation.
FIG. 17 illustrates an example of a depth selection window.

FIG. 17 illustrates an example of the display screen in this case, where the all-in-focus image is displayed on the display section 30. In the figure, only a stuffed rabbit in the foreground is depicted, and trees in the background are omitted. As seen in the figure, a depth selection window W1 for user selection of a depth is displayed on the lower left part of the display screen. The depth selection window W1 is depicted as a longitudinal gauge of depth, in which the user can select a depth by moving a depth selection bar BAR, which is displayed at the center of the gauge, in the vertical direction by means of a tap gesture.

Figure 18:
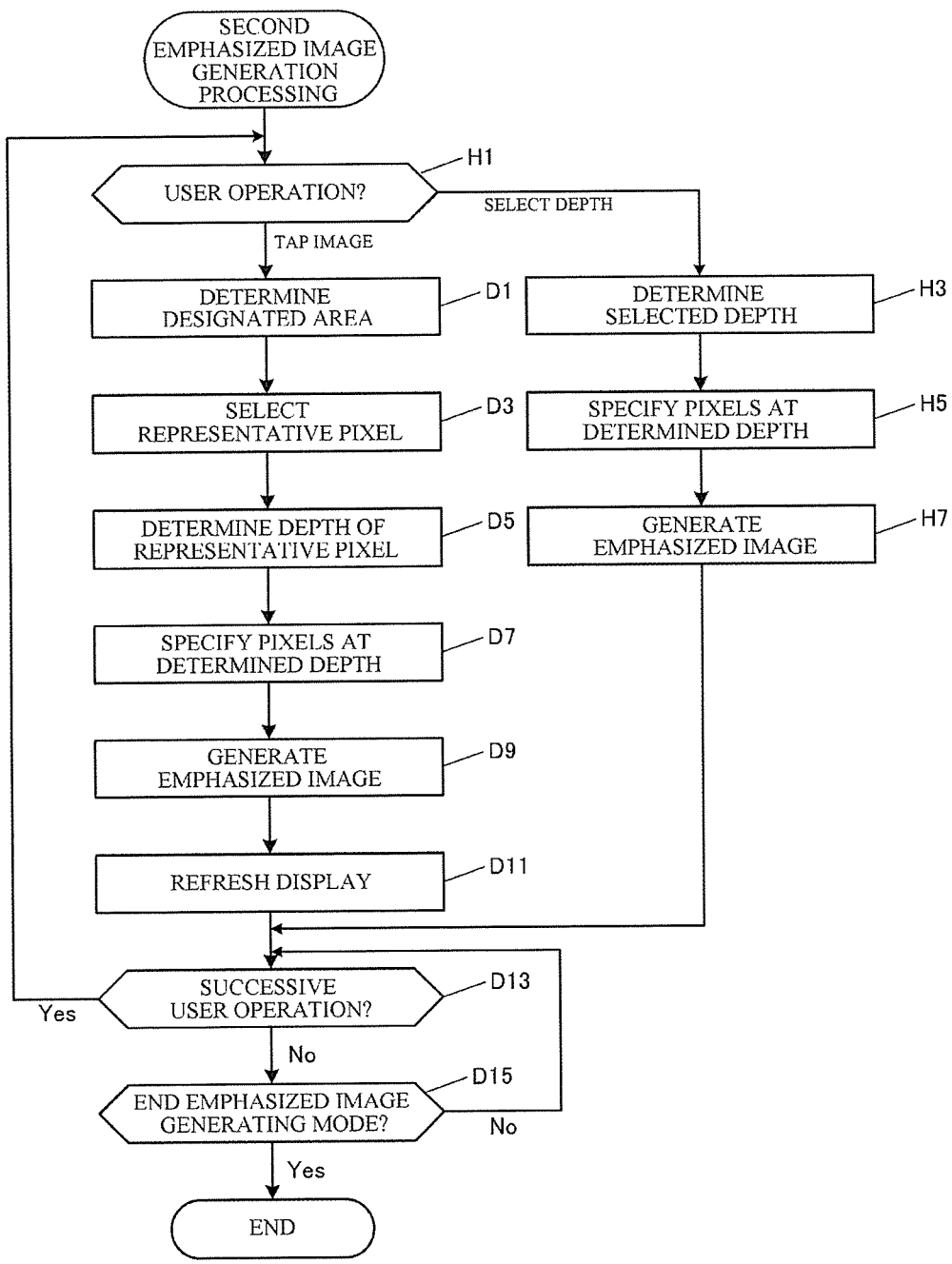
FIG. 18 is a flowchart illustrating an example of the flow of second emphasized image generation processing.

FIG. 18 is a flowchart illustrating the flow of a second emphasized image generation processing that is executed by the emphasized image generating section 123 in this case. The same reference signs are used to denote the same steps as those of the emphasized image generation processing of FIG. 8, and repetitive description is omitted.

First, the emphasized image generating section 123 makes a determination of a user operation (Step H1). If it is determined that the user operation is a tap gesture on the image in the display screen (Step H1, tap gesture on image), the emphasized image generating section 123 determines the tapped area (tap area) as the designated area (Step H2). Then, the emphasized image generating section 123 advances the processing to Step D3.

If it is determined that the user operation is an operation on an icon in the depth selection window (Step H1, icon operation in depth selection window), the emphasized image generating section 123 makes a determination of the depth at the icon destination (the depth selected by the icon) (Step H3). Then, the emphasized image generating section 123 references the depth map to specify pixels at the determined depth (Step H5). Then, the emphasized image generating section 123 generates the emphasized image based on the specified pixels (Step H7). Specifically, it performs blur processing by means of a blur filter to blur the whole all-in-focus image to a first degree of blur. Then, it applies the pixel values of the pixels specified in Step H5 to the resultant blurred image by the blur processing, so as to generate the emphasized image.

9-6. Second Blur Processing

In the emphasized image generation processing of the above-described embodiment, if a user operation is detected, a determination may be made as to whether the area in the image designated by the user is a blurred area. If the determination result is positive, the blur processing may be performed again on the area in the emphasized image to a different degree of blur from the predetermined degree of blur.

Specifically, if the user taps a certain part of the image on which the blur processing was performed in the emphasized image generation processing through the touch panel 21, the processing section makes a determination as to whether the part has already been subjected to blur processing (hereinafter referred to as a "blurred part"). Then, if it is determined that the part is a blurred part, the processing section 10 prompts the user to select whether to increase or decrease the degree of blur of the blurred part. If the user selects to decrease the degree of blur, the processing section performs the blur processing on the blurred part to a decreased degree of blur compared to the predetermined degree of blur. If the user selects to increase the degree of blur, the processing section 10 performs the blur processing on the blurred part to an increased degree of blur compared to the predetermined degree of blur. Then, the display section 30 is controlled to display the resultant emphasized image from the blur processing.

9-7. User Operation

In the above-described embodiment, the user operation for generating the emphasized image or correcting the emphasized image is a tap gesture or a drag gesture on the touch panel 21. However, it is not required that the generation of the emphasized image or the correction of the emphasized image is performed according to a user operation on the touch panel 21.

For example, if the image processing device has an operation button (including a direction button), the generation of the emphasized image and the correction of the emphasized image may be performed according to an operation on the operation button. In this case, for example, a pointing icon for designation of a position in the image (e.g. an arrow icon) is displayed on the display section 30 when the all-in-focus image is displayed. The user uses the operation button to move the pointing icon so as to designate a part to be emphasized in the display image. Alternatively, a pointing icon for designation of a position in the image (e.g. an arrow icon) is displayed on the display section 30 when the emphasized image is displayed. The user uses the operation button to move the pointing icon so as to designate a part to be corrected in the emphasized image.

9-8. Generation of Emphasized Image

In the above-described embodiment, the emphasized image is generated based on the all-in-focus image. Specifically, the pixel values of an input image at the depth to be emphasized are applied to the blurred image that is obtained by performing the blur processing on the all-in-focus image. However, it is also possible to generate the emphasized image only using the input images without generating the all-in-focus image.

Specifically, for example, in response to an input of a user operation, the pixel values of target pixels at a depth to be emphasized in the input images may be applied to an image that is obtained by performing the blur processing on pixels other than the target pixels at a depth other than the depth to be emphasized in the input images so that the emphasized image is generated. Alternatively, the pixel values of an input image at the depth of a pixel selected from the designated area designated by the user operation may be applied to the pixel values of an input image at the other depth so that the emphasized image is generated. That is, according to an input of a user operation, the pixel values of target pixels of an input image at a depth to be emphasized may be applied to an input image at a depth other than the depth so that the emphasized image is generated.

9-9. Timing of Generating Emphasized Image

Instead of the emphasized image being generated in response to a user tap gesture or a user drag gesture, the emphasized image may be generated in response to some other action as a trigger. Specifically, for example, a button to order emphasized image generation may be displayed on the display section 30, and the emphasized image may be generated in response to a detection of a push-down operation of the button on the touch panel 21. Further, if the image processing device has an operation button, the emphasized image may be generated in response to a detection of a push-down operation of the operation button.

Further, if the image processing device is equipped with a sensor for detecting vibration (e.g. an inertial sensor such as an acceleration sensor or a gyroscopic sensor), the emphasized image may be generated in response to a detection of a user operation of shaking the image processing device.

Furthermore, a microphone may be installed in the image processing device as a sound collecting section, and the emphasized image may be generated in response to a detection of an input of a predetermined voice in the microphone. In this case, digital voice data of several voices that serve as triggers of the emphasized image generation may be stored in the image processing device, and a determination as to whether the user orders the emphasized image generation is made by performing voice recognition processing to match a voice input in the microphone in comparison to the stored voice data. In these cases, for example, a depth to be emphasized may be sequentially changed from a shallower depth toward a deeper depth of the input images or from a deeper depth toward a shallower depth of the input images so that a series of emphasized images are sequentially generated, and the generated emphasized images may be sequentially displayed.

9-10. Pinch Operation

When the user performs a pinch gesture on the touch panel 21, the display image may be enlarged/reduced/rotated according to the pinch gesture. Specifically, if it is detected that the user performs a two-finger tap gesture on the touch panel 21 and subsequently expands/narrows the distance between the two fingers of the tap gesture, for example, a pixel in the depth map corresponding to the center coordinate of the tapped two points may be specified, and the whole display image may be enlarged/reduced with reference to the specified pixel. Further, if it is detected that the user twists his/her fingers to change the angle of the line connecting the two points, for example, a pixel in the depth map corresponding to the center coordinate of the tapped two points may be specified, and the whole display image may be rotated with reference to the specified pixel.

9-11. Re-Estimation of Depth

In the emphasized image correction processing of FIG. 9 of the above-described embodiment, the penalty values are changed based on the cosine similarity between the drag direction and the edge direction, and the score value processing is performed on the pixels in the designated area, so that the depth is re-estimated. That is, the score value processing is performed on the pixels in the designated area with a different second parameter value. Instead, the score value processing may be performed on the pixels in the designated area with a different cost value. That is, the score value processing may be performed on the pixels in the designated area with a changed first parameter value.

In the emphasized image correction processing, it is required to generate a corrected image in which an edge is emphasized in the designated area designated by the user. To emphasize the edge, it is required to select the pixels at the edge from an input image at a depth close to the depth of the representative pixel in the designated area. Since the cost value is calculated as the reciprocal of the edge intensity, the cost value becomes lower as the edge intensity becomes higher. That is, the higher the edge intensity of an image is, the lower the cost value becomes. Accordingly, to select the pixels at the edge from an input image at a close depth, the cost value may be set to a lower value with respect to an input image at a depth close to the depth of the representative pixel of the designated area. The cost value can be set individually and independently with respect to each input image. Accordingly, it is possible to set the cost value to a lower value with respect to a certain input image so that the input image is more likely to be selected. On the contrary, it is also possible to set the cost value to a higher value with respect to a certain input image so that the input image is less likely to be selected.

While only one of the cost value and the penalty values may be changed for the re-estimation of the depth, it is of course possible to change both of the cost value and the penalty values for the re-estimation of the depth. That is, at least one of the first parameter and the second parameter may be changed to perform the score value processing, so that the depth is re-estimated.

9-12. Penalty Values

The penalty values are not limited to the first penalty value and the second penalty value. For example, a third penalty value 897 may be used in addition to the first penalty value 893 and the second penalty value 895 as illustrated in the penalty table 89 of FIG. 16. Specifically, the third penalty value 897 may be a penalty value that is imposed when an estimated in-focus input image changes by "3 or more" in the image number 833*b* at the target pixel and at the neighboring pixel. In the penalty table 895 of FIG. 16, when the mode 891 is in a "normal state" the third penalty value 897 is set to "$P_3$", where "$P_1 < P_2 < P_3$".

Further, when the mode 891 is in an "emphasized image correcting state", different penalty values are set when a user drag direction and an edge direction satisfy a predetermined similarity condition and when a user drag direction and an edge direction satisfy a predetermined dissimilarity condition. Specifically, in the former condition, the third penalty value 897 is set to "$P_3 - \beta$". In the latter condition, the third penalty value 897 is set to "$P_3 + \beta$". "$\beta$" may be set to a suitable value, for example "$\beta = 1$".

Alternatively, the penalty value may be changed according to the relative relation between the user drag direction and the edge direction in the image. Specifically, for example, penalty values may be defined individually corresponding to similarities between the drag direction and the edge direction (hereinafter referred to as "direction similarity-dependent penalty value"), and the proper solution processing may be performed using the direction similarity-dependent penalty value. As with the above-described embodiment, cosine similarity or cosine distance may be used as the index value representing the similarity between the drag direction and the edge direction.

Specifically, instead of the penalty value P(p), a direction similarity-dependent penalty value $P_{dir}(p)$ is defined. For example, the direction similarity-dependent penalty value may be defined as follows. When the cosine similarity is "1" (i.e. the drag direction and the edge direction are parallel to each other), the penalty value is set to the same value as the penalty value in the normal state. Further, as the cosine similarity decreases (the drag direction and the edge direction become less similar to each other), the penalty value increases from the penalty value in the normal state. When the cosine similarity is "0" (the drag direction and the edge direction are perpendicular to each other), the penalty value is set to a predetermined maximal value. The cosine similarity between the user drag direction and the edge direction is calculated, and the proper solution processing is performed using the direction similarity-corresponding penalty value determined from the calculated cosine similarity.

This direction similarity-dependent penalty value is useful for the re-estimation of the depth in the above-described embodiment. As described above, one of the features of the present invention is that the penalty value is decreased as the drag direction and the edge direction become more similar to each other. Also, the penalty value is increased as the drag direction and the edge direction become less similar to each other. When the user finds a problem in a display image, i.e. a miscalculation of the depth, he/she can specify the miscalculated part by a drag gesture and make a request for correction of the emphasized image.

If the user performs a drag gesture in the direction parallel to the edge direction of a correctly displayed subject, the cosine similarity between the drag direction and the edge direction becomes a value close to "1". In this case, the direction similarity-dependent penalty value is set to the value for a cosine similarity of "1", and the proper solution processing is performed using the value. Since this penalty value is the same as the penalty value in the normal state, the depth map generated in the normal state is retained with respect to the correctly displayed subject.

In contrast, if the user performs a drag gesture tracing the miscalculated part, the drag direction becomes different from the edge direction and the cosine similarity becomes less than "1" unless the edge direction of the miscalculated part is the same as the edge direction of a correctly displayed part. For example, if the drag direction and the edge direction are perpendicular to each other, the cosine similarity becomes "0". In this case, the direction similarity-dependent penalty value is set to the value for a cosine similarity of "0", and the proper solution processing is performed using the value. Since the penalty value becomes the maximal value, the highest penalty is imposed. As a result, the depth map is regenerated, in which the depth of the miscalculated part has been precisely corrected. Correction of the emphasized image by means of the regenerated depth map makes it possible to suitably correct the miscalculated part.

Further, the penalty value for transition from an input image to another input image may also be defined individually. Specifically, instead of the penalty value P(p) defined in the above-described embodiment, an inter-image penalty value $P_{ij}(p)$ may be defined, where "i" and "j" are each the image number.

For example, assume that there are four focusing distances f1, f2, f3 and f4 in the input images, where the magnitude relationship is "f1 <f2 <<<<<f3 <f 4 ". In this case, since the dissimilarity between f1 and f2 is not very large, the inter-image penalty value $P_{12}(p)$ between the input image at f1 and the input image at f2 is set to a large value so that a combination of the input image at f1 and the input image at f2 is more likely to be selected as in-focus images. Similarly, since the dissimilarity between f3 and f4 is not very large, the inter-image penalty value $P_{34}(p)$ between the input image at f3 and the input image at f4 is set to a large value so that a combination of the input image at f3 and the input image at f4 is more likely to be selected as in-focus images.

In contrast, since the dissimilarity between f2 and f3 is large, the inter-image penalty value $P_{23}(p)$ between the input image at f2 and the input image at f3 is set to a small value so that a combination of the input image at "f3 " and the input image at f4 is less likely to be selected as in-focus images. In this way, a large penalty value is imposed for a change within the input image at f1 and the input image at f2 or a change within the input image at f3 and the input image at f4 so that such combinations of input images can be more likely to be selected as input images at close focusing distances, while a small penalty value is imposed for a change within the input image at f2 and the input image at f3 so that such combination of input images can be less likely to be selected as input images at distant focusing distances.

9-13. Motion Blur Countermeasure

An area in the input images where motion blur is caused (hereinafter referred to as a "motion blur area") may be detected, and at least one of the cost value and the penalty values may be changed in the motion blur area so that the estimated depth (an estimated in-focus input image) is less likely to be changed. Motion blur is a blur of a subject in an image, which is caused when the subject is moving at the time of photographing and the movement is fast with respect to the shutter speed of a camera. A motion blur area may be detected by means of a technique known in the art.

If a motion blur area is detected, the penalty value P(p) for the motion blur area is set to a larger value than the value in the normal state, or the cost value $C(p, R_p)$ for the motion blur area is set to a smaller value than the value calculated from the edge intensity. Then, the score value processing is performed. As a result, it becomes possible to generate the depth map in which the depth is correctly estimated in the motion blur area.

9-14. Recording Medium

In the above-described examples, various programs and data for the image processings are stored in the memory section of the image processing device, and the processing section 10 reads out and executes these programs to perform the image processings of the above-described examples. In these cases, the memory section may include a recording medium (external storage) such as a memory card, a compact flash card, a memory stick, a USB memory, a CD-RW (optical disk), and an MO (magneto-optic disk) in addition to an internal storage such as a ROM, a flash ROM, a hard disk and a RAM, and the various programs and data may be stored, in such recording medium.

Figure 30:
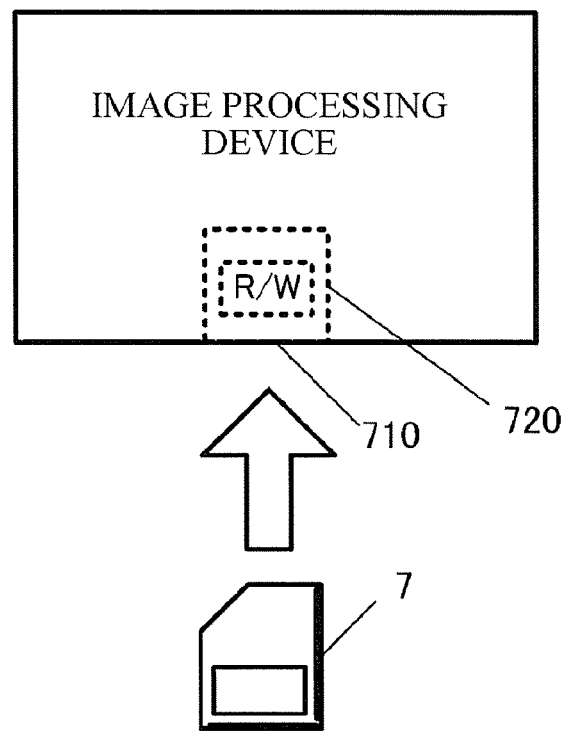
FIG. 30 illustrates an example of a recording medium.

FIG. 30 illustrates an example of the recording medium in this case.

The image processing device is provided with a card slot 710 for memory card 7 insertion, and a card reader/writer (R/W) 720 to read information stored in the memory card inserted in the card slot 710 and to write information to the memory card 7. The card reader/writer 720 writes a program and data recorded on the memory section 80 to the memory card 7 according to a control of the processing section 10. By reading the program and data recorded on the memory card 7, information processing devices other than the image processing device (e.g. a personal computer) can perform the processings of the above-described examples for themselves.

The invention claimed is:

1. An image processing device, comprising:
a contrast correcting unit configured to correct contrast of a plurality of input images;
a feature detecting unit configured to detect a predetermined feature from the plurality of input images that are corrected by the contrast correcting unit;
a depth map generating unit configured to generate a depth map based on a detection result from the feature detecting unit,
wherein the feature detecting unit comprises a feature value detecting unit configured to detect a predetermined feature value from the plurality of input images,
the image processing device further comprises a depth estimating unit configured to estimate a depth of a target pixel by means of the feature value detected by the feature value detecting unit, the depth at the target pixel being information representing which of the plurality of input images is in focus at the target pixel, and
the depth map generating unit generates the depth map based on an estimation result from the depth estimating unit.

2. The image processing device according to claim 1, wherein the depth estimating unit performs a predetermined proper solution processing on the target pixel by using the respective feature values of the plurality of input images detected by the feature value detecting unit so as to determine an input image that is in focus at the target pixel from among the plurality of input images, in which the proper solution processing uses a first parameter that is determined by the feature value of the target pixel, and a second parameter that is a penalty imposed when a first input image that is in focus at the target pixel is different from a second input image that is in focus at a neighboring pixel of the target pixel.

3. The image processing device according to claim 2, further comprising:
a motion blur area detecting unit configured to detect a motion blur area in the plurality of input images, wherein in the proper solution processing, at least one of the first parameter and the second parameter is set to a different parameter value for the motion blur area detected by the motion blur area from parameter values for an area other than the motion blur area.

4. The image processing device according to claim 1, further comprising:
a focus separation determination unit configured to determine as to whether focus is correctly separated in the plurality of input images,
wherein the depth estimating unit estimates the depth of the target pixel using input images for which a determination result from the focus separation determination unit is positive.

5. The image processing device according to claim 1, wherein the feature value detecting unit detects the feature value of the plurality of input images or a plurality of reduced input images that are obtained by reducing the plurality of input images,
the depth map generating unit generates a reduced depth map based on the estimation result from the depth estimating unit, and
the image processing device further comprises:
a reconstructing unit configured to reconstruct a reconstructed depth map from the reduced depth map; and
a correcting unit configured to generate a corrected depth map from the reconstructed depth map reconstructed by the reconstructing unit by means of a predetermined corrector image.

6. The image processing device according to claim 1, further comprising:
an input unit configured to receive a user operation,
wherein the depth estimating unit comprises a depth re-estimating unit configured to re-estimate the depth of a pixel included in a designated area designated by the user operation, and
the depth map generating unit comprises a depth map regenerating unit configured to regenerate the depth map based on a re-estimation result from the depth re-estimating unit.

7. The image processing device according to claim 2, further comprising:
an input unit configured to receive a user operation,
wherein the depth estimating unit comprises a depth re-estimating unit configured to re-estimate the depth of a pixel included in a designated area designated by the user operation,
the depth map generating unit comprises a depth map regenerating unit configured to regenerate the depth map based on a re-estimation result from the depth re-estimating unit, and
the depth re-estimating unit performs the proper solution processing to the pixel in the designated area so as to re-estimate the depth, in which at least one of the first parameter and the second parameter is set to a different parameter value from parameter values that are originally used in depth estimation by the depth estimating unit.

8. An image processing device, comprising:
a feature detecting unit configured to detect a predetermined feature from a plurality of input images;
a depth map generating unit configured to generate a depth map based on a detection result from the feature detecting unit,
wherein the feature detecting unit comprises a feature point detecting unit configured to detect feature points from the plurality of input images, in which the plurality of input images are a plurality of photographed images that have parallax by being taken from different viewpoints,
the image processing device further comprises:
a relative viewpoint estimating unit configured to estimate relative positional relation between respective viewpoints of the plurality of photographed images based on the feature points detected by the feature point detecting unit; and
a pixel position estimating unit configured to perform a predetermined estimating calculation so as to estimate three-dimensional positions of pixels of the plurality of input images, and
the depth map generating unit generates the depth map based on an estimation result from the relative viewpoint estimating unit and an estimation result from the pixel position estimating unit.

9. The image processing device according to claim 8, wherein the relative viewpoint estimating unit comprises:
a feature point tracking unit configured to track the feature points detected by the feature point detecting unit; and
a base input image extracting unit configured to extract an input image from among the plurality of input images as an base input image to be used as a reference point based on a tracking result from the feature point tracking unit, and
the relative viewpoint tracking unit estimates the relative positional relation of the respective viewpoints of the plurality of photographed images based on the feature points detected by the feature point detecting unit from the base input image extracted by the base input image extracting unit.

10. The image processing device according to claim 8, further comprising:
a display unit;
a display controlling unit configured to control the display unit to display a guide for showing a user a moving manner of the device that causes parallax between the plurality of photographed images; and
a movement parameter detecting unit configured to detect a movement parameter of the device,
wherein the display controlling unit changes an appearance of the guide based on a detection result from the movement parameter detecting unit.

11. An image processing device, comprising:
a feature detecting unit configured to detect a predetermined feature from a plurality of input images;
a depth map generating unit configured to generate a depth map based on a detection result from the feature detecting unit;
a display unit;
an input unit configured to receive a user operation; and
a composite image generating unit configured to generate a composite image based on the depth map according to the user operation on the input unit, in which a pixel value of a pixel in an input image corresponding to a specific depth is applied to an input image corresponding to a depth other than the specific depth,
wherein the display unit displays the composite image generated by the composite image generating unit.

12. An image processing device, comprising:
a feature detecting unit configured to detect a predetermined feature from a plurality of input images;
a depth map generating unit configured to generate a depth map based on a detection result from the feature detecting unit;
a display unit;

an input unit configured to receive a user operation;

an all-in-focus image generating unit configured to generate an all-in-focus image by using the depth map and the plurality of input images; and a composite image generating unit that comprises a blur processing unit configured to perform blur processing to the all-in-focus image, and is configured to generate a composite image based on the depth map according to the user operation on the input unit, in which a pixel value of a pixel in an input image corresponding to a specific depth is applied to a resultant image of the blur processing, wherein the display unit displays the composite image generated by the composite image generating unit.

13. The image processing device according to claim 12, further comprising:

a display controlling unit configured to control the display unit to display a designating figure for a user designation of an in-focus target area to be in focus according to the user operation on the input unit, wherein the composite image generating unit generates the composite image in which a depth of a pixel included in the designating figure in the plurality of input images is set to the specific depth based on the depth map.

14. The image processing device according to claim 12, wherein the input unit comprises a touch panel that is integrally formed with the display unit, the display unit displays a confirmation screen on which a subject to be photographed can be checked, the processing device further comprises:

a memory unit configured to store an in-focus target position that is a position to be in focus on the confirmation screen according to a tap gesture on the touch panel where the confirmation screen is displayed; and an imaging unit configured to perform photographing after the in-focus target position is stored in the memory unit when a predetermined photographing condition is satisfied, the feature detecting unit detects the feature, in which the plurality of input images are a plurality of photographed images taken by the imaging unit, and the composite image generating unit generates the composite image, in which the specific depth is a depth at the in-focus target position stored in the memory unit.

15. The image processing device according to claim 12, wherein the input unit comprises a touch panel that is integrally form with the display unit, the display unit displays a predetermined display image, the processing device further comprises:

an in-focus target area setting unit configured to set an in-focus target area to be in focus according to a pinch gesture on the touch panel where the display image is displayed on a display screen; and a blur processing unit configured to perform blur processing to a predetermined degree of blur to an area other than the in-focus target area set by the in-focus target area setting unit, and the blur processing unit comprises a blur degree changing unit configured to change the degree of blur according to a pinch gesture on the in-focus target area set by the in-focus target area setting unit.

16. The image processing device according to claim 12, wherein the input unit comprises a touch panel that is integrally formed with the display unit, the composite image generating unit dynamically changes the specific depth according to a drag gesture on the touch panel so as to dynamically generate the composite image, and the display unit displays the composite image dynamically generated by the composite image generating unit along with the drag gesture.

17. An image processing device, comprising:

a feature detecting unit configured to detect a predetermined feature from a plurality of input images;

a depth map generating unit configured to generate a depth map based on a detection result from the feature detecting unit, wherein the plurality of input images are a plurality of photographed images taken with different focusing distances, the image processing device further comprises:

a display unit;

an input unit configured to receive a user operation;

a display controlling unit configured to control the display unit to display a focus range designating image for a user designation of a focus range at a predetermined position in the display unit; and a composite image generating unit configured to generate a composite image based on the depth map, in which the composite image is in focus at a pixel at a depth corresponding to the focus range designated by the user operation on the focus range designating image and is out of focus at the other pixel, and the display unit displays the composite image generated by the composite image generating unit.

18. An image processing device, comprising:

a feature detecting unit configured to detect a predetermined feature from a plurality of input images;

a depth map generating unit configured to generate a depth map based on a detection result from the feature detecting unit, wherein the plurality of input images are a plurality of photographed images taken with different focusing distances, the image processing unit further comprises:

a display unit;

an input unit configured to receive a user operation;

a display controlling unit configured to control the display unit to sequentially display a plurality of reference images that are based on the plurality of input images; and a composite image generating unit configured to generate a composite image based on the depth map, in which the composite image is in focus at a pixel at a depth corresponding to an input image of a corresponding reference image that is selected by a user from among the plurality of reference images and is out of focus at the other pixel, and the display unit displays the composite image generated by the composite image generating unit.

19. An image processing method, comprising:

correcting contrast of a plurality of input images;

detecting a predetermined feature from the plurality of input images that are corrected by the contrast;

generating a depth map based on a result of detecting the predetermined feature, wherein detecting the predetermined feature comprises detecting a predetermined feature value from the plurality of input images, the image processing method, further comprising:

estimating a depth of a target pixel by means of the feature value detected by detecting the predetermined feature value, the depth at the target pixel being information representing which of the plurality of input images is in focus at the target pixel; and generating the depth map based on an estimation result of estimating the depth.

20. A non-transitory computer readable recording medium storing a program to make a computer execute the steps of:

a contrast correcting step of correcting contrast of a plurality of input images;

a feature detecting step of detecting a predetermined feature from the plurality of input images that are corrected by the contrast correcting step;

a depth map generating step of generating a depth map based on a detection result of the feature detecting step, wherein the feature detecting step comprises a feature value detecting step configured to detect a predetermined feature value from the plurality of input images, the non-transitory computer readable recording medium storing the program to make the computer further execute the steps of:

a depth estimating step configured to estimate a depth of a target pixel by means of the feature value detected by the feature value detecting unit, the depth at the target pixel being information representing which of the plurality of input images is in focus at the target pixel; and the depth map generating step generates the depth map based on an estimation result from the depth estimating unit.

21. An image processing method, comprising:

detecting a predetermined feature from a plurality of input images;

generating a depth map based on a result of detecting the predetermined feature, wherein the predetermined feature detection comprises detecting feature points from the plurality of input images, in which the plurality of input images are a plurality of photographed images that have parallax by being taken from different viewpoints, the image processing method, further comprising:

estimating relative positional relation between respective viewpoints of the plurality of photographed images based on the detected feature points detected by the feature point detection;

performing a predetermined estimating calculation so as to estimate three-dimensional positions of pixels of the plurality of input images; and generating the depth map based on an estimation result of estimating the relative positional relation and an estimation result of performing the predetermined estimating calculation.

22. An image processing method, comprising:

detecting a predetermined feature from a plurality of input images;

generating a depth map based on a result of detecting the predetermined feature;

generating a composite image based on the depth map according to a user operation on an input unit, in which a pixel value of a pixel in an input image corresponding to a specific depth is applied to an input image corresponding to a depth other than the specific depth; and displaying the generated composite image.

23. An image processing method, comprising:

detecting a predetermined feature from a plurality of input images;

generating a depth map based on a result of detecting the predetermined feature;

generating an all-in-focus image by using the depth map and the plurality of input images;

performing a blur processing to the all-in-focus image, generating a composite image based on the depth map according to a user operation on an input unit, in which a pixel value of a pixel in an input image corresponding to a specific depth is applied to a resultant image of the blur processing; and displaying the generated composite image.

24. An image processing method, comprising:

detecting a predetermined feature from a plurality of input images;

generating a depth map based on a result of detecting the predetermined feature, wherein the plurality of input images are a plurality of photographed images taken with different focusing distances, the image processing method, further comprising:

controlling a display unit to display a focus range designating image for a user designation of a focus range at a predetermined position in the display unit;

generating a composite image based on the depth map, in which the composite image is in focus at a pixel at a depth corresponding to the focus range designated by a user operation on the focus range designating image and is out of focus at the other pixel; and displaying the generated composite image.

25. An image processing method, comprising:

detecting a predetermined feature from a plurality of input images;

generating a depth map based on a result of detecting the predetermined feature, wherein the plurality of input images are a plurality of photographed images taken with different focusing distances, the image processing method, further comprising:

controlling a display unit to sequentially display a plurality of reference images that are based on the plurality of input images;

generating a composite image based on the depth map, in which the composite image is in focus at a pixel at a depth corresponding to an input image of a corresponding reference image that is selected by a user from among the plurality of reference images and is out of focus at the other pixel; and displaying the generated composite image.

26. A non-transitory computer readable recording medium storing a program to make a computer execute the steps of:

a feature detecting step of detecting a predetermined feature from a plurality of input images;

a depth map generating step of generating a depth map based on a detection result from the feature detecting step;

wherein the feature detecting step comprises a feature point detecting step of detecting feature points from the plurality of input images, in which the plurality of input images are a plurality of photographed images that have parallax by being taken from different viewpoints, the non-transitory computer readable recording medium storing a program to make a computer further execute the steps of:

a relative viewpoint estimating step of estimating relative positional relation between respective viewpoints of the plurality of photographed images based on the feature points detected by the feature point detecting unit; and a pixel position estimating step of performing a predetermined estimating calculation so as to estimate three-dimensional positions of pixels of the plurality of input images, and the depth map generating step generates the depth map based on an estimation result from the relative viewpoint estimating step and an estimation result from the pixel position estimating step.

27. A non-transitory computer readable recording medium storing a program to make a computer execute the steps of:
  a feature detecting step of detecting a predetermined feature from a plurality of input images;
  a depth map generating step of generating a depth map based on a detection result from the feature detecting step;
  a composite image generating step of generating a composite image based on the depth map according to a user operation on an input unit, in which a pixel value of a pixel in an input image corresponding to a specific depth is applied to an input image corresponding to a depth other than the specific depth; and
  a displaying step of displaying the composite image generated by the composite image generating step.

28. A non-transitory computer readable recording medium storing a program to make a computer execute the steps of:
  a feature detecting step of detecting a predetermined feature from a plurality of input images;
  a depth map generating step of generating a depth map based on a detection result from the feature detecting step;
  an all-in-focus image generating step of generating an all-in-focus image by using the depth map and the plurality of input images;
  a blur processing step of performing blur processing to the all-in-focus image;
  a composite image generating step of generating a composite image based on the depth map according to a user operation on an input unit, in which a pixel value of a pixel in an input image corresponding to a specific depth is applied to a resultant image of the blur processing; and
  a displaying step of displaying the composite image generated by the composite image generating step.

29. A non-transitory computer readable recording medium storing a program to make a computer execute the steps of:
  a feature detecting step of detecting a predetermined feature from a plurality of input images;
  a depth map generating step of generating a depth map based on a detection result from the feature detecting step,
  wherein the plurality of input images are a plurality of photographed images taken with different focusing distances,
  the non-transitory computer readable recording medium storing a program to make a computer further execute the steps of:
  a display controlling step of controlling a display unit to display a focus range designating image for a user designation of a focus range at a predetermined position in the display unit; and
  a composite image generating step of generating a composite image based on the depth map, in which the composite image is in focus at a pixel at a depth corresponding to the focus range designated by a user operation on the focus range designating image and is out of focus at the other pixel, and
  a displaying step of displaying the composite image generated by the composite image generating step.

30. A non-transitory computer readable recording medium storing a program to make a computer execute the steps of:
  a feature detecting step of detecting a predetermined feature from a plurality of input images;
  a depth map generating step of generating a depth map based on a detection result from the feature detecting step,
  wherein the plurality of input images are a plurality of photographed images taken with different focusing distances,
  the non-transitory computer readable recording medium storing a program to make a computer further execute the steps of:
  a display controlling step of controlling the display unit to sequentially display a plurality of reference images that are based on the plurality of input images; and
  a composite image generating step of generating a composite image based on the depth map, in which the composite image is in focus at a pixel at a depth corresponding to an input image of a corresponding reference image that is selected by a user from among the plurality of reference images and is out of focus at the other pixel; and
  a displaying step of displaying the composite image generated by the composite image generating step.

* * * * *